US012803633B2

(12) United States Patent
Rahman et al.

(10) Patent No.: US 12,803,633 B2
(45) Date of Patent: Nov. 17, 2026

(54) METHOD AND APPARATUS FOR A CSI ASSOCIATED WITH CODEBOOK FOR DOPPLER

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 640 days.

(21) Appl. No.: 18/313,161

(22) Filed: May 5, 2023

(65) Prior Publication Data

US 2023/0370139 A1 Nov. 16, 2023

Related U.S. Application Data

(60) Provisional application No. 63/421,089, filed on Oct. 31, 2022, provisional application No. 63/418,849,
(Continued)

(51) Int. Cl.
*H04B 7/06* (2006.01)
*H04L 1/00* (2006.01)
(Continued)

(52) U.S. Cl.
CPC ......... *H04B 7/0626* (2013.01); *H04B 7/0636* (2013.01); *H04L 1/0018* (2013.01);
(Continued)

(58) Field of Classification Search
CPC ... H04B 7/0626; H04B 7/0636; H04L 1/0693; H04L 1/0018; H04W 74/004; H04W 72/1284; H04W 72/512
See application file for complete search history.

(56) References Cited

U.S. PATENT DOCUMENTS

2018/0042028 A1* 2/2018 Nam .................... H04L 5/0048
2018/0287757 A1 10/2018 Onggosanusi
(Continued)

FOREIGN PATENT DOCUMENTS

WO 2021102952 A1 6/2021
WO 2021102954 A1 6/2021
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.
(Continued)

*Primary Examiner* — Salvador E Rivas

(57) ABSTRACT

Apparatuses and methods for a channel state information (CSI) reference resource and reporting window are provided. A method performed by a user equipment (UE) includes receiving a configuration about a CSI report. The configuration includes information indicating (i) a set of time slots that the CSI report is valid for, (ii) a CSI reference resource, and (iii) an uplink (UL) time slot n'. The method further includes, based on the configuration, identifying the set of time slots and the CSI reference resource and determining, based on the CSI reference resource, the CSI report for the identified set of time slots. The method includes transmitting the CSI report in the UL time slot n'. The set of time slots includes at least one time slot i after a time slot $n_{ref}$ of the CSI reference resource, implying $n_{ref}<i$.

12 Claims, 19 Drawing Sheets

Related U.S. Application Data filed on Oct. 24, 2022, provisional application No. 63/412,237, filed on Sep. 30, 2022, provisional application No. 63/343,470, filed on May 18, 2022, provisional application No. 63/342,513, filed on May 16, 2022.

(51) Int. Cl.

| | |
|---|---|
| ***H04L 1/06*** | (2006.01) |
| ***H04W 72/0446*** | (2023.01) |
| ***H04W 72/512*** | (2023.01) |
| ***H04W 74/00*** | (2009.01) |
| *H04L 5/00* | (2006.01) |

(52) U.S. Cl.

CPC ....... *H04L 1/0693* (2013.01); *H04W 72/0446* (2013.01); *H04W 72/512* (2023.01); *H04W 74/004* (2013.01); *H04L 5/0057* (2013.01)

(56) References Cited

U.S. PATENT DOCUMENTS

| | | | | |
|---|---|---|---|---|
| 2019/0109626 | A1* | 4/2019 | Park | H04B 7/0626 |
| 2019/0165847 | A1* | 5/2019 | Kim | H04B 7/0626 |
| 2021/0058125 | A1* | 2/2021 | Manolakos | H04B 7/0626 |
| 2021/0351885 | A1* | 11/2021 | Chavva | G06N 3/04 |
| 2022/0124740 | A1 | 4/2022 | Ji et al. | |
| 2022/0303999 | A1* | 9/2022 | Chung | H04L 1/0029 |
| 2022/0329305 | A1* | 10/2022 | Ren | H04B 7/065 |
| 2023/0046218 | A1* | 2/2023 | Matsumura | H04B 7/0626 |
| 2023/0254022 | A1* | 8/2023 | Hao | H04L 5/0091 370/329 |
| 2024/0030985 | A1* | 1/2024 | Yuan | H04L 5/0057 |
| 2025/0158787 | A1* | 5/2025 | Dai | H04L 5/0057 |
| 2025/0330848 | A1* | 10/2025 | Kim | H04L 5/0057 |

FOREIGN PATENT DOCUMENTS

| | | | |
|---|---|---|---|
| WO | 2021158911 | A1 | 8/2021 |
| WO | 2022032567 | A1 | 2/2022 |
| WO | 2022036497 | A1 | 2/2022 |
| WO | 2022087762 | A1 | 5/2022 |

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.0.0, Mar. 2022, 1119 pages.

"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

Fraunhofer IIS, et al., "Measurement results on Doppler spectrum for various UE mobility environments and related CSI enhancements", 3GPP TSG RAN WG#86, RP-192978, Dec. 2019, 13 pages.

"3rd Generation Partnership Project; Technical Specification Group Radio Access Network; NR; Physical channels and modulation (Release 17)", 3GPP TS 38.211 V17.0.0, Dec. 2021, 134 pages.

International Search Report and Written Opinion issued Aug. 31, 2023 regarding International Application No. PCT/KR2023/006638, 7 pages.

Extended European Search Report issued Jul. 9, 2025 regarding Application No. 23807885.1, 9 pages.

Samsung et al., "Remaining issues on NR CSI-RS", 3GPP TSG RAN WG1 Meeting #89, R1-1707981, May 2017, 15 pages.

* cited by examiner

METHOD AND APPARATUS FOR A CSI ASSOCIATED WITH CODEBOOK FOR DOPPLER

CROSS-REFERENCE TO RELATED APPLICATION AND CLAIM OF PRIORITY

This application claims priority under 35 U.S.C. § 119(e) to: U.S. Provisional Patent Application No. 63/342,513, filed on May 16, 2022, U.S. Provisional Patent Application No. 63/343,470 filed on May 18, 2022, U.S. Provisional Patent Application No. 63/412,237 filed on Sep. 30, 2022, U.S. Provisional Patent Application No. 63/418,849 filed on Oct. 24, 2022, and U.S. Provisional Patent Application No. 63/421,089 filed on Oct. 31, 2022. The above-identified provisional patent applications are hereby incorporated by reference in their entirety.

TECHNICAL FIELD

The present disclosure relates generally to wireless communication systems and, more specifically, to a method and apparatus for a channel state information (CSI) reference resource and reporting window.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for a CSI reference resource and reporting window.

In one embodiment, a user equipment (UE) is provided. The UE includes a transceiver configured to receive a configuration about a CSI report. The configuration including information indicating (i) a set of time slots that the CSI report is valid for, (ii) a CSI reference resource, and (iii) an uplink (UL) time slot n'. The UE further includes a processor operably coupled to the transceiver, The processor, based on the configuration, is configured to identify the set of time slots and the CSI reference resource, and determine, based on the CSI reference resource, the CSI report for the identified set of time slots. The transceiver is further configured to transmit the CSI report in the UL time slot n'. The set of time slots includes at least one time slot i after a time slot $n_{ref}$ of the CSI reference resource, implying $n_{ref}$<i.

In another embodiment, a base station (BS) is provided. The BS includes a processor configured to generate a configuration about a CSI report. The configuration includes information indicating (i) a set of time slots that the CSI report is valid for, (ii) a CSI reference resource, and (iii) an UL time slot n'. The BS further includes a transceiver operably coupled to the processor. The transceiver is configured to transmit the configuration and receive the CSI report in the UL time slot n'. The CSI report is based on the CSI reference resource and is valid for the set of time slots. The set of time slots includes at least one time slot i after a time slot $n_{ref}$ of the CSI reference resource, implying $n_{ref}$<i.

In yet another embodiment, a method performed by a UE is provided. The method includes receiving a configuration about a CSI report. The configuration includes information indicating (i) a set of time slots that the CSI report is valid for, (ii) a CSI reference resource, and (iii) an uplink (UL) time slot n'. The method further includes, based on the configuration, identifying the set of time slots and the CSI reference resource and determining, based on the CSI reference resource, the CSI report for the identified set of time slots. The method includes transmitting the CSI report in the UL time slot n'. The set of time slots includes at least one time slot i after a time slot $n_{ref}$ of the CSI reference resource, implying $n_{ref}$<i.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of. A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
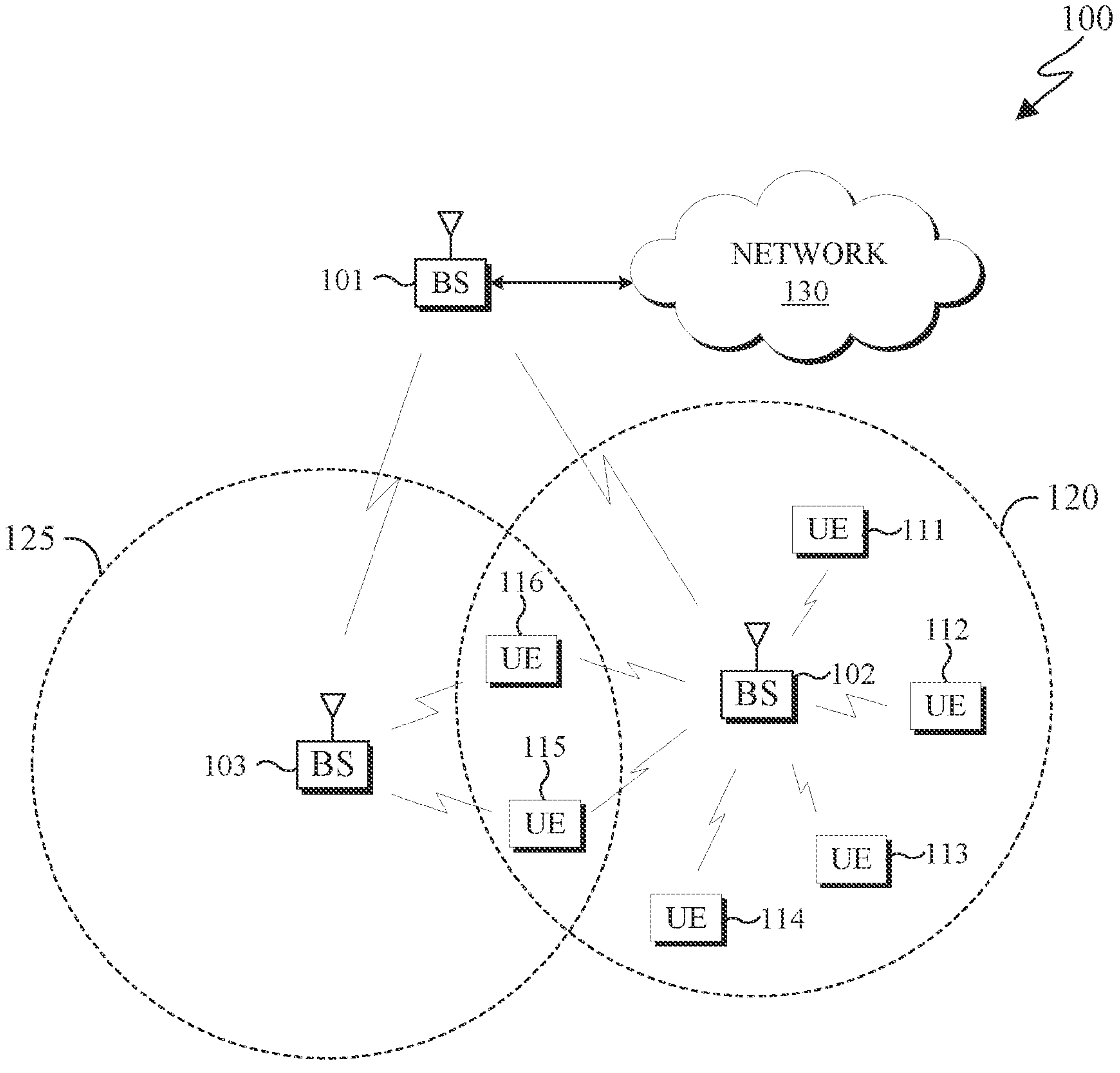
FIG. 1 illustrates an example wireless network according to embodiments of the present disclosure.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TR 22.891 v1.2.0 (herein "REF 6"); 3GPP TS 38.212 v17.0.0, "E-UTRA, NR, Multiplexing and channel coding" (herein "REF 7"); 3GPP TS 38.214 v17.0.0; "NR, Physical Layer Procedures for Data" (herein "REF 8"); RP-192978, "Measurement results on Doppler spectrum for various UE mobility environments and related CSI enhancements," Fraunhofer IIS, Fraunhofer HHI, Deutsche Telekom (herein "REF 9"); 3GPP TS 38.211 v17.0.0, and "E-UTRA, NR, Physical channels and modulation" (herein "REF 10").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
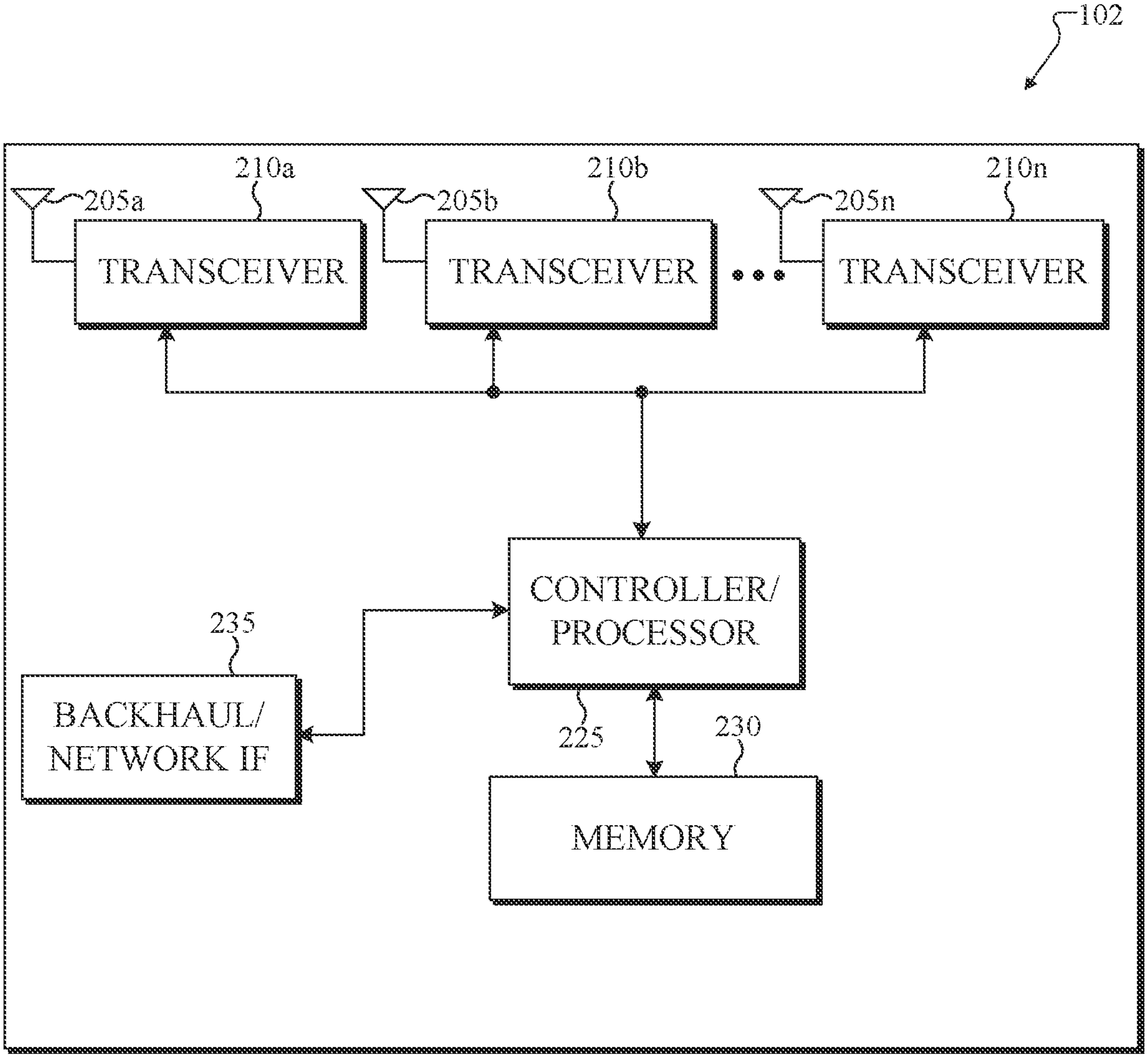
FIG. 2 illustrates an example gNodeB (gNB) according to embodiments of the present disclosure.
Figure 3:
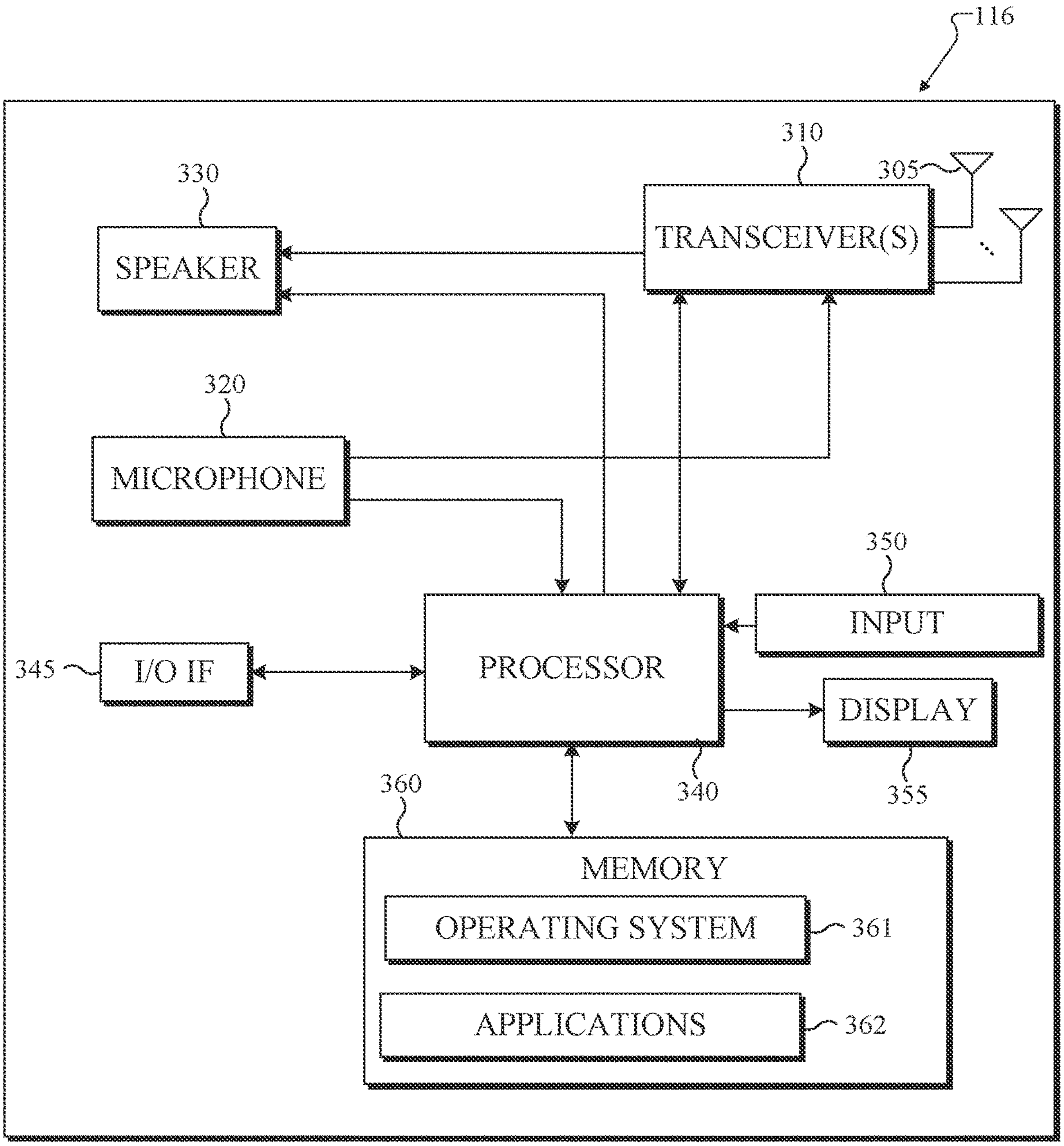
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting CSI reference resource and reporting window. In certain embodiments, one or more of the BSs 101-103 include circuitry, programing, or a combination thereof for supporting CSI reference resource and reporting window.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for CSI reference resource and reporting window. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for utilizing a CSI reference resource and reporting window as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
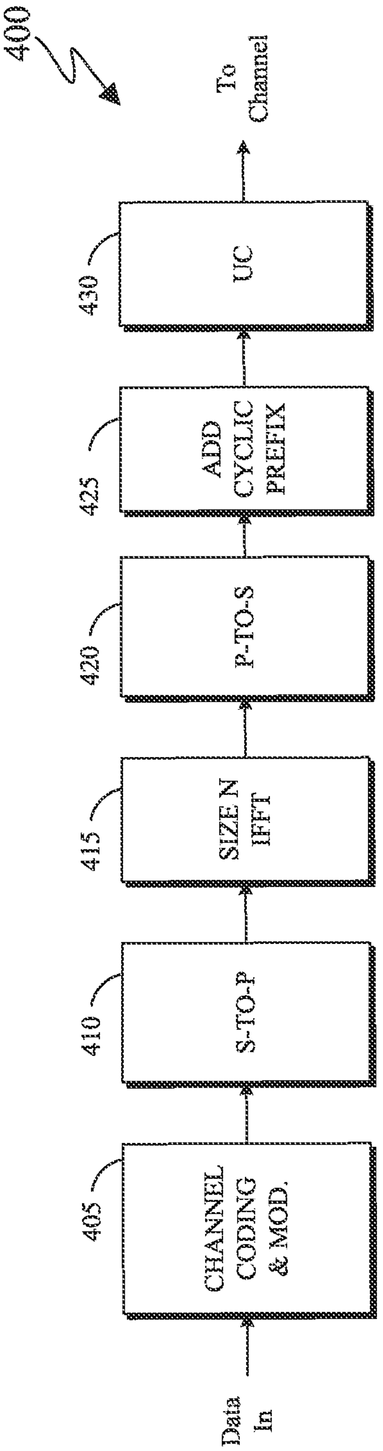
FIGS. 4 and 5 illustrate example wireless transmit and receive paths according to embodiments of the present disclosure.
Figure 5:
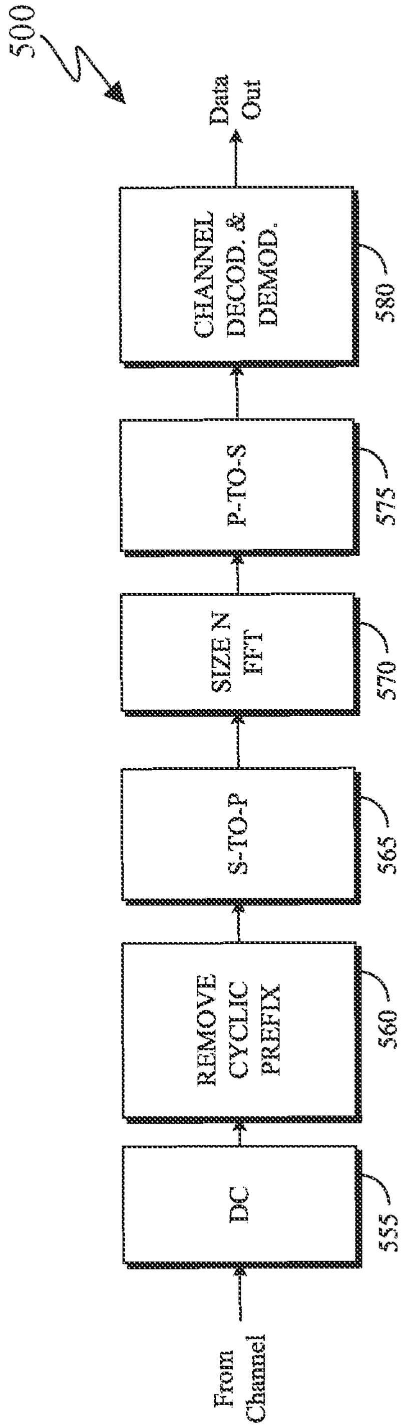

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support CSI reference resource and reporting window as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH)—see also REF 3. An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $$N_{sc}^{RB}$$

sub-carriers, or resource elements (REs), such as 12 REs. A unit of one RB over one subframe is referred to as a PRB. A UE can be allocated $M_{PDSCH}$ RBs for a total of $$M_{sc}^{PDSCH} = M_{PDSCH} \cdot N_{sc}^{RB}$$

REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also REF 3).

An UL subframe (or slot) includes two slots. Each slot includes $$N_{symb}^{UL}$$

symbols for transmitting data information, UCI, DMRS, or SRS. A frequency resource unit of an UL system BW is an RB. A UE is allocated $N_{RB}$ RBs for a total of $$N_{RB} \cdot N_{sc}^{RB}$$

REs for a transmission BW. For a PUCCH, $N_{RB}=1$. A last subframe symbol can be used to multiplex SRS transmissions from one or more UEs. A number of subframe symbols that are available for data/UCI/DMRS transmission is $$N_{symb} = 2 \cdot (N_{symb}^{UL} - 1) - N_{SRS},$$

where $N_{SRS}=1$ if a last subframe symbol is used to transmit SRS and $N_{SRS}=0$ otherwise.

Figure 6:
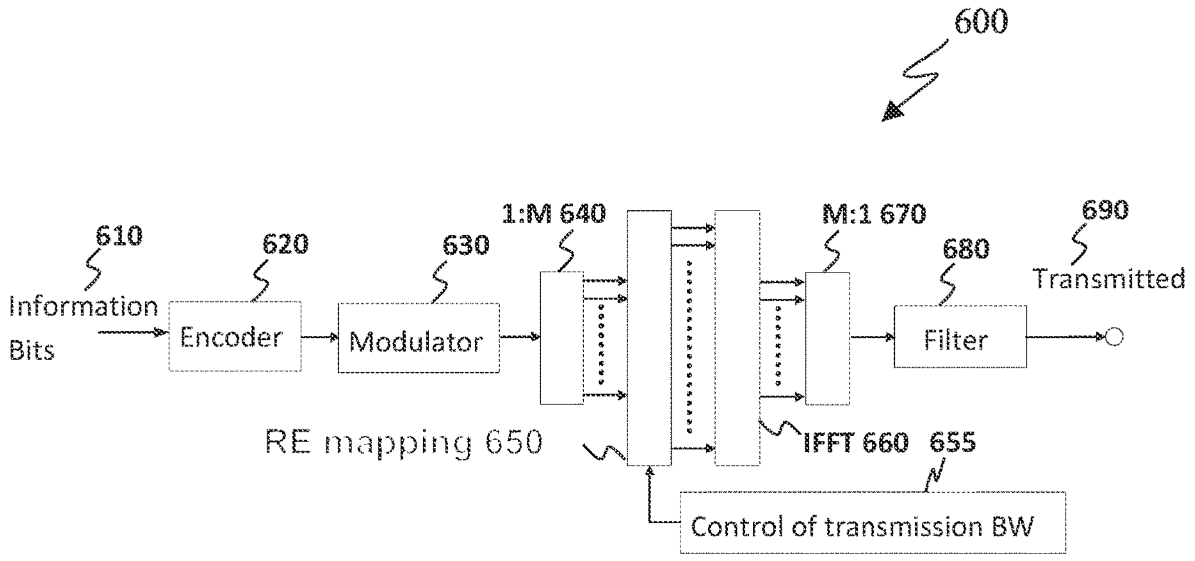
FIG. 6 illustrates a transmitter block diagram for a physical downlink shared channel (PDSCH) in a subframe according to embodiments of the present disclosure.

FIG. 6 illustrates a transmitter block diagram 600 for a PDSCH in a subframe according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
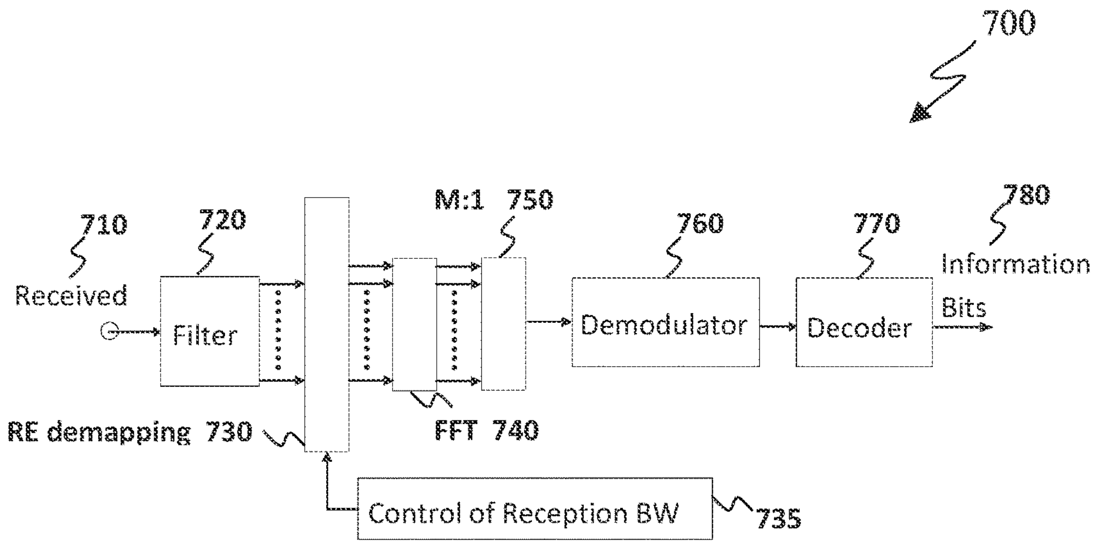
FIG. 7 illustrates a receiver block diagram for a PDSCH in a subframe according to embodiments of the present disclosure.

FIG. 7 illustrates a receiver block diagram 700 for a PDSCH in a subframe according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
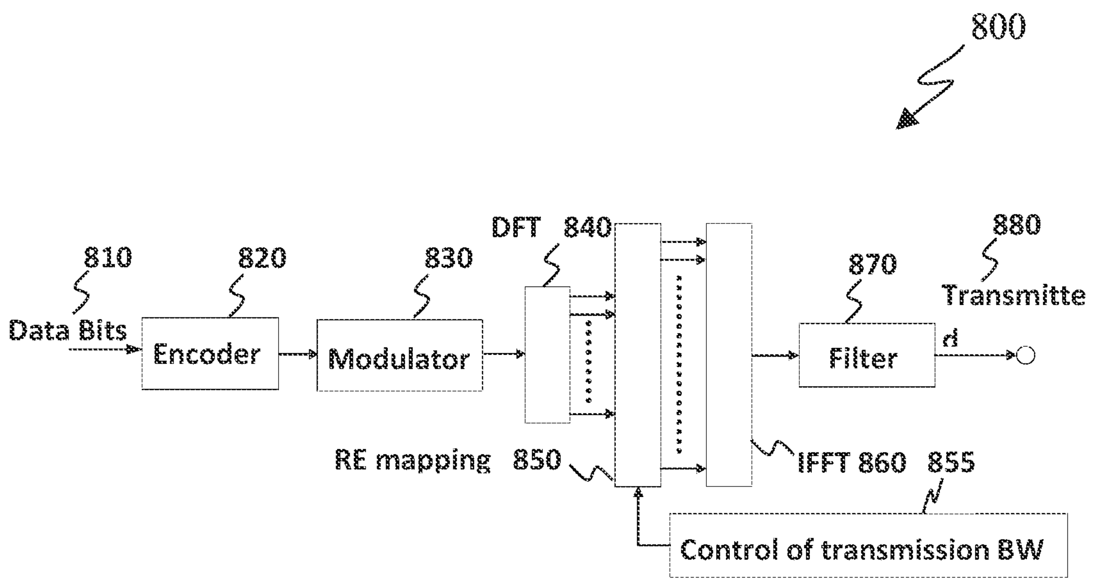
FIG. 8 illustrates a transmitter block diagram for a physical uplink shared channel (PUSCH) in a subframe according to embodiments of the present disclosure.

FIG. 8 illustrates a transmitter block diagram 800 for a PUSCH in a subframe according to embodiments of the present disclosure. One or more of the components illustrated in FIG. 7 can be implemented in specialized circuitry configured to perform the noted functions or one or more of the components can be implemented by one or more processors executing instructions to perform the noted functions. The embodiment of the block diagram 800 illustrated in FIG. 8 is for illustration only. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
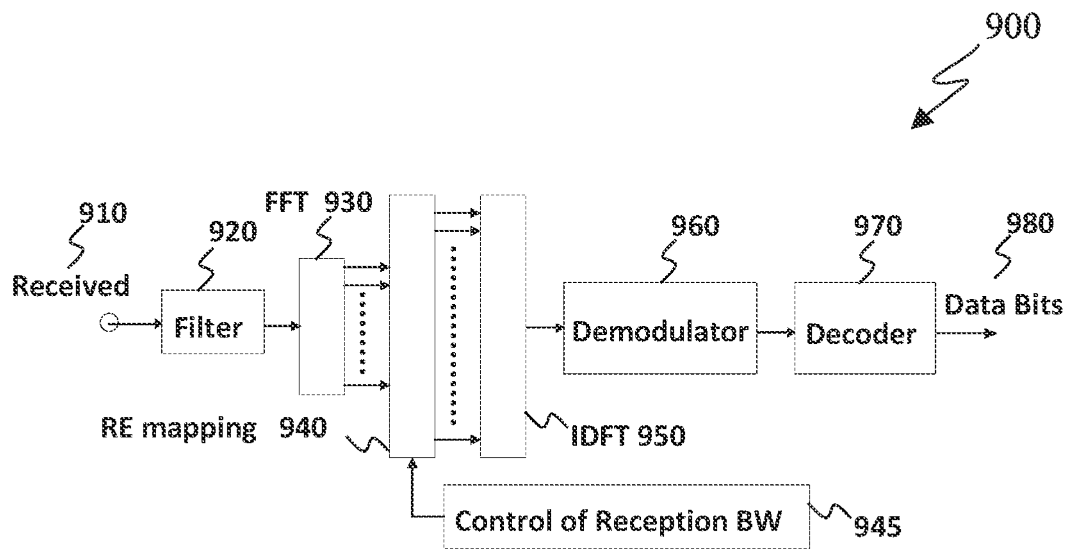
FIG. 9 illustrates a receiver block diagram for a PUSCH in a subframe according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
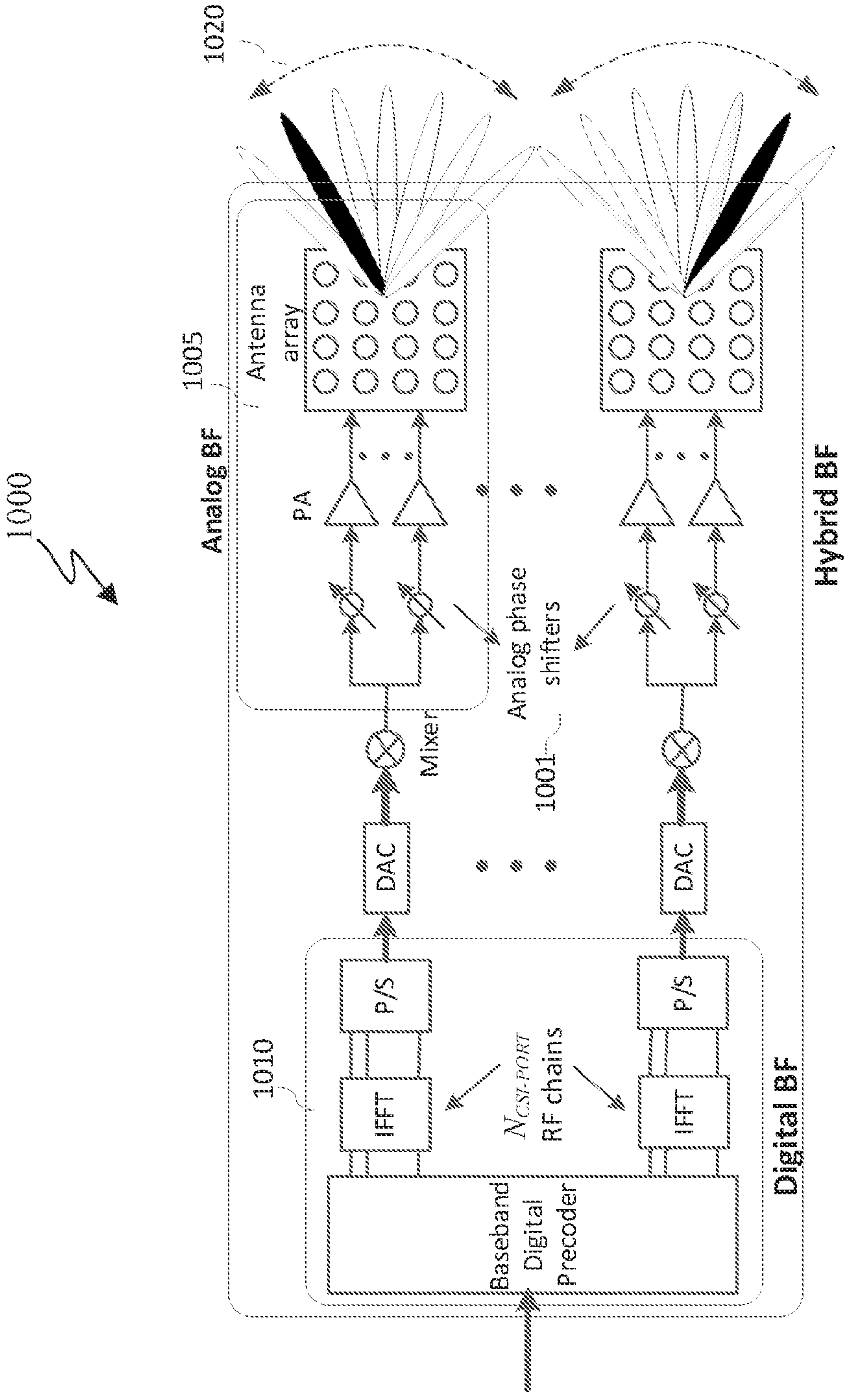
FIG. 10 illustrates an example antenna blocks or arrays forming beams according to embodiments of the present disclosure.

FIG. 10 illustrates an example antenna blocks or arrays 1000 according to embodiments of the present disclosure. The embodiment of the antenna blocks or arrays 1000 illustrated in FIG. 10 is for illustration only. FIG. 10 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports $N_{CSI\text{-}PORT}$. A digital beamforming unit 1010 performs a linear combination across $N_{CSI\text{-}PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement can be considered: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (including multiple ports). Here, (at least at a given time/ frequency) CSI-RS ports have narrow beam widths and hence not cell wide coverage, and (at least from the eNB (or gNB) perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of its representation thereof). To facilitate such a procedure, a first BF CSI-RS transmitted with periodicity T1 (ms), and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In a wireless communication system, MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is 'implicit' in the form of CQI/PMI/RI (also CRI and LI) derived from a codebook assuming SU transmission from eNB (or gNB).

In 5G or NR systems [REF7, REF8], the above-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $$\frac{P_{CSI-RS}}{2}$$

CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

It has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. In Rel. 17, such a codebook is supported (which is referred to as Rel. 17 further enhanced Type II port selection codebook in REF8).

Various embodiments of the present disclosure recognize that when the UE speed is in a moderate or high speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is needed, which is based on the time-domain (TD) variations or Doppler components of the channel. As described in [REF9], the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When RS is CSI-RS, the UE measures a CSI-RS burst, and use it to obtain Doppler components of the DL channel, and when RS is SRS, the gNB measures an SRS burst, and use it to obtain Doppler components of the UL channel. The obtained Doppler components can be reported by the UE using a codebook (as part of a CS report). Or the gNB can use the obtained Doppler components of the UL channel to beamform CSI-RS for CSI reporting by the UE.

Figure 11:
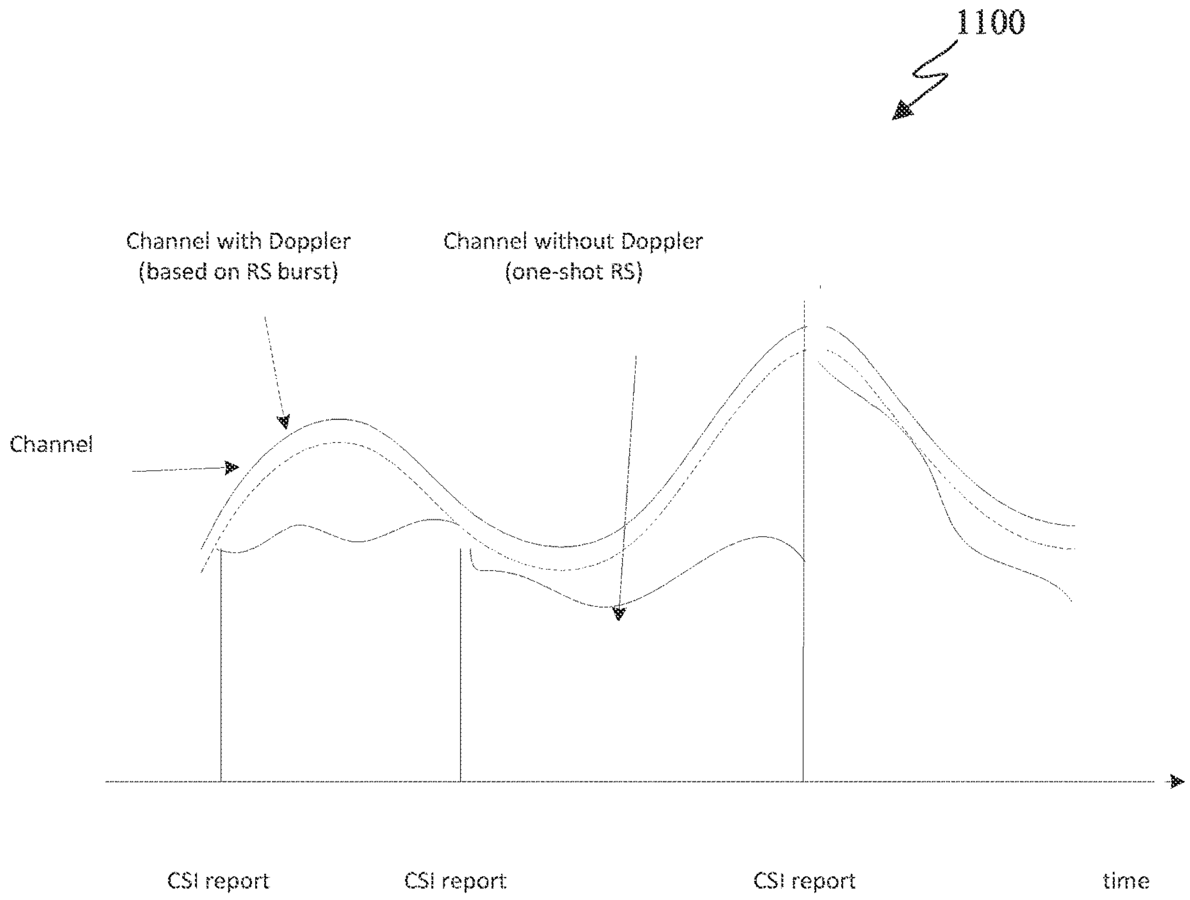
FIG. 11 illustrates channel measurement with and without Doppler components according to embodiments of the present disclosure.

FIG. 11 illustrates channel measurement with and without Doppler components 1100 according to embodiments of the present disclosure. The embodiment of the channel measurement with and without Doppler components 1100 illustrated in FIG. 11 is for illustration only. FIG. 11 does not limit the scope of this disclosure to any particular implementation of the channel measurement with and without Doppler components.

An illustration of channel measurement with and without Doppler components is shown in FIG. 11. When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

As described, measuring an RS burst is needed in order to obtain the Doppler components of the channel. Various embodiments of the present disclosure provide example embodiments on measuring an RS burst (measuring time varying channel over a measurement window) and reporting of TD channel properties (such as Doppler components of the channel).

Various embodiments of the present disclosure provide mechanisms for acquisition of time-domain channel properties (TDCP) at the gNB. In particular, various embodiments relate to the reporting TDCP based on an RS burst measurement. Various embodiments of the present disclosure provide mechanisms for event-triggered TDCP reporting based on TRS measurements, signaling/configuration details of TDCP reporting, and medium (e.g., UL MAC CE) for TDCP reporting.

Various embodiments of the present disclosure provide mechanisms for CSI acquisition at the gNB. In particular, various embodiments relate to the CSI reporting based on a high-resolution (or Type II) codebook comprising spatial-, frequency- and time- (Doppler-) domain components. Various embodiments of the present disclosure provide mechanisms for CSI reference resource, CSI reporting window, and the relation between DD/TD basis vector length and CSI reference resource, CSI-RS measurement window, and CSI reporting window.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can include one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" or bandwidth part (BWP) can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or Li DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with Mn subbands when one CSI parameter for all the Mn subbands within the CSI reporting band. A CSI parameter is configured with "subband" for the CSI reporting band with Mn subbands when one CSI parameter is reported for each of the Mn subbands within the CSI reporting band.

Figure 12:
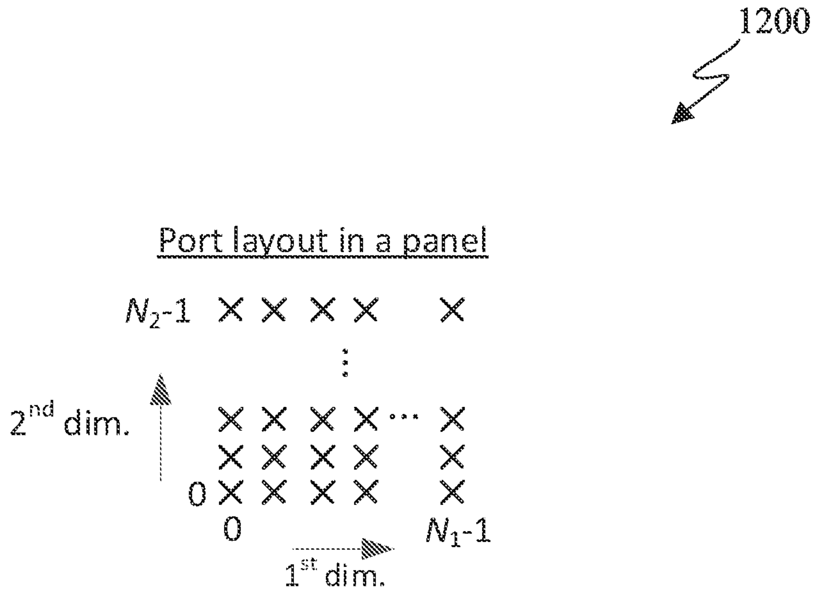
FIG. 12 illustrates an example antenna port layout according to embodiments of the present disclosure.

FIG. 12 illustrates an example antenna port layout 1200 according to embodiments of the present disclosure. The embodiment of the antenna port layout 1200 illustrated in FIG. 12 is for illustration only. FIG. 12 does not limit the scope of this disclosure to any particular implementation of the antenna port layout.

As illustrated in FIG. 12, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$ when each antenna maps to an antenna port. An illustration is shown in FIG. 12 where "X" represents two antenna polarizations. In this disclosure, the term "polarization" refers to a group of antenna ports. For example, antenna ports $$j = X + 0, X + 1, \ldots, X + \frac{P_{CSIRS}}{2} - 1$$

comprise a first antenna polarization, and antenna ports $$j = X + \frac{P_{CSIRS}}{2}, X + \frac{P_{CSIRS}}{2} + 1, \ldots, X + P_{CSIRS} - 1$$

comprise a second antenna polarization, where $P_{CSIRS}$ is a number of CSI-RS antenna ports and X is a starting antenna port number (e.g., X=3000, then antenna ports are 3000, 3001, 3002, . . . ).

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination-based Type II CSI reporting framework is extended to include a frequency dimension in addition to the first and second antenna port dimensions.

Figure 13:
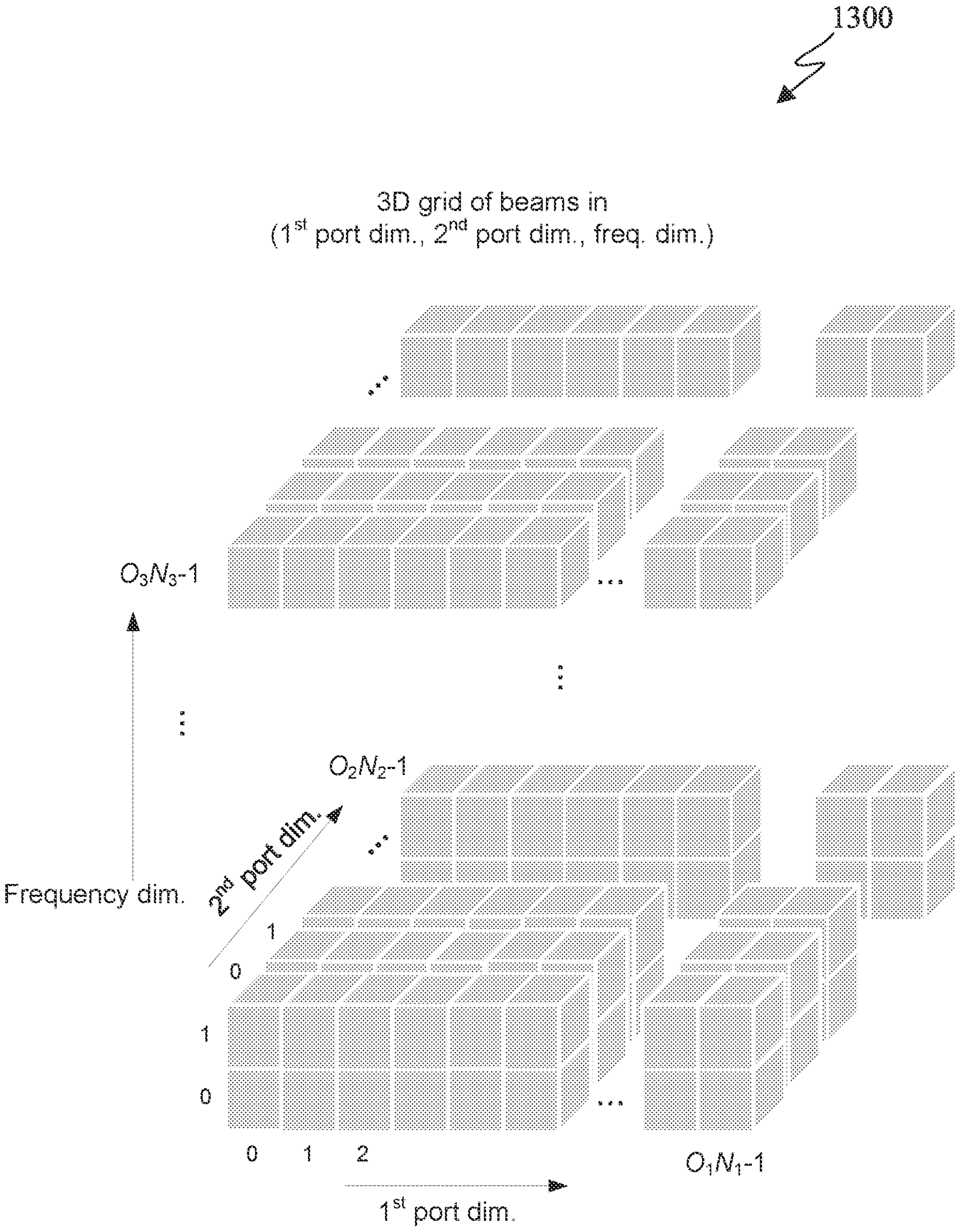
FIG. 13 illustrates a 3D grid of oversampled discrete Fourier transform (DFT) beams according to embodiments of the present disclosure.

FIG. 13 illustrates a 3D grid of oversampled DFT beams 1300 according to embodiments of the present disclosure. The embodiment of the 3D grid of oversampled DFT beams 1300 illustrated in FIG. 13 is for illustration only. FIG. 13 does not limit the scope of this disclosure to any particular implementation of the 3D grid of oversampled DFT beams.

As illustrated, FIG. 13 shows a 3D grid 1300 of the oversampled DFT beams (1st port dim., 2nd port dim., freq. dim.) in which

- a 1st dimension is associated with the 1st port dimension,
- a 2nd dimension is associated with the 2nd port dimension, and
- a 3rd dimension is associated with the frequency dimension.

The basis sets for 1st and 2nd port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In one example, $O_1=O_2=4$ and $O_3=1$. In another example, the oversampling factors $O_i$ belongs to {2, 4, 8}. In yet another example, at least one of $O_1$, $O_2$, and $O_3$ is higher layer configured (via RRC signaling).

As explained in Section 5.2.2.2.6 of REF8, a UE is configured with higher layer parameter codebookType set to 'typeII-PortSelection-r16' for an enhanced Type II CSI reporting in which the pre-coders for all SBs and for a given layer l=1, . . . v, where v is the associated RI value, is given by either $$W^l = AC_lB^H = [a_0\ a_1\ \dots\ a_{L-1}]\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix}[b_0\ b_1\ \dots\ b_{M-1}]^H = \sum_{f=0}^{M-1}\sum_{i=0}^{L-1} c_{l,i,f}(a_i b_f^H) = \sum_{i=0}^{L-1}\sum_{f=0}^{M-1} c_{l,i,f}(a_i b_f^H), \text{ or} \quad \text{(Eq. 1)}$$

$$W^l = \begin{bmatrix} A & 0 \\ 0 & A \end{bmatrix} C_l B^H = \begin{bmatrix} a_0 a_1 \dots a_{L-1} & 0 \\ 0 & a_0 a_1 \dots a_{L-1} \end{bmatrix}\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix}[b_0\ b_1\ \dots\ b_{M-1}]^H = \begin{bmatrix} \sum_{f=0}^{M-1}\sum_{i=0}^{L-1} c_{l,i,f}(a_i b_f^H) \\ \sum_{f=0}^{M-1}\sum_{i=0}^{L-1} c_{l,i+L,f}(a_i b_f^H) \end{bmatrix}, \quad \text{(Eq. 2)}$$

where:

- $N_1$ is a number of antenna ports in a first antenna port dimension (having the same antenna polarization),
- $N_2$ is a number of antenna ports in a second antenna port dimension (having the same antenna polarization),
- $P_{CSI-RS}$ is a number of CSI-RS ports configured to the UE,
- $N_3$ is a number of SBs for PMI reporting or number of FD units or number of FD components (that comprise the CSI reporting band) or a total number of precoding matrices indicated by the PMI (one for each FD unit/component),
- $a_i$ is a $2N_1N_2\times1$ (Eq. 1) or $N_1N_2\times1$ (Eq. 2) column vector, and $a_i$ is a $N_1N_2\times1$ port selection column vector if antenna ports at the gNB are co-polarized, and is a $2N_1N_2\times1$ port selection column vector if antenna ports at the gNB are dual-polarized or cross-polarized, where a port selection vector is a defined as a vector which contains a value of 1 in one element and zeros elsewhere,
- $b_f$ is a $N_3\times1$ column vector,
- $c_{l,i,f}$ is a complex coefficient.

In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f}\times c_{l,i,f}$, where:

- $x_{l,i,f}=1$ if the coefficient $c_{l,i,f}$ is reported by the UE according to some embodiments of this disclosure.
- $x_{l,i,f}=0$ otherwise (i.e., $c_{l,i,f}$ is not reported by the UE).

The indication whether $x_{l,i,f}=1$ or 0 is according to some embodiments of this disclosure. For example, it can be via a bitmap.

In a variation, the precoder equations Eq. 1 or Eq. 2 are respectively generalized to $$W^l = \sum_{i=0}^{L-1}\sum_{f=0}^{M_i-1} c_{l,i,f}(a_i b_{i,f}^H) \text{ and} \quad \text{(Eq. 3)}$$

$$W^l = \begin{bmatrix} \sum_{i=0}^{L-1}\sum_{f=0}^{M_i-1} c_{l,i,f}(a_i b_{i,f}^H) \\ \sum_{i=0}^{L-1}\sum_{f=0}^{M_i-1} c_{l,i+L,f}(a_i b_{i,f}^H) \end{bmatrix}, \quad \text{(Eq. 4)}$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i\le M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}}[W^1\ W^2\ \dots\ W^R].$$

Eq. 2 is assumed in the rest of the disclosure. The embodiments of the disclosure, however, are general and are also application to Eq. 1, Eq. 3 and Eq. 4.

Here $$L \le \frac{P_{CSI-RS}}{2} \text{ and } M \le N_3. \text{ If } L = \frac{P_{CSI-RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by $$w_f = \begin{bmatrix} 1 & e^{j\frac{2\pi n_{3,l}^{(f)}}{O_3N_3}} & e^{j\frac{2\pi\cdot 2n_{3,l}^{(f)}}{O_3N_3}} & \dots & e^{j\frac{2\pi\cdot(N_3-1)n_{3,l}^{(f)}}{O_3N_3}} \end{bmatrix}^T.$$

When $O_3=1$, the FD basis vector for layer $l\in\{1, \dots, v\}$ (where v is the RI or rank value) is given by $$w_f = [y_{0,l}^{(f)}\ y_{1,l}^{(f)}\ \dots\ y_{N_3-1,l}^{(f)}]^T,$$

$$\text{where } y_{t,l}^{(f)} = e^{j\frac{2\pi t n_{3,l}^{(f)}}{N_3}} \text{ and}$$

$$n_{3,l} = [n_{3,l}^{(0)}, \dots, n_{3,l}^{(M-1)}] \text{ where } n_{3,l}^{(f)} \in \{0, 1, \dots, N_3-1\}.$$

In another example, discrete cosine transform DCT basis is used to construct/report basis B for the 3rd dimension. The m-th column of the DCT compression matrix is simply given by $$[W_f]_{nm} = \begin{cases} \frac{1}{\sqrt{K}}, n = 0 \\ \sqrt{\frac{2}{K}} \cos\frac{\pi(2m+1)n}{2K}, n = 1, \ldots K-1 \end{cases},$$

and $K=N_3$, and $m=0, \ldots, N_3-1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \quad \text{(Eq. 5)}$$

where $A=W_1$ corresponds to the Rel. 15 $W_1$ in Type II CSI codebook [REF8], and $B=W_f$.

The $C_l=\tilde{W}_2$ matrix includes all the required linear combination coefficients (e.g., amplitude and phase or real or imaginary). Each reported coefficient ($c_{l,i,f}=p_{l,i,f}\phi_{l,i,f}$) in $\tilde{W}_2$ is quantized as amplitude coefficient ($p_{l,i,f}$) and phase coefficient ($\phi_{l,i,f}$).

The above-mentioned framework (equation 5) represents the precoding-matrices for multiple ($N_3$) FD units using a linear combination (double sum) over 2L SD beams and $M_v$ FD beams. This framework can also be used to represent the precoding-matrices in time domain (TD) by replacing the FD basis matrix $W_f$ with a TD basis matrix $W_t$, wherein the columns of $W_t$ comprises $M^v$ TD beams that represent some form of delays or channel tap locations. Hence, a precoder $W^l$ can be described as follows.

$$W = A_l C_l B_l^H = W_1 \tilde{W}_2 W_t^H, \quad \text{(5A)}$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The present disclosure focuses on a measuring a CS-RS burst that can be used to obtain time-domain (TD) or Doppler-domain (DD) component(s)/properties of the channel. The measured channel can be used to report TDCP or DD components, either alone (separate) or together with the other CSI components (e.g., based on space-frequency compression).

The abovementioned framework for CSI reporting based on space-frequency compression (equation 5) or space-time compression (equation 5A) frameworks can be extended to Doppler domain (e.g., for moderate to high mobility UEs). The present disclosure focuses on a CS-RS burst that can be used to obtain Doppler component(s) of the channel, which can be used to perform Doppler domain (DD) compression. In particular, the disclosure provides embodiments regarding the granularity or unit of the components across which the DD compression is performed, where each component corresponds to one or multiple time instances within a CSI-RS burst or across multiple CSI-RS bursts.

Figure 14:
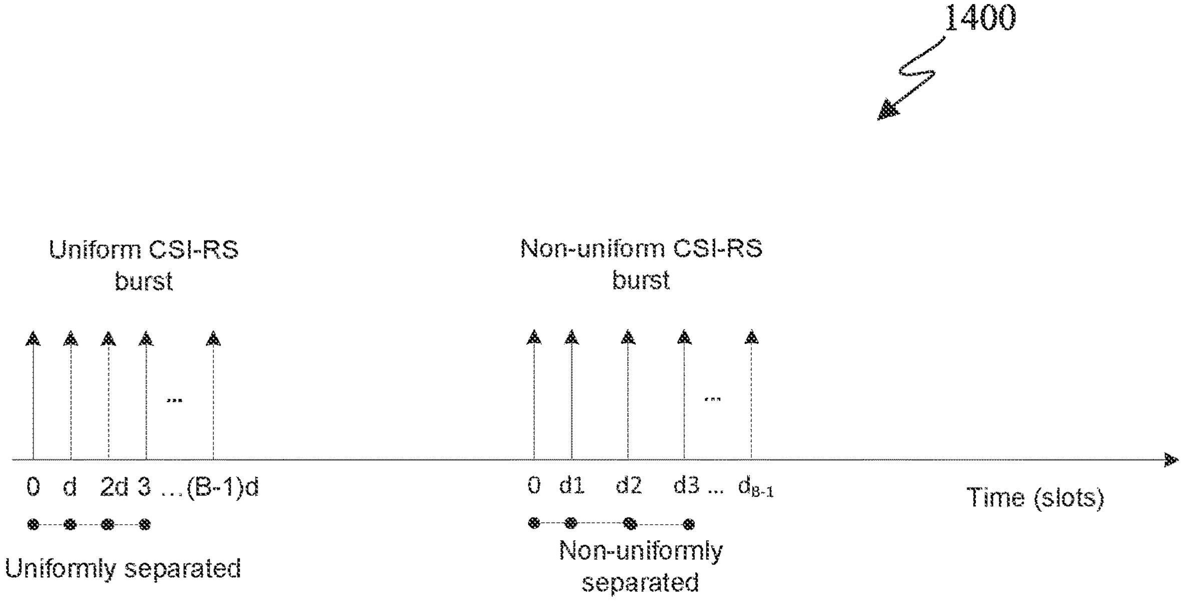
FIG. 14 illustrates an example of a UE configured to receive a burst of non-zero power (NZP) CSI-RS resource(s) according to embodiments of the present disclosure.

FIG. 14 illustrates an example of a UE configured to receive a burst of non-zero power (NZP) CSI-RS resource(s) 1400 according to embodiments of the present disclosure. The embodiment of the example of a UE configured to receive a burst of non-zero power (NZP) CSI-RS resource(s) 1400 illustrated in FIG. 14 is for illustration only. FIG. 14 does not limit the scope of this disclosure to any particular implementation of the example of a UE configured to receive a burst of non-zero power (NZP) CSI-RS resource(s).

In one embodiment, as shown in FIG. 14, a UE is configured to receive a burst of non-zero power (NZP) CSI-RS resource(s), referred to as CSI-RS burst for brevity, within B time slots comprising a measurement window, where $B \geq 1$. The B time slots can be accordingly to at least one of the following examples.

- In one example, the B time slots are evenly/uniformly spaced with an inter-slot spacing d.
- In one example, the B time slots can be non-uniformly spaced with inter-slot spacing $e_1=d_1$, $e_2=d_2-d_1$, $e_3=d_3-d_2$, . . . so on, where $e_i \neq e_j$ for at least one pair (i,j) with $i \neq j$.

The UE receives the CSI-RS burst, estimates the B instances of the DL channel measurements, and uses the channel estimates to obtain the Doppler component(s) of the DL channel. The CSI-RS burst can be linked to (or associated with) a single CSI reporting setting (e.g., via higher layer parameter CSI-ReportConfig), wherein the corresponding CSI report includes an information about the Doppler component(s) of the DL channel.

Let $h_t$ be the DL channel estimate based on the CSI-RS resource(s) received in time slot $t \in \{0,1, \ldots, B-1\}$. When the DL channel estimate in slot t is a matrix $G_t$ of size $N_{Rx} \times N_{Tx} \times N_{Sc}$, then $h_t=\text{vec}(G_t)$, where $N_{Rx}$, $N_{Tx}$, and $N_{Sc}$ are number of receive (Rx) antennae at the UE, number of CSI-RS ports measured by the UE, and number of subcarriers in frequency band of the CSI-RS burst, respectively. The notation vec(X) is used to denote the vectorization operation wherein the matrix X is transformed into a vector by concatenating the elements of the matrix in an order, for example, $1 \rightarrow 2 \rightarrow 3 \rightarrow$ and so on, implying that the concatenation starts from the first dimension, then moves second dimension, and continues until the last dimension. Let $H_B=[h_0\ h_1\ \ldots\ h_{B-1}]$ be a concatenated DL channel. The Doppler component(s) of the DL channel can be obtained based on $H_B$. For example, $H_B$ can be represented as $$C\Phi^H = \sum_{s=0}^{N-1} c_s \phi_s^H$$

$\Phi=[\phi_0\ \phi_1\ \ldots\ \phi_{N-1}]$ is a Doppler domain (DD) basis matrix whose columns comprise basis vectors, $C=[c_0\ c_1\ \ldots\ c_{N-1}]$ is a coefficient matrix whose columns comprise coefficient vectors, and $N<B$ is the number of DD basis vectors. Since the columns of $H_B$ are likely to be correlated, a DD compression can be achieved when the value of N is small (compared to the value of B). In this example, the Doppler component(s) of the channel is represented by the DD basis matrix (and the coefficient matrix C.

In one embodiment, a UE is configured/activated/triggered to determine/report a CSI report or the UE initiates (or requests) reporting of a CSI report, where the CSI report includes a 'new quantity' for TDCP and/or Doppler component(s) of the channel. The CSI report may not include any other parameters (e.g., CSI parameters), i.e., it is a stand-alone report. Or the CSI report may include at least one additional parameter (E.g., CSI parameter), i.e., it is not a stand-alone report. When the CSI report is configured (by the NW), the configuration can be via higher layer (RRC). Or, when the CSI report is activated (by the NW), the activation command can be via MAC CE. Or, when the CSI report is triggered (by the NW), the triggering message can be via dynamic DCI signaling or a combination of MACE CE and DCI signaling.

In one example, the 'new quantity' corresponds to at least one of the following.

In one example, 'new quantity' or 'TDCP' or 'DD' is (or is based on or corresponds to) Doppler spread.

In one example, 'new quantity' or 'TDCP' or 'DD' is (or is based on or corresponds to) Doppler shift.

In one example, 'new quantity' or 'TDCP' or 'DD' is (or is based on or corresponds to) UE speed.

In one example, 'new quantity' or 'TDCP' or 'DD' is (or is based on or corresponds to) time-domain correlation.

In one example, a linear prediction model is assumed to predict channel coefficient(s) (amplitude/phase) variations over time.

In one example, the linear prediction model corresponds to $c_t=p_1\times c_{t-1}$, where $c_t$ is a predicted channel coefficient at time slot t, and $p_1$ is a predictor coefficient. When t=1 (reference time), $c_0$ is a reference predictor coefficient, which can correspond to a reference (e.g., CSI reference resource) or a latest (TypeII) CSI reported in an earlier slot.

In one example, the linear prediction model corresponds to $c_t=p_1\times c_{t-1}+p_2\times c_{t-2}$, where $c_t$ is a predicted channel coefficient at time slot t, and $p_i$ for i=1,2 is a predictor coefficient. When t=1 (reference time), $c_0$ is a reference predictor coefficient, which can correspond to a reference (e.g., CSI reference resource) or a latest (TypeII) CSI reported in an earlier slot.

In one example, the linear prediction model corresponds to $$c_t = \sum_{i=1}^{p} p_i c_{t-i},$$

where p is a number (length) of predictor coefficients, $c_t$ is a predicted channel coefficient at time slot t, and $p_i$ for i=1,2 is a predictor coefficient. When t=1 (reference time), $c_0$ is a reference predictor coefficient, which can correspond to a reference (e.g., CSI reference resource) or a latest (TypeII) CSI reported in an earlier slot.

In one example, a time-domain or DD compression is used to report time domain correlation. For example, a CSI-RS burst (e.g., based on a TRS) measured within a measurement window, details as described in this disclosure, can be used to obtain time-domain channel measurements within the measurement window and a Type II (linear combination of basis vectors) like framework is includes report compressed time-domain or DD channel components. In one example, the reported content includes a set of N basis vectors (e.g., TD or DD basis vectors) $\Phi=[\phi_0\ \phi_1 \ldots \phi_{N-1}]$ (e.g., DFT) and corresponding coefficients $\{c_0, \ldots c_{N-1}\}$. In one example, vectors $\phi_0\ \phi_1 \ldots \phi_{N-1}$ can be length-N orthogonal DFT vectors. In one example, each coefficient is represented as $c_n=a_n\phi_n$, where $a_n$ and $\phi_n$ respectively are amplitude (or power) and phase values. In one example, amplitude/phase of all N coefficients are reported. In one example, amplitude/phase of N−1 coefficients are reported, and amplitude/phase of the one remaining coefficient $c_{n*}$ is not reported. The amplitude/phase of the coefficient $c_{n*}$ can be fixed (e.g., to 1). The index n* of the coefficient $c_{n*}$ can be fixed (e.g., to 1), or reported (e.g., as part of the reporting as the strongest/reference coefficient index), or is configured to the UE (e.g., via higher layer, or MAC CE, or DCI).

In one example, the configuration/activation/triggering and the reporting of the CSI report (including TDCP or DD components) are according to at least one of the following.

In one example, both the configuration/activation/triggering and the reporting of the CSI report are NW-controlled (or NW-initiated). For instance, the configuration of the CSI report can be via higher layer CSI-ReportConfig including reportQuantity set to 'new quantity' or 'TDCP' or 'DD', and the reporting is also configured to be via UCI (as configured by the NW), and the UCI can be reported via PUCCH or PUSCH. When the CSI report is periodic, the CSI report is reported according to the configuration. When the CSI report is SP, the CSI report is reported according to the activation command (or DCI) that activates the configured CSI report. When the CSI report is AP, the CSI report is reported according to the DCI trigger state that triggers the configured CSI report.

In one example, the CSI report can be reported on PUCCH. If the PUCCH transmission that includes the CSI report overlaps a PUSCH transmission, the uplink control information (UCI) with the CSI report is multiplexed in the PUSCH.

In one example, the CSI report can be included in UCI transmitted on PUSCH, wherein, the PUSCH transmission can be one of: a PUSCH transmission scheduled by an UL grant, or a configured grant PUSCH transmission of Type 1 or of Type 2, or a Msg3 PUSCH transmission for random access procedure Type 1, or a MsgA PUSCH transmission for random access procedure Type 2.

In one example, the configuration/activation/triggering of the CSI report is NW-controlled (or NW-initiated) and the reporting is UE-initiated. For instance, the configuration of the CSI report can be via higher layer (RRC), but the reporting is event-triggered (by the UE). For instance, when configured, the UE can trigger or initiate the reporting of the CSI report when an event of interest is detected. A few examples of the event of interest are as follows:

In one example, the event is based on UE speed (v). For instance, when the UE speed v is more than a threshold ($t_v$), i.e., $v>t_v$, the event is declared 'detected' or 'positive' and the UE triggers the CSI reporting (e.g., TDCP or DD). Or, when the UE speed v is equal or more than a threshold ($t_v$), i.e., $v\geq t_v$, the event is declared 'detected' or 'positive' and the UE triggers the CSI reporting (e.g., TDCP or DD). The threshold $t_v$ can be fixed, or configured (e.g., via higher layer RRC) or reported by the UE (e.g., via UE capability reporting).

In one example, the event is based on UE acceleration/deceleration (a). For instance, when the UE acceleration/deceleration a is more than a threshold ($t_a$), i.e., $a>t_a$, the event is declared 'detected' or 'positive' and the UE triggers the CSI reporting (e.g., TDCP or DD). Or, when the UE acceleration/deceleration a is equal or more than a threshold ($t_a$), i.e., $a \geq t_a$, the event is declared 'detected' or 'positive' and the UE triggers the CSI reporting (e.g., TDCP or DD). The threshold $t_a$ can be fixed, or configured (e.g., via higher layer RRC) or reported by the UE (e.g., via UE capability reporting).

In one example, the event is based on the slope of the UE speed (s). For instance, when the slope (s) of the UE speed is more than a threshold ($t_s$), i.e., $s>t_s$, the event is declared 'detected' or 'positive' and the UE triggers the CSI reporting (e.g., TDCP or DD). Or, when the slope (s) of the UE speed is equal or more than a threshold ($t_s$), i.e., $s \geq t_s$, the event is declared 'detected' or 'positive' and the UE triggers the CSI reporting (e.g., TDCP or DD). The threshold $t_s$ can be fixed, or configured (e.g., via higher layer RRC) or reported by the UE (e.g., via UE capability reporting).

In one example, the event is based on the Doppler spread (due to UE speed). For instance, when the Doppler spread (d) is more than a threshold ($t_d$), i.e., $d>t_d$, the event is declared 'detected' or 'positive' and the UE triggers the CSI reporting (e.g., TDCP or DD). Or, when the Doppler spread is equal or more than a threshold ($t_d$), i.e., $d \geq t_d$, the event is declared 'detected' or 'positive' and the UE triggers the CSI reporting (e.g., TDCP or DD). The threshold $t_d$ can be fixed, or configured (e.g., via higher layer RRC) or reported by the UE (e.g., via UE capability reporting).

In one example, the event is based on the Doppler shift (due to UE speed). For instance, when the Doppler shift (D) is more than a threshold ($t_D$), i.e., $D>t_D$, the event is declared 'detected' or 'positive' and the UE triggers the CSI reporting (e.g., TDCP or DD). Or, when the Doppler shift is equal or more than a threshold ($t_D$), i.e., $D \geq t_D$, the event is declared 'detected' or 'positive' and the UE triggers the CSI reporting (e.g., TDCP or DD). The threshold $t_D$ can be fixed, or configured (e.g., via higher layer RRC) or reported by the UE (e.g., via UE capability reporting).

In one example, the event is based on the cross-correlation or correlation in time (across multiple time instances). For instance, when the correlation ($\varphi$ is less than a threshold ($t_\rho$), i.e., $\rho<t_\rho$, the event is declared 'detected' or 'positive' and the UE triggers the CSI reporting (e.g., TDCP or DD). Or, when the correlation is equal or less than a threshold ($t_\rho$), i.e., $\rho \geq t_\rho$, the event is declared 'detected' or 'positive' and the UE triggers the CSI reporting (e.g., TDCP or DD). The threshold $t_\rho$ can be fixed, or configured (e.g., via higher layer RRC) or reported by the UE (e.g., via UE capability reporting).

In one example, the event is based on the relative Doppler shift(s) of a number of peaks in channel impulse response (CIR) (due to UE speed). For instance, when the relative Doppler shifts (D) is (are) more than a threshold ($t_D$), i.e., $D>t_D$, the event is declared 'detected' or 'positive' and the UE triggers the CSI reporting (e.g., TDCP or DD). Or, when the relative Doppler shifts is (are) equal or more than a threshold ($t_D$), i.e., $D \geq t_D$, the event is declared 'detected' or 'positive' and the UE triggers the CSI reporting (e.g., TDCP or DD). The threshold $t_D$ can be fixed, or configured (e.g., via higher layer RRC) or reported by the UE (e.g., via UE capability reporting).

In one example, the event is based on the relative Doppler shift(s) of different TRS resources. For instance, when the relative Doppler shifts (D) is (are) more than a threshold ($t_D$), i.e., $D>t_D$, the event is declared 'detected' or 'positive' and the UE triggers the CSI reporting (e.g., TDCP or DD). Or, when the relative Doppler shifts is (are) equal or more than a threshold ($t_D$), i.e., $D \geq t_D$, the event is declared 'detected' or 'positive' and the UE triggers the CSI reporting (e.g., TDCP or DD). The threshold $t_D$ can be fixed, or configured (e.g., via higher layer RRC) or reported by the UE (e.g., via UE capability reporting).

In one example, the UE is further configured with a timer (or prohibit timer), similar to the one configured for power headroom (PHR) reporting. This configuration can be via higher layer parameter (RRC), e.g., tdcp-ProhibitTimer-r18.

In one example, the UE is further configured with higher layer IE (via RRC) I which configures the UE-initiated CSI report (as described above), where the IE I includes components according to at least one of the following examples.

In one example, the IE I includes a threshold (as described in examples above).

In one example, the IE I includes a threshold (as described in examples above) and a prohibit timer.

In one example, the IE I includes a threshold (as described in examples above), a prohibit timer, TRS resource(s) or a set/pool/list of TRS resource(s), and a number (N) of TDCP reporting, where N>=1.

In one example, the UE I is TDCP-Report-r18. If TDCP-Report-r18 is configured, and tdcp-ProhibitTimer-r18 is not running, the CSI report (including TDCP) shall be triggered if the event of interest occurs (is detected), where the event is according to one of the examples herein and the threshold is configured via RRC parameter tdcp-Threshold-r18. Two examples of TDCP-Report-r18 are provided below.

```
TDCP-ReportConfig-r18 ::=          SEQUENCE {
   tdcp-ProhibitTimer-r18             ENUMERATED S1,
   tdcp-Threshold-r18               ENUMERATED S2,
   ...
}
Example: S1 = { sf0, sf10, sf20, sf50, sf100, sf200, sf500, sf1000}
Example: S2 = {v1, ... , vN}
TDCP-ReportConfig-r18 ::=          SEQUENCE {
   tdcp-ProhibitTimer-r18             ENUMERATED S1,
   tdcp-Threshold-r18               ENUMERATED S2,
   numberOfN-r18                  INTEGER(1 .. 4),
   tdcp-ResourcePool-r18                  SEQUENCE (SIZE(1..maxTDCP-Resources-r18)) OF
TDCP-Resource-r18,
   ...
}
Example: S1 = { sf0, sf10, sf20, sf50, sf100, sf200, sf500, sf1000}
Example: S2 = {v1, ... , vN}
```

In one example, the medium or channel to report the event-triggered (or UE-initiated) CSI report can be one of the following examples.

In one example, the CSI report is reported via a medium which is an UL MAC-CE entity (scheduled to be reported via PUSCH carrying UL MAC).

In one example, the UL MAC CE entity is a new 'dedicated' MAC CE for CSI reporting including TDCP.

In one example, an existing UL MAC CE is used for this reporting. For instance, UL MAC CE for PHR reporting can be used. In this case, the IE tdcp-Threshold-r18 can be configured via IE PHR-Config.

In one example, the CSI report can be reported via a combination of the UL MAC CE and the UCI. That is a portion of the CSI report is reported via MAC-CE (scheduled to be reported via PUSCH carrying UL MAC), and the remaining portion of the CSI report is reported via the UCI (e.g., PUCCH, or PUSCH scheduled to carry UCI).

In one example, a two-part CSI reporting via MAC CE is used (similar to two-part UCI reporting). A first part of the CSI report includes a fixed portion (components) of the CSI report, and the second part of the CSI reporting includes the remaining portion of the CSI report. Alternatively, whether the UE supports the two-part CSI reporting via the MAC CE is subject to (conditioned on) the UE capability. That is, only when the UE supports two-part CSI reporting via MAC CE, the UE can be configured with such reporting; otherwise (when the UE doesn't support), the UE can't be configured with two-part CSI reporting via MAC CE, hence the CSI reporting can only be via (one part) CSI reporting via MAC CE and/or UCI.

In one example, the reporting of the CSI report is always UE-initiated. For example, the UE-initiated or event-triggered mechanism, as described in above examples, can be used as the trigger.

In one example, there is no configuration or signaling from NW regarding this report.

In one example, NW can (pre-) configure UL resource(s) to report UE-initiation (UE request) or a message about the detection of an event. Based on the UE-request (or message), the NW can grant UL resources and trigger the CSI report.

In one example, the reporting can be "triggered" explicitly only when (after) the UE reports/initiates the CSI reporting, for example, when the UE reports a message requesting resources for the CSI reporting via UL MAC CE entity. That is, the CSI request field in DCI can trigger the CSI reporting only when the NW receives the request via the UL MAC CE entity from the UE.

In one embodiment, the CSI reporting, as described herein, can be configured based on (or linked to) $X \geq 1$ NZP CSI-RS resources (which can be included in a CSI-RS resource set). In one example, such NZP CSI-RS resources correspond to TRS resources (CSI-RS resources configured for tracking). When $X>1$, at least one of the following examples is used/configured for reporting.

In one example, one TDCP or DD components of the channel is reported per CSI-RS resource. So, there are X separate reports (one for each CSI-RS resource) or X components (one for each CSI-RS resource) in the (single) reported CSI report. In this case, the UE determine the multiple reports/components using the respective CSI-RS resource.

In one example, one (joint) TDCP or DD components of the channel is reported across all CSI-RS resources (regardless of the value of X). In this case, the UE can combine/aggregate all CSI-RS measurements across all resources, and then determine the report using the aggregated measurements.

In one example, a subset of Z CSI-RS resources can be selected, and the TDCP or DD components of the channel can be reported only using (for) the selected CSI-RS resources. The information (e.g., Z value and/or the indices of the selected resources) about the selection can be provided/reported by the UE, e.g., as part of the report. A two-part UCI is used when Z is reported by the UE. Or the value of Z can be fixed, or configured, and the information (e.g., the indices of the selected resources) about the selection can be provided/reported by the UE, e.g., as part of the report. For the selected resources, the report can be separate or one (joint).

The information about the selection can be reported via an indicator. In one example, a new indicator (separate from existing indicators) is used. In one example, an existing indicator is used. For example, CRI (or PMI or PMI component) is used.

In one example, one (single) joint indicator (new indicator, or CRI, or PMI, or PMI component) is used to indicate Z selected CSI-RS resource(s).

In one example, multiple separate indicator(s) is/are used, i.e., one indicator (new indicator, or CRI, or PMI, or PMI component) is used to indicate each of the Z selected CSI-RS resource(s).

In one embodiment, for TDCP or Doppler component reporting (or a CSI reporting that includes TDCP or Doppler components), a UE is configured to receive NZP CSI-RS resource(s) for tracking (aka TRS resources) either via a higher layer TDCP-ReportConfig-r18 or a CSI reporting setting (e.g., via higher layer CSI-ReportConfig).

The TDCP-ReportConfig-r18 includes NZP CSI-RS resource set(s) for tracking.

In one example, TDCP-ReportConfig-r18 contains (reference) ID(s) of $S \geq 1$ NZP CSI-RS resource set(s), and each NZP CSI-RS resource set is configured via higher layer NZP-CSI-RS-ResourceSet configured with higher layer parameter trs-Info.

In one example, TDCP-ReportConfig-r18 contains (reference) ID(s) of $N \geq 1$ NZP CSI-RS resource(s), and each NZP CSI-RS resource is a TRS resource, i.e., configured higher layer parameter trs-Info.

The CSI reporting setting is linked to a CSI resource setting (e.g., via higher layer CSI-ResourceConfig), and includes the higher layer parameter reportQuantity set to other than 'none', where the CSI resource setting includes NZP CSI-RS resource set(s) for tracking. That is, the CSI-Resource setting contains (reference) ID(s) of $S \geq 1$ NZP CSI-RS resource set(s), and each NZP CSI-RS resource set is configured via higher layer NZP-CSI-RS-ResourceSet configured with higher layer parameter trs-Info.

When the medium of the CSI reporting is UL MAC CE, the time domain reporting behavior of the CSI-ReportConfig is indicated by the higher layer parameter reportConfig Type and can be set to 'tdcpReporting-r18' or 'tdcpReportingOn_MACCE-r18' for CSI reporting via UL MAC CE (cf. TS 38.321), as described above.

Each NZP-CSI-RS-ResourceSet includes:

Either four periodic NZP CSI-RS resources in two consecutive slots with two periodic NZP CSI-RS resources in each slot, or two periodic NZP CSI-RS resources in one slot.

Such a NZP CSI-RS resource is referred to as tracking RS (TRS) later in this disclosure.

Also, NZP-CSI-RS-ResourceSet(s) may have the CSI-RS resources configured as:

- Periodic, with the CSI-RS resources in the NZP-CSI-RS-ResourceSet configured with same periodicity, bandwidth and subcarrier location.
- Periodic CSI-RS resources in one set and aperiodic CSI-RS resources in a second set, with the aperiodic CSI-RS and periodic CSI-RS resources having the same bandwidth (with same RB location) and the aperiodic CSI-RS being configured with qcl-Type set to 'typeA' and 'typeD', where applicable, with the periodic CSI-RS resources.

Each CSI-RS resource is configured by the higher layer parameter NZP-CSI-RS-Resource with some restrictions. For example, each resource is a single port CSI-RS resource with density p=3.

The rest of the details about NZP CSI-RS resources for tracking (TRS) can be as described in Section 5.1.6.1.1 of [REF8].

When TRS is configured for CSI (or TDCP or Doppler component) reporting with reportQuantity set to other than 'none', a value of S can be according to at least one of the following examples.

- In one example, a value of S is fixed (e.g., to S=1) when TRS is configured for CSI reporting with reportQuantity set to other than 'none'.
- In one example, a value of S is can be 1 or more than 1 (e.g., S=2) based on the configuration, The value S>1 can be subject to UE capability reporting (i.e., only when the UE supports, it can be configured).

Also, when TRS is configured for CSI (or TDCP or Doppler component) reporting with reportQuantity set to other than 'none', there can be at least one restriction on such a TRS. A few examples of the restriction are as follows.

- In one example, TRS can only be a periodic NZP CSI-RS resource.
- In one example, the periodicity and slot offset for periodic NZP CSI-RS resources, as given by the higher layer parameter periodicityAndOffset configured by NZP-CSI-RS-Resource, is $2^{\mu}X_p$ slots, where $X_p$ is fixed (e.g., 10) and where μ is defined in Clause 4.3 of [REF10].

Note that when TRS is a periodic NZP CSI-RS resource, it can be used/configured to measure a CSI-RS burst for TDCP or Doppler component reporting. This can be achieved by associating a measurement window (comprising B>1 time slots) from the TRS measurement instances/occasions to the reporting. In one example, the measurement window is defined/configured based on a CSI reference resource (cf. 5.2.2.5, REF8). In one example, the measurement window can be fixed, or configured, or reported by the UE. In one example, the measurement window can be identified based on a starting (first or reference) time slot (TO) and a number of time slots B (starting from the first time slot).

- In one example, both $T_0$ and B are fixed.
- In one example, both $T_0$ and B are configured.
- In one example, both $T_0$ and B are reported by the UE.
- In one example, $T_0$ is fixed and B is configured.
- In one example, $T_0$ is fixed and B is reported.
- In one example, $T_0$ is configured and B is fixed.
- In one example, $T_0$ is configured and B is reported.
- In one example, $T_0$ is reported and B is configured.
- In one example, $T_0$ is reported and B is fixed.

When configured, the measurement window is configured via RRC (e.g., as a parameter in CSI-ReportConfig). Or it is indicated via MAC CE or DCI. When reported, the measurement window is reported via CSI (e.g., as a CSI parameter).

When TRS is configured for CSI (or TDCP or Doppler component) reporting with reportQuantity set to other than 'none', the higher layer parameter timeRestrictionForChannelMeasurements in CSI-ReportConfig can be determined/configured according to at least one of the following examples.

- In one example, timeRestrictionForChannelMeasurements in CSI-ReportConfig is set to 'notConfigured'. The UE is expected to be configured with timeRestrictionForChannelMeasurements='notConfigured'. Or the UE is not expected to be configured with timeRestrictionForChannelMeasurements='configured'.
- In one example, timeRestrictionForChannelMeasurements in CSI-ReportConfig is set to 'configured'. The UE is expected to be configured with timeRestrictionForChannelMeasurements='configured'. Or the UE is not expected to be configured with timeRestrictionForChannelMeasurements='notConfigured'.

If the higher layer parameter timeRestrictionForChannelMeasurements in CSI-ReportConfig is set to 'notConfigured', the UE shall derive the channel measurements for CSI (or TDCP or Doppler component) reporting in uplink slot n based on only the NZP CSI-RS, no later than the CSI reference resource, (defined in REF10) associated with the CSI resource setting.

If the higher layer parameter timeRestrictionForChannelMeasurements in CSI-ReportConfig is set to 'configured', the UE shall derive the channel measurements for CSI (or TDCP or Doppler component) reporting in uplink slot n based on only the most recent, no later than the CSI reference resource, occasion of NZP CSI-RS (defined in REF10) associated with the CSI resource setting.

Depending on the value of the reportQuantity (for example, when CQI is included in the CSI reporting), at least one interference measurement resource (IMR) can also be configured via CSI-ReportConfig. The IMR can be a CSI-IM resource, or a NZP CSI-RS configured for interference measurement.

Examples of reportQuanity set to other than 'none' are provided later in this disclosure.

The content of the CSI report (including TDCP or Doppler components reporting) configured via reportQuantity set to other than 'none', as described above, is configured according to at least one of the following embodiments.

In one embodiment, reportQuantity set to other than 'none' corresponds to a separate report.

In one example, reportQuantity='new quantity' or 'TDCP' or 'DD', where the new quantity is according to (corresponds to) at least one of the examples herein.

In one example, reportQuantity=an existing indicator 'I', which indicates one of the TDCP or Doppler components as described in one or more examples herein.

In one example, 'I'='PMI' or 'PMI component'.

In one example, 'I'='CRI'.

The time-domain behavior for such reporting can be configured according to at least one of the following examples.

- In one example, the TD behavior is fixed to periodic (P).
- In one example, the TD behavior is fixed to semi-persistent on PUCCH (SPonPUCCH).
- In one example, the TD behavior is fixed to semi-persistent on PUSCH (SPonPUSCH).
- In one example, the TD behavior is fixed to aperiodic (AP).

In one example, the TD behavior is configured from {P, SPonPUCCH}.

In one example, the TD behavior is configured from {P, SPonPUSCH}.

In one example, the TD behavior is configured from {P, AP}.

In one example, the TD behavior is configured from {AP, SPonPUCCH}.

In one example, the TD behavior is configured from {AP, SPonPUSCH}.

In one example, the TD behavior is configured from {SPonPUCCH, SPonPUCCH}.

In one example, the TD behavior is configured from {P, SPonPUCCH, SPonPUCCH}.

In one example, the TD behavior is configured from {AP, SPonPUCCH, SPonPUCCH}.

In one example, the TD behavior is configured from {P, AP, SPonPUCCH}.

In one example, the TD behavior is configured from {P, AP, SPonPUSCH}.

In one example, the TD behavior is configured from {P, SPonPUCCH, SPonPUCCH, SP}.

When configured, the TD behavior of the CSI-ReportConfig is indicated by the higher layer parameter reportConfig Type.

In one embodiment, reportQuantity set to other than 'none' corresponds to a joint report, wherein the joint report comprises (A) the TDCP or Doppler component of the channel and (B) the other CSI parameters from {CRI, LI, PMI, CQI, RI}.

At least one of the following examples is used/configured regarding the reportQuantity.

In one example, reportQuantity set to 'cri-RI-LI-PMI-CQI-X', where cri-RI-LI-PMI-CQI corresponds to (B), and X corresponds to 'new quantity' or 'TDCP' or 'DD' for (A).

In one example, reportQuantity set to 'RI-LI-PMI-CQI-X', where RI-LI-PMI-CQI corresponds to (B), and X corresponds to 'new quantity' or 'TDCP' or 'DD' for (A).

In one example, reportQuantity set to 'cri-RI-PMI-CQI-X', where cri-RI-PMI-CQI corresponds to (B), and X corresponds to 'new quantity' or 'TDCP' or 'DD' for (A).

In one example, reportQuantity set to 'RI-PMI-CQI-X', where RI-PMI-CQI corresponds to (B), and X corresponds to 'new quantity' or 'TDCP' or 'DD' for (A).

In one example, reportQuantity set to 'cri-RI-CQI-X', where cri-RI-CQI corresponds to (B), and X corresponds to 'new quantity' or 'TDCP' or 'DD' for (A).

In one example, reportQuantity set to 'RI-CQI-X', where RI-CQI corresponds to (B), and X corresponds to 'new quantity' or 'TDCP' or 'DD' for (A).

In one example, reportQuantity set to 'cri-CQI-X', where cri-CQI corresponds to (B), and X corresponds to 'new quantity' or 'TDCP' or 'DD' for (A).

In one example, reportQuantity set to 'CQI-X', where CQI corresponds to (B), and X corresponds to 'new quantity' or 'TDCP' or 'DD' for (A).

In one example, reportQuantity set to 'cri-RI-LI-PMI-CQI', where (A) is reported jointly (together with) one of indicators from {CRI, LI, RI, PMI, CQI} for (B).

For example, PMI={X,Y}, where X corresponds to 'new quantity' or 'TDCP' or 'DD' for (A), and Y corresponds to the PMI components.

In one example, reportQuantity set to 'RI-LI-PMI-CQI', where (A) is reported jointly (together with) one of indicators from {LI, RI, PMI, CQI} for (B).

For example, PMI={X,Y}, where X corresponds to 'new quantity' or 'TDCP' or 'DD' for (A), and Y corresponds to the PMI components.

In one example, reportQuantity set to 'cri-RI-PMI-CQI', where (A) is reported jointly (together with) one of indicators from {CRI, RI, PMI, CQI} for (B).

For example, PMI={X,Y}, where X corresponds to 'new quantity' or 'TDCP' or 'DD' for (A), and Y corresponds to the PMI components.

In one example, reportQuantity set to 'RI-PMI-CQI', where (A) is reported jointly (together with) one of indicators from {RI, PMI, CQI} for (B).

For example, PMI={X,Y}, where X corresponds to 'new quantity' or 'TDCP' or 'DD' for (A), and Y corresponds to the PMI components.

In one example, reportQuantity set to 'cri-RI-CQI', where (A) is reported jointly (together with) one of indicators from {CRI, RI, CQI} for (B).

For example, RI={X,Y}, where X corresponds to 'new quantity' or 'TDCP' or 'DD' for (A), and Y corresponds to the RI component.

In one example, reportQuantity set to 'RI-CQI', where (A) is reported jointly (together with) one of indicators from {RI, CQI} for (B).

For example, RI={X,Y}, where X corresponds to 'new quantity' or 'TDCP' or 'DD' for (A), and Y corresponds to the RI component.

In one example, reportQuantity set to 'cri-CQI', where (A) is reported jointly (together with) one of indicators from {CRI, CQI} for (B).

For example, CQI={X,Y}, where X corresponds to 'new quantity' or 'TDCP' or 'DD' for (A), and Y corresponds to the CQI component.

In one example, reportQuantity set to 'CQI', where (A) is reported jointly (together with) CQI for (B).

For example, CQI={X,Y}, where X corresponds to 'new quantity' or 'TDCP' or 'DD' for (A), and Y corresponds to the CQI component.

The CQI reporting can help/assist NW implementations such as scaling for MU precoding. Also, the CQI reporting can provide accurate interference information to the NW.

At least one of the following examples is used/configured regarding the NZP CSI-RS resource(s) and/or resource set(s).

In one example, the NZP CSI-RS resource(s) are configured common for both (A) and (B). That is, the CSI-ResourceConfig includes CSI-RS resource set(s) that are used common for both (A) and (B). In one example, the number of resource sets is fixed to 1.

In one example, two types of resource sets linked to (configured within) a CSI reporting.

SetType1: CSI-RS resource set(s) configured with trs-Info, i.e., sets comprising TRS(s)

SetType2: CSI-RS resource set(s) configured without trs-Info, i.e., sets comprising NZP CSI-RS resources for normal CSI.

A set with SetType1 is configured for reporting of (A), and a set with SetType2 is configured for reporting of (B).

Let S1 be a number of sets with SetType1, and S2 be a number of sets with SetType2.

In one example, (S1,S2) is fixed, e.g., (1,1) or (2,1).

In one example, (S1,S2)=(z,1), and a value of z depends on the configuration. In one example, z can take a value from 11,21.

In one example, (S1,S2) depends on the configuration.

Let R1 be a number of resources in each of the S1 sets with SetType1, and R2 be a number of resources in each of the S2 sets with SetType2.

In one example, (R1,R2) is fixed, e.g., (4,1) or (2,1).

In one example, (R1,R2)=(2,1) or (4,1) based on a condition.

In one example, the condition is based on the FR type. For instance, (R1,R2)=(2,1) for FR2, and (R1,R2)=(4,1) for FR1. Or, For instance, (R1,R2)=(2,1) for FR2, and (R1,R2)=(2,1) or (4,1) for FR1.

In one example, (R1,R2)=(2, b) or (4, b), where b>1. For example, b=2.

In one example, (R1,R2)=(2, b) or (4, b), where b>=1. For example, b takes a value from {1,2}.

In one example, a CSI-RS resource set in a CSI reporting is partitioned into two subsets/groups of resources.

Group1: CSI-RS resource(s) configured with trs-Info, i.e., resources comprising TRS(s)

Group2: CSI-RS resource(s) configured without trs-Info, i.e., resources comprising NZP CSI-RS resources for normal CSI.

A resource in Group1 is configured for reporting of (A), and a resource Group2 is configured for reporting of (B).

Let W1 be a number of resources in Group1, and W2 be a number of resources in Group2.

In one example, (W1,W2) is fixed, e.g., (4,1) or (2,1).

In one example, (W1,W2)=(2,1) or (4,1) based on a condition.

In one example, the condition is based on the FR type. For instance, (W1,W2)=(2,1) for FR2, and (W1,W2)=(4,1) for FR1. Or, For instance, (W1,W2)=(2,1) for FR2, and (W1,W2)=(2,1) or (4,1) for FR1.

In one example, (W1,W2)=(2, b) or (4, b), where b>1. For example, b=2.

In one example, (W1,W2)=(2, b) or (4, b), where b>=1. For example, b takes a value from {1,2}.

The time-domain behavior for such reporting can be configured according to at least one of the following examples.

In one example, the TD behavior is fixed to periodic (P).

In one example, the TD behavior is fixed to semi-persistent on PUCCH (SPonPUCCH).

In one example, the TD behavior is fixed to semi-persistent on PUSCH (SPonPUSCH).

In one example, the TD behavior is fixed to aperiodic (AP).

In one example, the TD behavior is configured from {P, SPonPUCCH}.

In one example, the TD behavior is configured from {P, SPonPUSCH}.

In one example, the TD behavior is configured from {P, AP}.

In one example, the TD behavior is configured from {AP, SPonPUCCH}.

In one example, the TD behavior is configured from {AP, SPonPUSCH}.

In one example, the TD behavior is configured from {SPonPUCCH, SPonPUCCH}.

In one example, the TD behavior is configured from {P, SPonPUCCH, SPonPUCCH}.

In one example, the TD behavior is configured from {AP, SPonPUCCH, SPonPUCCH}.

In one example, the TD behavior is configured from {P, AP, SPonPUCCH}.

In one example, the TD behavior is configured from {P, AP, SPonPUSCH}.

In one example, the TD behavior is configured from {P, SPonPUCCH, SPonPUCCH, SP}.

Figure 15:
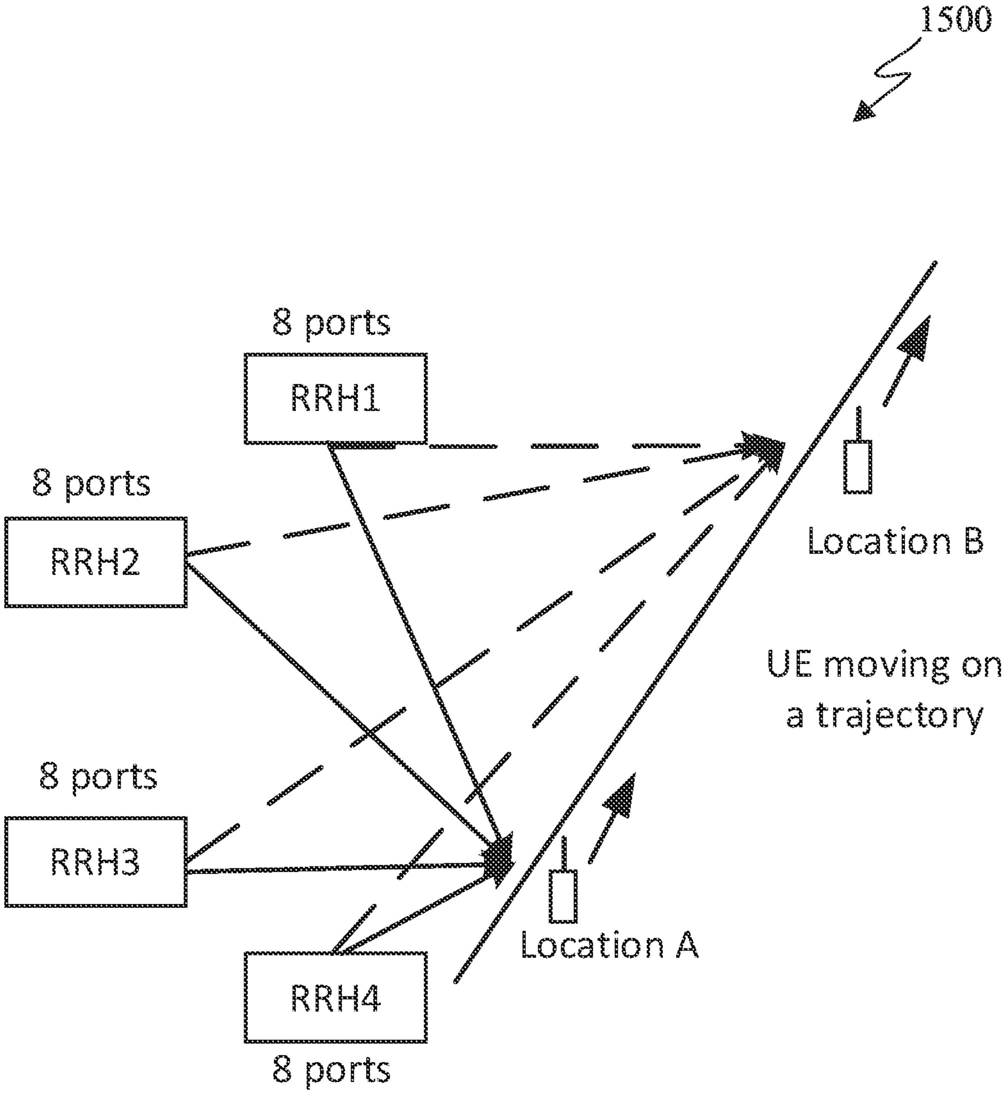
FIG. 15 illustrates a UE moving on a linear trajectory in a distributed MIMO (D-MIMO) system according to embodiments of the present disclosure.

FIG. 15 illustrates a UE moving on a linear trajectory in a distributed MIMO (D-MIMO) system 1500 according to embodiments of the present disclosure. The embodiment of the UE moving on a linear trajectory in a distributed MIMO (D-MIMO) system 1500 illustrated in FIG. 15 is for illustration only. FIG. 15 does not limit the scope of this disclosure to any particular implementation of the UE moving on a linear trajectory in a distributed MIMO (D-MIMO) system 1500.

Abovementioned embodiments on the TDCP or Doppler component reporting can be extended to the case of multiple RRHs/TRPs or distributed MIMO system, wherein CSI-RS resource(s) are transmitted from multiple locations (RRHs/TRPs) within a cell. An illustration of a UE moving on a trajectory located in such a system is shown in FIG. 15. While the UE moves from a location A to another location B at high speed (e.g., 60 kmph), the UE measures the channel and the interference (e.g., via NZP CSI-RS resources and CSI-IM resources, respectively), uses them to determine/report CSI considering joint transmission from multiple RRHs. The reported CSI can be based on a codebook, which includes components considering both multiple RRHs, and time-/Doppler-domain channel compression. An RRH/TRP can be associated with (or correspond to) a NZP CSI-RS resource, or a group/subset of ports within a resource.

In one embodiment, a UE is configured to measure TRS resources transmitted from multiple ($N_{RRH}$>1) TRPs/RRHs, and use them report TDCP or Doppler components of the measured channels from multiple RRHs/TRPs.

In one example, the TRS or NZP CSI-RS resource(s) with trs-Info configured for such a reporting is according to at least one of the following examples.

In one example, the number of NZP CSI-RS resources (M) in a CSI-RS resource set is $N_{RRH}$, i.e., one resource for each TRP/RRH.

In one example, the number of NZP CSI-RS resources (M) in a CSI-RS resource set is ≥$N_{RRH}$, at least one for each TRP/RRH. The M resources can be partitioned into $N_{RRH}$ subsets, each including at least one resource for an RRH.

In one example, the number of NZP CSI-RS resource sets (S) configured via CSI-ResourceConfig is $N_{RRH}$, one set for each TRP/RRH.

In one example, the number of NZP CSI-RS resource sets (S) configured via CSI-ResourceConfig is ≥$N_{RRH}$, at least one set for each TRP/RRH. The S resource sets can be partitioned into $N_{RRH}$ subsets, each including at least one resource set for an RRH.

In one example, the TDCP or Doppler component reporting is according to at least one of the following examples.

In one example, the TDCP or Doppler component reporting is separate for each of $N_{RRH}$ TRPs/RRHs. So, there are $N_{RRH}$ reports in total. The indicator for this reporting can be a joint indicator. Or a separate indicator is reported for each TRP. There can be only one CSI-ReportConfig configured for all reports with a reportQuantity that can set to a value other than 'none', details as described earlier. Or there can be multiple CSI-ReportConfigs (e.g., one for each report) for these reports. The TD behavior of these multiple reports are expected to be configured the same.

In one example, the TDCP or Doppler component reporting is joint for all of $N_{RRH}$ TRPs/RRHs. So, there is only report that is joint for all TRPs.

In one example, the TDCP or Doppler component reporting is only for one of the $N_{RRH}$ TRPs/RRHs. The index of the one TRP is fixed (e.g., 1), or configured (e.g., RRC, MAC CE, or DCI), or reported by the UE (e.g., as part of the CSI report).

In one example, the TDCP or Doppler component reporting is a subset comprising Z out of the $N_{RRH}$ TRPs/RRHs. The value of Z and/or indices of the Z TRPs can be fixed (e.g., 1), or configured (e.g., RRC, MAC CE, or DCI), or reported by the UE (e.g., as part of the CSI report). The details can be according to one or more embodiments herein. When Z>1, the reporting for the Z TRPs can be separate or joint.

Figure 16:
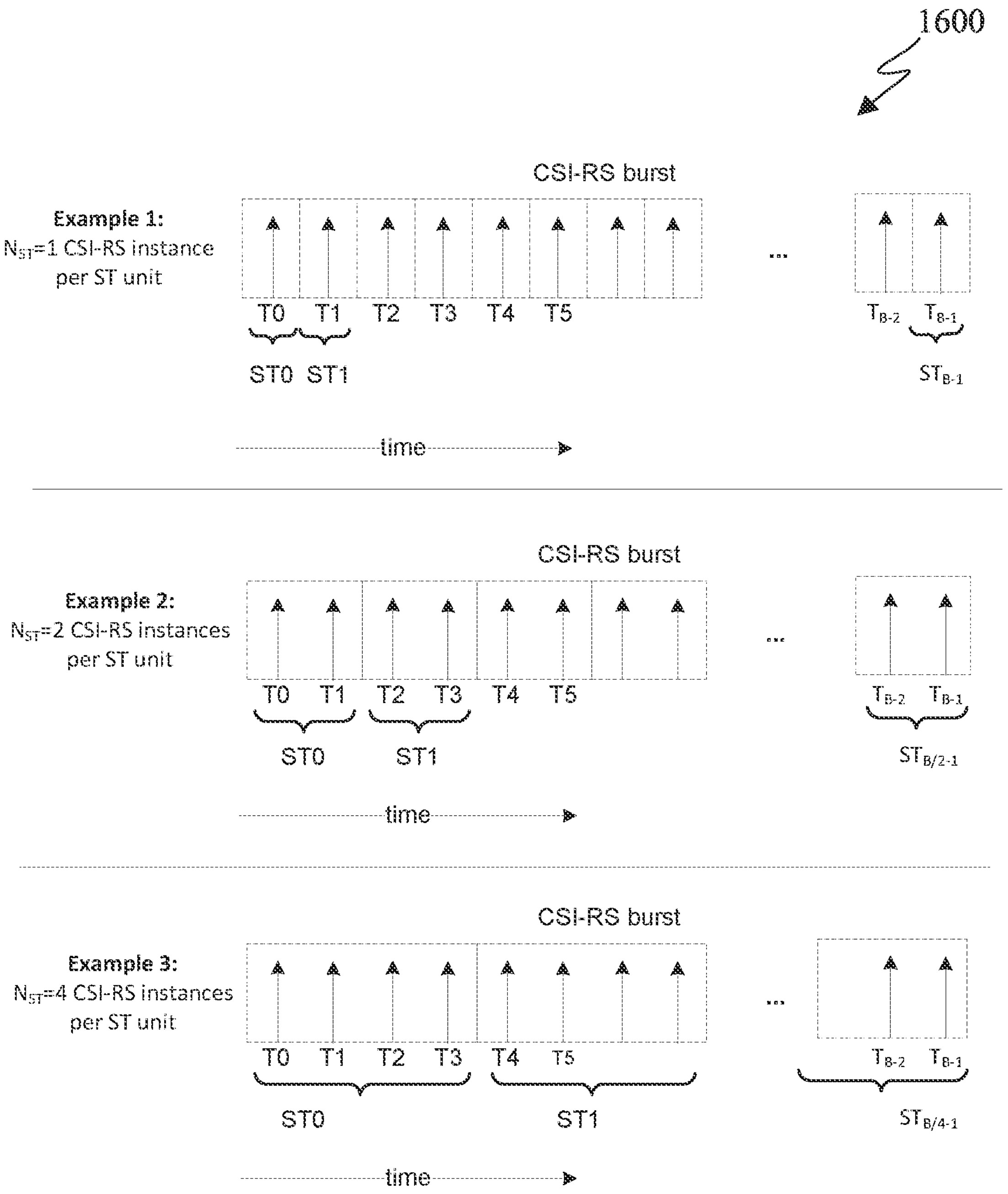
FIG. 16 illustrates an example of a UE configured to determine a value of $N_4$ based on the value B in a CSI-RS burst according to embodiments of the present disclosure.

FIG. 16 illustrates an example 1600 of a UE configured to determine a value of $N_4$ based on the value B in a CSI-RS burst according to embodiments of the present disclosure. The embodiment of the example 1600 of a UE configured to determine a value of $N_4$ based on the value B in a CSI-RS burst illustrated in FIG. 16 is for illustration only. FIG. 16 does not limit the scope of this disclosure to any particular implementation of the example 1600 of a UE configured to determine a value of $N_4$ based on the value B in a CSI-RS burst.

Let $N_4$ be the length of the basis vectors $\{\phi_s\}$, e.g., each basis vector is a length $N_4\times 1$ column vector.

In one embodiment, a UE is configured to determine a value of $N_4$ based on the value B (number of CSI-RS instances) in a CSI-RS burst and components across which the DD compression is performed, where each component corresponds to one or multiple time instances within the CSI-RS burst. In one example, $N_4$ is fixed (e.g., $N_4$=B) or configured (e.g., via RRC or MAC CE or DCI) or reported by the UE (as part of the CSI report). In one example, the B CSI-RS instances can be partitioned into sub-time (ST) units (instances), where each ST unit is defined as (up to) $N_{ST}$ contiguous time instances in the CSI-RS burst. In this example, a component for the DD compression corresponds to a ST unit. Three examples of the ST units are shown in FIG. 16. In the first example, each ST unit comprises $N_{ST}=1$ time instance in the CSI-RS burst. In the second example, each ST unit comprises $N_{ST}=2$ contiguous time instances in the CSI-RS burst. In the third example, each ST unit comprises $N_{ST}=4$ contiguous time instances in the CSI-RS burst.

The value of $N_{ST}$ can be fixed (e.g., $N_{ST}=1$ or 2 or 4) or indicated to the UE (e.g., via higher layer RRC or MAC CE or DCI based signaling) or reported by the UE (e.g., as part of the CSI report). The value of $N_{ST}$ (fixed or indicated or reported) can be subject to a UE capability reporting. The value of $N_{ST}$ can also be dependent on the value of B (e.g., one value for a range of values for B and another value for another range of values for B).

Figure 17:
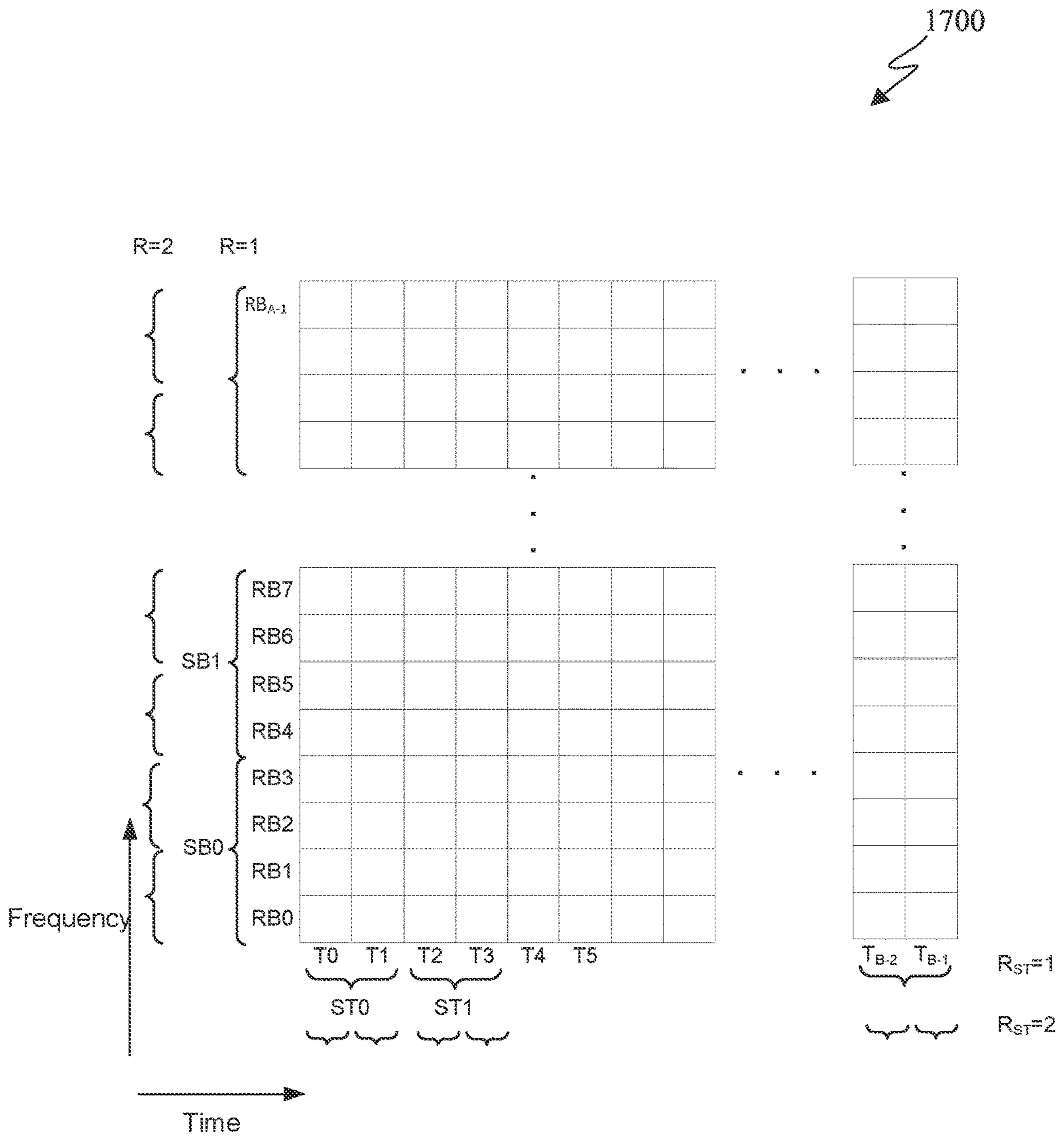
FIG. 17 illustrates an example of a UE configured to partition resource blocks (RBs) into subbands and time instances into sub-times according to embodiments of the present disclosure.

FIG. 17 illustrates an example 1700 of a UE configured to partition resource blocks (RBs) into subbands and time instances into sub-times according to embodiments of the present disclosure. The embodiment of the example 1700 of a UE configured to partition resource blocks (RBs) into subbands and time instances into sub-times illustrated in FIG. 17 is for illustration only. FIG. 17 does not limit the scope of this disclosure to any particular implementation of the example 1700 of a UE configured to partition resource blocks (RBs) into subbands and time instances into sub-times.

In one embodiment, a UE is configured with J≥1 CSI-RS bursts (as illustrated earlier in the disclosure) that occupy a frequency band and a time span (duration), wherein the frequency band comprises A RBs, and the time span comprises B time instances (of CSI-RS resource(s)). When J>1, the A RBs and/or B time instances can be aggregated across J CSI-RS bursts. In one example, the frequency band equals the CSI reporting band, and the time span equals the number of CSI-RS resource instances (across J CSI-RS bursts), both can be configured to the UE for a CSI reporting, which can be based on the DD compression.

The UE is further configured to partition (divide) the A RBs into subbands (SBs) and/or the B time instances into sub-times (STs). The partition of A RBs can be based on a SB size value $N_{SB}$, which can be configured to the UE (cf. Table 5.2.1.4-2 of REF8). The partition of B time instances can be based on either an ST size value $N_{ST}$ or an r value, as described in this disclosure (cf. embodiment B). An example is illustrated in FIG. 17, where RB0, RB1, . . . , $RB_{A-1}$ comprise A RBs, $T_0, T_1, \ldots, T_{B-1}$ comprise B time instances, the SB size $N_{SB}=4$, and the ST size $N_{ST}=2$.

In one embodiment, the value of $N_4$ depends on B. For example, $N_4$=B, or $N_4=B\times R_{ST}$ where $R_{ST}\geq 1$ (or $R_{ST}<1$). So, the DD basis matrix $W_d$ comprises N DD basis vectors $\{\phi_s\}$, each with length $N_4\times 1$. Here, N can be fixed or configured (e.g., via RRC, or MAC CE or DCI). Likewise, B can be fixed or configured (e.g., via RRC, or MAC CE or DCI). When configured, B can be based on the timing (slot indices) of deactivation and activation commands of the SP CSI-RS resource that is configured as the CSI-RS burst, as described in this disclosure. When configured, B can be based on the measurement window of a periodic (P) CSI-RS resource that is configured as the CSI-RS burst, as described in this disclosure.

In one example, the gNB/NW receives the CSI feedback including DD components, where the DD components include the DD basis vectors $\{\phi_s\}$. The gNB/NW can use the CSI feedback and predict the precoding matrices for ($C=Q-N_4$) future time slots or DD units.

In one example, the gNB/NW determines/constructs basis vectors $\{b_s\}$, each with length $Q\times 1$ where $Q>N_4$. In one example, $Q=N_4\times g$ where g is scaling, e.g., g=2.

In one example, when $\phi_s$ is a DFT vector with index s, then bs can also be a DFT vector, which can be determined from $\phi_s$.

In one example, the entries of $\phi_s$ can be repeated g times, e.g., $[\phi_0, \phi_0, \phi_1, \phi_1, \ldots \phi_{N_4-1}, \phi_{N_4-1}]$ when g=2, and the vector $b_s$ can be the closest DFT vector of length $Q=gN_4$, where the closest DFT vector can be determined based on a metric such as max inner product value, i.e., $$\text{abs}(b_s^H \phi_s).$$

In one example, $b_s=[\phi_s, \ldots \phi_s]$ (repeated g times).

In one example, when $g=Q/N_4$ is integer, then $b_s$ is a DFT vector with index sg−1.

In this example, the rest of the components of the codebook are the same as the ones that were reported. For example, when the codebook structure is $W_1\tilde{W}_2 (W_f\otimes W_d)^H$ or $$(W_f \otimes W_1)\tilde{W}_2 W_d^H,$$

and the CSI report includes SD basis $W_1$, FD basis $W_f$, DD basis $W_d$ and coefficient matrix $\tilde{W}_2$, then the gNB/NW determines/constructs the Q precoders as $W_1\tilde{W}_2\ (W_f \otimes W_{d,pred})^H$ or $$(W_f \otimes W_1)\tilde{W}_2 W_{d,pred}^H,$$

where $W_{d,pred}$ is the predicted DD basis matrix comprising N predicted DD basis vectors $\{b_s\}$.

In one example, the gNB/NW determines/constructs $W_2=\tilde{W}_2\ (W_f \otimes W_d)^H$ and use it to determine/predict the $W_2$ matrices for ($C=Q-N_4$) future time slots or DD units. Let $W_{2,pred}$ is the predicted $W_2$ matrix. Then, the gNB/NW determines/constructs the Q precoders as $W_1W_{2,pred}$.

In one example, the gNB/NW determines/constructs precoders $W=W_1\tilde{W}_2(W_f \otimes W_d)^H$ or $$(W_f \otimes W_1)\tilde{W}_2 W_d^H$$

and use it to determine/predict the precoding matrices for ($C=Q-N_4$) future time slots or DD units.

In one embodiment, the value of $N_4$ depends on B and C (or depends on B, C, and $N_{ST}$), where:

B=number of CSI-RS measurement instances (time slots) comprising the CSI-RS burst configured for the CSI reporting including the DD components, C=number of additional time instances or future time slots or prediction window, and $N_{ST}$ is TD/DD unit size as described above.

In one example, $N_4=T=B+C$. In one example, $N_4=T \times R_{ST}$ where $R_{ST} \geq 1$ (or $R_{ST}<1$).

In one example, $$N_4 = T_1 = \frac{(B+C)}{N_{ST}}.$$

In one example, $N_4$ $T_1 \times R_{ST}$ where $R_{ST} \geq 1$ (or $R_{ST}<1$).

In one example, $$N_4 = T_2 = \frac{B}{N_{ST}} + C.$$

In one example, $N_4=T_2 \times R_{ST}$ where $R_{ST} \geq 1$ (or $R_{ST}<1$).

In one example, $$N_4 = T_1 = \left\lceil \frac{(B+C)}{N_{ST}} \right\rceil.$$

In one example, $N_4$ $T_1 \times R_{ST}$ where $R_{ST} \geq 1$ (or $R_{ST}<1$).

In one example, $$N_4 = T_2 = \left\lceil \frac{B}{N_{ST}} + C \right\rceil \text{ or } \left\lceil \frac{B}{N_{ST}} \right\rceil + C.$$

In one example, $N_4=T_2 \times R_{ST}$ where $R_{ST} \geq 1$ (or $R_{ST}<1$).

In one example, $$N_4 = T_1 = \left\lfloor \frac{(B+C)}{N_{ST}} \right\rfloor.$$

In one example, $N_4=T_1 \times R_{ST}$ where $R_{ST} \geq 1$ (or $R_{ST}<1$).

In one example, $$N_4 = T_2 = \left\lfloor \frac{B}{N_{ST}} + C \right\rfloor \text{ or } \left\lfloor \frac{B}{N_{ST}} \right\rfloor + C.$$

In one example, $N_4=T_2 \times R_{ST}$ where $R_{ST} \geq 1$ (or $R_{ST}<1$).

In one example, there is no measurement RS (e.g., CSI-RS or TRS or SSB) during the C time slots (window). In one example, there can be measurement RS (e.g., CSI-RS or TRS or SSB) during the C time slots (window).

The DD basis matrix $W_d$ comprises DD basis vectors $\{\phi_s\}$, each with length $N_4 \times 1$ In one example, the UE may not or does not need to perform any prediction (for C future slots). The UE can determine the DD basis vectors $\{\phi_s\}$ based on the measured DL channel ($H_{meas}$) during B time slots (measured via the CSI-RS burst configured for CSI reporting), and a portion (or subset of entries) of the DD basis vectors that corresponds to the B CSI-RS measurements. Let $\phi_s=[\phi_{s,meas}, \phi_{s,pred}]$ be a DD basis vector with a portion $\phi_{s,meas}$ that corresponds to the B CSI-RS measurements and another portion $\phi_{s,pred}$ that corresponds to the C future time slots. Then, $\phi_s$ can be determined based on $\phi_{s,meas}$ and $H_{meas}$. For instance, the DD basis vectors $\{\phi_s\}$ can be determined based on a metric, e.g., max power or absolute value or max norm value $$|\phi_{s,meas}^H H_{meas}|$$

or abs $$(\phi_{s,meas}^H H_{meas}).$$

In one example, the UE can use the measured DL channel ($H_{meas}$) during B time slots (measured via the CSI-RS burst configured for CSI reporting) to predict/extrapolate the DL channel in C future time slots. The UE can then determine DD basis vectors based on the measured ($H_{meas}$) as well as the predicted ($H_{pred}$) channels. In this case, the DD basis vectors $\phi_s$ can be determined based on $H_{agg}=[H_{meas}, H_{pred}]$. For instance, the DD basis vectors $\{\phi_s\}$ can be determined based on a metric, e.g., max power or absolute value or max norm value $$|\phi_s^H\ H_{agg}| \text{ or } \mathrm{abs}(\phi_s^H\ H_{agg}).$$

In one example, the UE can perform the prediction based on DFT/FFT basis vectors. For example, a DFT/IFFT basis vector $F=[F_1, F_2]$ can be used to determine prediction coefficient vector as $$x = F_1^H \times H_{meas},$$

and then use x to predict the channel as $H_{prea}=x^{H}\times F_{2}$.

The value of B and C can be determined according to at least one of the following examples.

- In one example, both B and C are fixed.
- In one example, one of B and C is configured (e.g., via RRC, or MAC CE or DCI), and the other is fixed or determined based on the configured value. For example, B can be configured, and C can be fixed (e.g., C=10) or determined based on B (e.g., C=B or C=t×B, and t can be fixed, e.g., 2).
- In one example, both B and C are configured (e.g., via RRC, or MAC CE or DCI), either via two separate parameters or via a joint parameter.
- In one example, one of B and C is configured (e.g., via RRC, or MAC CE or DCI), and the other is reported by UE (e.g., via UE capability reporting). For example, B can be configured, and C can be reported.

When both B and C are provided (configured) to UE, then at least one of the following examples is used.

- In one example, both are configured via the same medium such as RRC, MAC CE or DCI.
- In one example, one of B and C is configured via RRC, and the other via MAC CE or DCI.
- In one example, one of B and C is configured via MAC CE, and the other via DCI.

When B and/or C are configured via RRC, then the configuration can be included in or a part of higher layer CSI-ResourceConfig, or higher layer CSI-ReportConfig.

When B and/or C are configured via MAC CE, then the configuration can be included in or a part of CSI trigger state that can be activated/deactivated via MAC CE.

When B and/or C are configured via DCI, then the configuration can be included in or a part of CSI trigger state that can be triggered by DCI.

In one example, one or both of B and $N_4$ are configured and C is determined based on B and $N_4$, e. g., $C=N_4-B$. The value of B and $N_4$ can be determined according to at least one of the following examples.

- In one example, both B and $N_4$ are fixed.
- In one example, one of B and $N_4$ is configured (e.g., via RRC, or MAC CE or DCI), and the other is fixed or determined based on the configured value. For example, B can be configured, and $N_4$ can be fixed (e.g., $N_4=10$) or determined based on B (e.g., $N_4=t\times B$, and t can be fixed, e.g., 2).
- In one example, both B and $N_4$ are configured (e.g., via RRC, or MAC CE or DCI), either via two separate parameters or via a joint parameter.
- In one example, one of B and $N_4$ is configured (e.g., via RRC, or MAC CE or DCI), and the other is reported by UE (e.g., via UE capability reporting). For example, B can be configured, and $N_4$ can be reported.

When both B and $N_4$ are provided (configured) to UE, then at least one of the following examples is used.

- In one example, both are configured via the same medium such as RRC, MAC CE or DCI.
- In one example, one of B and $N_4$ is configured via RRC, and the other via MAC CE or DCI.
- In one example, one of B and $N_4$ is configured via MAC CE, and the other via DCI.

When B and/or $N_4$ are configured via RRC, then the configuration can be included in or a part of higher layer CSI-ResourceConfig, or higher layer CSI-ReportConfig.

When B and/or $N_4$ are configured via MAC CE, then the configuration can be included in or a part of CSI trigger state that can be activated/deactivated via MAC CE.

When B and/or $N_4$ are configured via DCI, then the configuration can be included in or a part of CSI trigger state that can be triggered by DCI.

The UE is configured to determine/report the CSI report including a PMI, where the PMI indicates SD basis vectors, FD basis vectors, DD basis vectors, and coefficients associated with triples of (SD, FD, DD) basis vectors. The coefficient reporting can be similar to Rel. 16 Type II codebook i.e., an indication of non-zero coefficients (e.g., via bitmap), SCI, reference amplitude, amplitude and phase of NZ coefficients.

The CSI report can also include CQI, where the CQI reporting can be configured to be according to at least one of the following examples.

- In one example, CQI is reported using both the measurement window or time instances (B), and the prediction or future time instances (C), i.e., $T_{B+C}$.
- In one example, CQI is reported using only the measurement window or time instances (B), i.e., $T_B$.
- In one example, CQI is reported using only the prediction or future time instances (C), i.e., $T_C$.

The number of CQIs reported in TD/DD can be configured to be according to at least one of the following examples.

- In one example, only one CQI is reported for the entire Tx TD/DD units, where x belongs to {B, C, B+C}.
  - When CQI reporting across SBs is WB, then only one CQI is reported for both CSI reporting band (across SBs) and time window $T_x$.
  - When CQI reporting across SBs is per SB, then one CQI is reported for each SB, and the reported value remains the same for the time window $T_x$.
- In one example, multiple CQIs are reported for the entire $T_x$ TD/DD units, where x belongs to {B, C, B+C}. In one example, the number for CQI=2. In one example, the number of CQI is $N_4$. In one example, the number of CQI is $N_4+1$ (where plus 1 is due the reference CQI).
  - When CQI reporting across SBs is WB, then multiple CQIs remains the same for all SBs.
  - When CQI reporting across SBs is per SB, then multiple CQIs are reported for each SB.

The CSI reference resource for a serving cell is defined as follows:

- In the frequency domain, the CSI reference resource is defined by the group of downlink physical resource blocks corresponding to the band to which the derived CSI relates.
- In the time domain, the CSI reference resource for a CSI reporting in uplink slot n' is defined by a single downlink slot $$n - n_{CSI\_ref} - K_{offset}\cdot\frac{2^{\mu_{DL}}}{2^{\mu_{K_{offset}}}},$$

where $K_{offset}$ is a parameter configured by higher layer as specified in clause 4.2 of [6 TS 38.213], and where $\mu_{K_{offset}}$ is the subcarrier spacing configuration for $K_{offset}$ with a value of 0 for frequency range 1, where $$n=\left\lfloor n'\cdot\frac{2^{\mu_{DL}}}{2^{\mu_{UL}}}\right\rfloor+\left\lfloor\left(\frac{N_{slot,offset,UL}^{CA}}{2^{\mu_{offset,UL}}}-\frac{N_{slot,offset,DL}^{CA}}{2^{\mu_{offset,DL}}}\right)\cdot 2^{\mu_{DL}}\right\rfloor$$

and $\mu_{DL}$ and $\mu_{UL}$ are the subcarrier spacing configurations for DL and UL, respectively, and $$N_{slot,offset}^{CA}$$

and $\mu_{offset}$ are determined by higher-layer configured ca-SlotOffset for the cells transmitting the uplink and downlink, as defined in clause 4.5 of [4, TS 38.211]

where for periodic and semi-persistent CSI reporting if a single CSI-RS/SSB resource is configured for channel measurement $n_{CSI\_ref}$ is the smallest value greater than or equal to $4 \cdot 2^{\mu_{DL}}$, such that it corresponds to a valid downlink slot, or if multiple CSI-RS/SSB resources are configured for channel measurement $n_{CSI\_ref}$ is the smallest value greater than or equal to $5 \cdot 2^{\mu_{DL}}$, such that it corresponds to a valid downlink slot.

where for aperiodic CSI reporting, if the UE is indicated by the DCI to report CSI in the same slot as the CSI request, $n_{CSI\_ref}$ is such that the reference resource is in the same valid downlink slot as the corresponding CSI request, otherwise $n_{CSI\_ref}$ is the smallest value greater than or equal to $$\lfloor Z'/N_{symb}^{slot} \rfloor,$$

such that slot $n-n_{CSI\_ref}$ corresponds to a valid downlink slot, where Z' corresponds to the delay requirement as defined in Clause 5.4.

when periodic or semi-persistent CSI-RS/CSI-IM or SSB is used for channel/interference measurements, the UE is not expected to measure channel/interference on the CSI-RS/CSI-IM/SSB whose last OFDM symbol is received up to Z' symbols before transmission time of the first OFDM symbol of the aperiodic CSI reporting.

A slot in a serving cell shall be considered to be a valid downlink slot if:

it comprises at least one higher layer configured downlink or flexible symbol, and it does not fall within a configured measurement gap for that UE If there is no valid downlink slot for the CSI reference resource corresponding to a CSI Report Setting in a serving cell, CSI reporting is omitted for the serving cell in uplink slot n'.

After the CSI report (re)configuration, serving cell activation, BWP change, or activation of SP-CSI, the UE reports a CSI report only after receiving at least one CSI-RS transmission occasion for channel measurement and CSI-RS and/or CSI-IM occasion for interference measurement no later than CSI reference resource and drops the report otherwise.

When DRX is configured, the UE reports a CSI report only if receiving at least one CSI-RS transmission occasion for channel measurement and CSI-RS and/or CSI-IM occasion for interference measurement in DRX Active Time no later than CSI reference resource and drops the report otherwise. When DRX is configured and the CSI-RS Resource Set for channel measurement corresponding to a CSI report is configured with two Resource Groups and N Resource Pairs, as described in clause 5.2.1.4.1, the UE reports a CSI report only if receiving at least one CSI-RS transmission occasion for each CSI-RS resource in a Resource Pair within the same DRX Active Time no later than CSI reference resource and drops the report otherwise. When the UE is configured to monitor DCI format 2_6 and if the UE configured by higher layer parameter ps-TransmitOtherPeriodicCSI to report CSI with the higher layer parameter reportConfig Type set to 'periodic' and reportQuantity set to quantities other than 'cri-RSRP', 'ssb-Index-RSRP', 'cri-RSRP-Capability[Set]Index', and 'ssb-Index-RSRP-Capability[Set]Index' when drx-onDurationTimer is not started, the UE shall report CSI during the time duration indicated by drx-onDurationTimer in DRX-Config also outside active time according to the procedure described in Clause 5.2.1.4 if receiving at least one CSI-RS transmission occasion for channel measurement and CSI-RS and/or CSI-IM occasion for interference measurement during the time duration indicated by drx-onDurationTimer in DRX-Config outside DRX active time or in DRX Active Time_no later than CSI reference resource and drops the report otherwise. When the UE is configured to monitor DCI format 2_6 and if the UE configured by higher layer parameter ps-TransmitPeriodicL1-RSRP to report L1-RSRP with the higher layer parameter reportConfigType set to 'periodic' and reportQuantity set to 'cri-RSRP', 'ssb-Index-RSRP', 'cri-RSRP-Capability[Set]Index', or 'ssb-Index-RSRP-Capability[Set]Index' when drx-onDurationTimer is not started, the UE shall report L1-RSRP during the time duration indicated by drx-onDurationTimer in DRX-Config also outside active time according to the procedure described in clause 5.2.1.4 and when reportQuantity set to 'cri-RSRP' or 'cri-RSRP-Capability[Set]Index' if receiving at least one CSI-RS transmission occasion for channel measurement during the time duration indicated by drx-onDurationTimer in DRX-Config outside DRX active time or in DRX Active Time no later than CSI reference resource and drops the report otherwise.

When deriving CSI feedback, the UE is not expected that a NZP CSI-RS resource for channel measurement overlaps with CSI-IM resource for interference measurement or NZP CSI-RS resource for interference measurement.

If configured to report CQI index, in the CSI reference resource, the UE shall assume the following for the purpose of deriving the CQI index, and if also configured, for deriving PMI and RI:

The first 2 OFDM symbols are occupied by control signaling.

The number of PDSCH and DM-RS symbols is equal to 12.

The same bandwidth part subcarrier spacing configured as for the PDSCH reception The bandwidth as configured for the corresponding CQI report.

The reference resource uses the CP length and subcarrier spacing configured for PDSCH reception No resource elements used by primary or secondary synchronization signals or PBCH.

Redundancy Version 0.

The ratio of PDSCH EPRE to CSI-RS EPRE is as given in Clause 5.2.2.3.1.

Assume no REs allocated for NZP CSI-RS and ZP CSI-RS.

Assume the same number of front-loaded DM-RS symbols as the maximum front-loaded symbols configured by the higher layer parameter maxLength in DMRS-DownlinkConfig.

Assume the same number of additional DM-RS symbols as the additional symbols configured by the higher layer parameter dmrs-AdditionalPosition.

Assume the PDSCH symbols are not containing DM-RS.

Assume PRB bundling size of 2 PRBs.

The PDSCH transmission scheme where the UE may assume that PDSCH transmission would be performed with up to 8 transmission layers as defined in Clause 7.3.1.4 of [4, TS 38.211]. For CQI calculation, the UE should assume that PDSCH signals on antenna ports in the set [1000, . . . , 1000+v−1] for v layers would result in signals equivalent to corresponding symbols transmitted on antenna ports [3000, . . . , 3000+P−1], as given by $$\begin{bmatrix} y^{(3000)}(i) \\ \ldots \\ y^{(3000+P-1)}(i) \end{bmatrix} = W(i)\begin{bmatrix} x^{(0)}(i) \\ \ldots \\ x^{(v-1)}(i) \end{bmatrix}$$

where $x(i)=[x^{(0)}(i) \ldots x^{(v-1)}(i)]^T$ is a vector of PDSCH symbols from the layer mapping defined in Clause 7.3.1.4 of [4, TS 38.211], $P \in [1,2,4,8,12,16,24,32]$ is the number of CSI-RS ports. If only one CSI-RS port is configured, W(i) is 1. If the higher layer parameter reportQuantity in CSI-ReportConfig for which the CQI is reported is set to either 'cri-RI-PMI-CQI' or 'cri-RI-LI-PMI-CQI', W(i) is the precoding matrix corresponding to the reported PMI applicable to x(i). If the higher layer parameter reportQuantity in CSI-ReportConfig for which the CQI is reported is set to 'cri-RI-CQI', W(i) is the precoding matrix corresponding to the procedure described in Clause 5.2.1.4.2. If the higher layer parameter reportQuantity in CSI-ReportConfig for which the CQI is reported is set to 'cri-RI-i1-CQI', W(i) is the precoding matrix corresponding to the reported i1 according to the procedure described in Clause 5.2.1.4.2. The corresponding PDSCH signals transmitted on antenna ports [3000, . . . , 3000+P−1] would have a ratio of EPRE to CSI-RS EPRE equal to the ratio given in Clause 5.2.2.3.1. If the higher layer parameter reportQuantity in CSI-ReportConfig for which the CQI is reported is set to either 'cri-RI-PMI-CQI' or 'cri-RI-LI-PMI-CQI', the corresponding CSI-RS Resource Set for channel measurement is configured with two Resource Groups and N Resource Pairs, as described in clause 5.2.1.4.1, the reported CRI corresponds to an entry of the N Resource Pairs, and the reported rank combination is $\{v_1, v_2\}$, as described in clause 5.2.1.4.2, for CQI calculation, the UE should assume that PDSCH signals on antenna ports in the set $[1000, \ldots, 1000+v_1-1]$ for $v_1$ layers would result in signals equivalent to corresponding symbols transmitted on antenna ports [3000, . . . , 3000+P−1] of the Group 1 CSI-RS resource in the Resource Pair indicated by the CRI, and PDSCH signals on antenna ports in the set $[1000+v_1, \ldots, 1000+v_1+v_2-1]$ for $v_2$ layers would result in signals equivalent to corresponding symbols transmitted on antenna ports [3000, . . . , 3000+P−1] of the Group 2 CSI-RS resource in the Resource Pair indicated by the CRI, as given by $$\begin{bmatrix} y_j^{(3000)}(i) \\ \ldots \\ y_j^{(3000+P-1)}(i) \end{bmatrix} = W_j(i)\begin{bmatrix} x^{((j-1)\cdot v_1)}(i) \\ \ldots \\ x^{(v_1+(j-1)\cdot v_2-1)}(i) \end{bmatrix}$$

where $W_j(i)$, j=1,2 are the two precoding matrices corresponding to the two reported PMIs applicable to x(i), as described in clause 5.2.1.4.2; and the indices j=1,2 are associated to the two Resource Groups configured in the corresponding CSI-RS Resource Set for channel measurement; that the signals $y_j$, j=1,2, fully overlap in time and frequency, and that, for the calculation of RI, PMI and LI (if configured) of $v_j$ layers, j=1,2, the interference from the other $v_{(j \bmod 2)+1}$ layers is derived from channel measurement and precoding matrix corresponding to the other $v_{(j \bmod 2)+1}$ layers.

The UE shall assume that the corresponding PDSCH signals for $v_1$ layers transmitted on the P antenna ports of the CSI-RS resource in Group j would have a ratio of EPRE to CSI-RS EPRE equal to the powerControlOffset of the respective CSI-RS resource, for j=1,2.

Let n' be the UL slot index in which the CSI is reported. Let us define four entities first.

TD/DD basis vector length: let $N_4$ be the length of the DD/TD basis vectors. In one example, each of the $N_4$ elements of the basis vectors maps to or corresponds to a (time) slot. In one example, each of the $N_4$ elements of the basis vectors maps to or corresponds to a TD/DD (compression) unit.

Measurement window: let a CSI-RS measurement window be represented as $[k,k+W_{meas}]$ or $[k,k+W_{meas}-1]$, which represents the window in which CSI-RS burst(s) are measured for calculating the CSI report. Here, k is a (starting) slot index and $W_{meas}$ is the measurement window length. In one example, the unit of $W_{meas}$ is in a (time) slot. In one example, the unit of $W_{meas}$ is a TD/DD (compression) unit.

Reporting/validity window: let a CSI reporting (or validity) window be represented as $[l,l+W_{CSI}]$ or $[l,l+W_{CSI}-1]$, which represents the window in which the CSI report in slot n' is expected to be valid. Here, l is a (starting) slot index and $W_{CSI}$ is the validity window length (in slots). In one example, the unit of $W_{meas}$ is in a (time) slot. In one example, the unit of $W_{meas}$ is a TD/DD (compression) unit.

CSI reference resource: let a CSI reference resource be (just as in Rel-15) the resource in frequency and time domains that is used as a reference for CQI requirement (10% BLER) associated with the CSI report in slot n'. Let the location of CSI reference resource is denoted as $n_{ref}$ (slot index).

In one example, each unit corresponds to (includes) $N_{ST}$ consecutive slots, where $N_{ST}$ is a TD/DD unit size. The value of $N_{ST}$ can be fixed, or configured (e.g., via RRC or MAC CE or DCI). In one example, each unit corresponds to (includes) $R_{ST} \times N_{ST}$ consecutive slots (or sub-slots), where $R_{ST} \geq 1$ or <1. The value of $R_{ST}$ can be fixed, or configured (e.g., via RRC or MAC CE or DCI). The number of slots corresponding to each DD/TD basis vector=$N_4 N_{ST}$.

In the following embodiments and examples, when the unit of the window-size $W_{meas}$ is a TD/DD (compression) unit, then the window-size in number of slots can be given by $W_{meas}N_{ST}$ or $W_{meas}N_{ST}R_{ST}$ where $N_{ST}$ is the TD/DD unit size and $R_{ST}$ is defined above. Likewise, when the unit of the window-size $W_{CSI}$ is a TD/DD (compression) unit, then the window-size in number of slots can be given by $W_{CSI}N_{ST}$ or $W_{CSI}N_{ST}R_{ST}$ where $N_{ST}$ is the TD/DD unit size and $R_{ST}$ is defined above. Accordingly, $W_{meas}$ and $W_{CSI}$ in the embodiments of this disclosure can be replaced with $W_{meas}$ $N_{ST}$ or $W_{meas}N_{ST}R_{ST}$ and $W_{CSI}N_{ST}$ or $W_{CSI}N_{ST}R_{ST}$, respectively, in order to obtain corresponding slot number indices.

In the present disclosure, the relation between the above-mentioned four entities are discussed.

In the present disclosure, the CSI reference resource slot $n_{ref}$ is defined in one or more embodiments herein.

Figure 18:
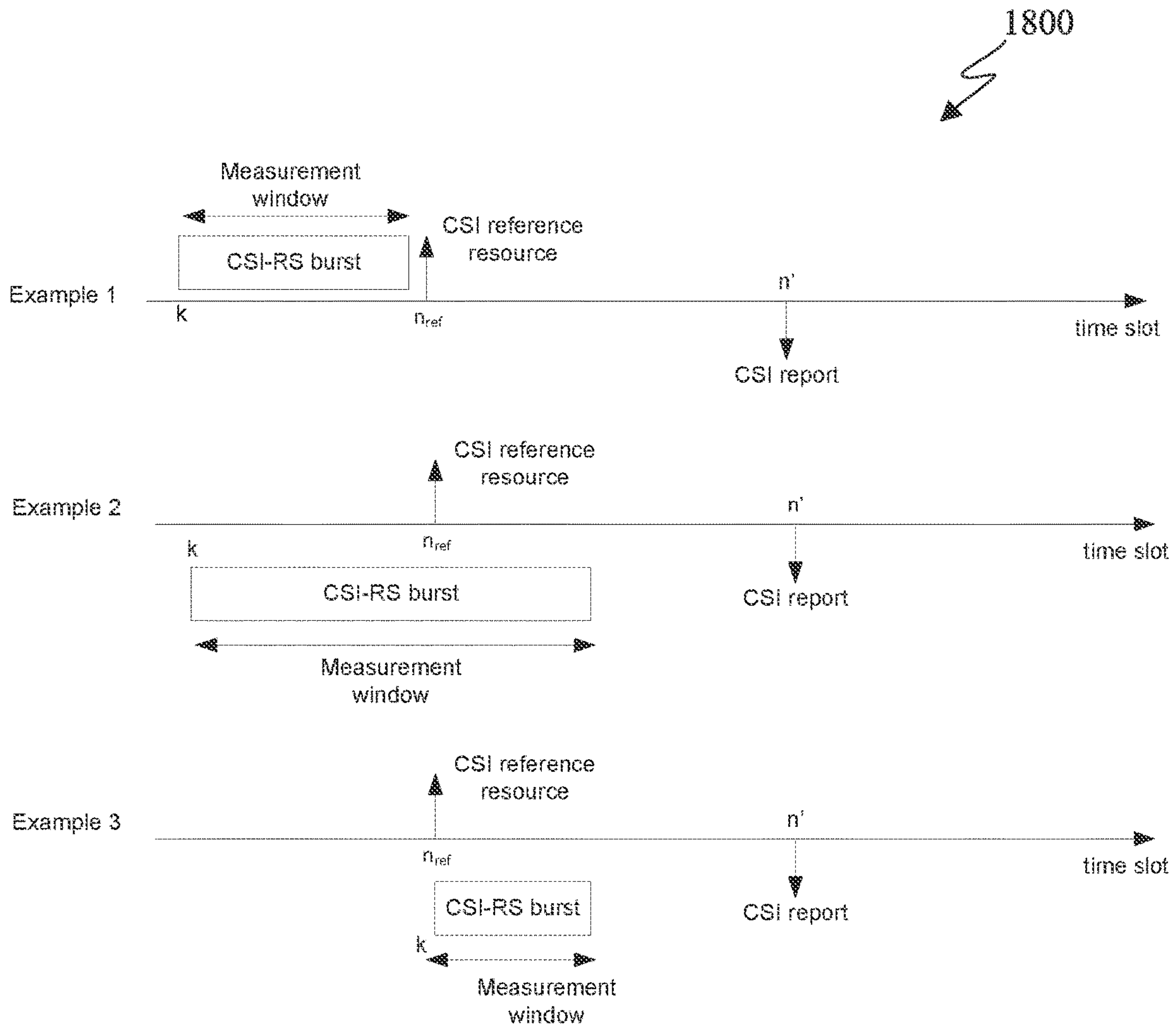
FIG. 18 illustrates an example of a UE configured to measure a CSI-RS burst, based on NZP CSI-RS resource(s), within a measurement window, according to embodiments of the present disclosure.

FIG. 18 illustrates an example 1800 of a UE configured to measure a CSI-RS burst, based on NZP CSI-RS resource(s), within a measurement window, according to embodiments of the present disclosure. The embodiment of the example 1800 of a UE configured to measure a CSI-RS burst, based on NZP CSI-RS resource(s), within a measurement window illustrated in FIG. 18 is for illustration only. FIG. 18 does not limit the scope of this disclosure to any particular implementation of the example 1800 of a UE configured to measure a CSI-RS burst, based on NZP CSI-RS resource(s), within a measurement window.

In one embodiment, a UE is configured to measure a CSI-RS burst, based on NZP CSI-RS resource(s), within a measurement window, where the measurement window is according to at least one of the following examples.

In one example, shown as example 1 in FIG. 18, both the starting slot index k and the ending slot index ($k+W_{meas}$ or $k+W_{meas}-1$) of the measurement window are no later than $n_{ref}$.

- In one example, the ending slot index is fixed. In one example, the ending slot index is fixed to $n_{ref}$, i.e., $k+W_{meas}=n_{ref}$ or $k+W_{meas}-1=n_{ref}$. In one example, the ending slot index is fixed to the most recent, no later than $n_{ref}$, occasion of the CSI-RS burst(s), i.e., $k+W_{meas}=n_{ref}-\delta$ or $k+W_{meas}-1=n_{ref}-\delta$, where $\delta\geq 0$ is a minimum integer which corresponds to the most recent, no later than $n_{ref}$, occasion of the CSI-RS burst(s).
- In one example, the starting slot index k is fixed or configured (e.g., RRC) or determined based on the configuration of the CSI-RS burst. When fixed, k can be given by $k=n_{ref}-\delta_k$. Or k can be given by $k=n'-\delta_k$. Here, $\delta_k$ is fixed. When configured, k can be given by $k=n_{ref}-\alpha_k$. Or k can be given by $k=n'-\alpha_k$. Here, $\alpha_k$ is configured.
- In one example, both k and $W_{meas}$ are fixed. One of the examples herein is used.
- In one example, both k and $W_{meas}$ are configured (e.g., via RRC).

In one example, shown as example 2 in FIG. 18, the starting slot index k of the measurement window is no later than $n_{ref}$ and the ending slot index ($k+W_{meas}$ or $k+W_{meas}-1$) can be after $n_{ref}$ but before (or no later than) n'.

- In one example, the ending slot index is fixed. In one example, the ending slot index is fixed to n', i.e., $k+W_{meas}=n'$ or $k+W_{meas}-1=n'$. In one example, the ending slot index is fixed to $n'-\delta$, i.e., $k+W_{meas}=n'-\delta$ or $k+W_{meas}-1=n'-8$, where $\geq 0$.
- In one example, the starting slot index is fixed. In one example, the starting slot index is fixed to $n_{ref}$, i.e., $k=n_{ref}$. In one example, the starting slot index is fixed to $n_{ref}+\delta'$, where $\delta'\geq 0$.
- In one example, both k and $W_{meas}$ are fixed. One of the examples herein is used.
- In one example, both k and $W_{meas}$ are configured (e.g., via RRC).

In one example, shown as example 3 in FIG. 18, both the starting slot index k and the ending slot index ($k+W_{meas}$ or $k+W_{meas}-1$) of the measurement window are no earlier than (or after) $n_{ref}$.

- In one example, the starting slot index is fixed. In one example, the starting slot index is fixed to $n_{ref}$, i.e., $k=n_{ref}$. In one example, the starting slot index is fixed to the most first (or earliest), no earlier than $n_{ref}$, occasion of the CSI-RS burst(s), i.e., $k=n_{ref}-\delta$, where $\delta\geq 0$ is a minimum integer which corresponds to the first (or earliest), no earlier than $n_{ref}$, occasion of the CSI-RS burst(s).
- In one example, the ending slot index ($k+W_{meas}$ or $k+W_{meas}-1$) is fixed or configured (e.g., RRC) or determined based on the configuration of the CSI-RS burst. When fixed, it can be given by n'. When fixed, it can be given by $n_{ref}+\delta_k$. Or it can be given by $n'-\delta_k$. Here, $\delta_k$ is fixed. When configured, it can be given by $n_{ref}+\alpha_k$. Or it can be given by $n'-\alpha_k$. Here, $\alpha_k$ is configured.
- In one example, both k and $W_{meas}$ are fixed. One of the examples in I.1.3.1 and I.1.3.2 is used.
- In one example, both k and $W_{meas}$ are configured (e.g., via RRC).

In one embodiment, a UE is configured to measure a NZP CSI-RS resource burst or NZP CSI-RS occasion(s) or measurement window $[k,k+W_{meas}-1]$ as described above, where $k\leq n_{ref}$ and $n_{ref}$ is the slot index of the CSI reference resource.

If the higher layer parameter timeRestrictionForChannelMeasurements is set to "notConfigured", the UE shall derive the channel measurements for computing CSI value reported in uplink slot n based on only the NZP CSI-RS, no later than the CSI reference resource, (defined in TS 38.211 [4]) associated with the CSI resource setting.

If the higher layer parameter timeRestrictionForChannelMeasurements in CSI-ReportConfig is set to "Configured", the UE shall derive the channel measurements for computing CSI reported in uplink slot n based on only the most recent, no later than the CSI reference resource, occasion of NZP CSI-RS (defined in [4, TS 38.211]) associated with the CSI resource setting.

If the higher layer parameter timeRestrictionForInterferenceMeasurements is set to "notConfigured", the UE shall derive the interference measurements for computing CSI value reported in uplink slot n based on only the CSI-IM and/or NZP CSI-RS for interference measurement no later than the CSI reference resource associated with the CSI resource setting. If the higher layer parameter timeRestrictionForInterferenceMeasurements in CSI-ReportConfig is set to "Configured", the UE shall derive the interference measurements for computing the CSI value reported in uplink slot n based on the most recent, no later than the CSI reference resource, occasion of CSI-IM and/or NZP CSI-RS for interference measurement (defined in [4, TS 38.211]) associated with the CSI resource setting.

At least one of the following examples is used/configured regarding k and/or $W_{meas}$.

In one example, $W_{meas}=1$ when the time restriction is turned ON, and $W_{meas}\geq 1$ (up to UE implementation) when the time restriction is turned OFF. In one example, the time restriction is tuned ON/OFF via the higher layer parameter timeRestrictionForChannelMeasurements (which for example can be provided via in CSI-ReportConfig). In one example, this example is used/configured for $W_{meas}$ only when the CSI reporting is based on a codebook other than the Type II codebook including Doppler component(s), such as DD basis vectors (which can be configured for high speed UE scenarios). For example, the codebook can be Rel.15/16/17 Type II codebooks, but the codebook can't be Rel.18 Type II codebook (including Doppler components). In one example, this example is used/configured for $W_{meas}$ only when the CSI reporting is configured for a low speed UE.

In one example, if the higher layer parameter timeRestrictionForChannelMeasurements in CSI-ReportConfig is set to "Configured",

- For a codebook not including Doppler component(s), e.g., Rel.15/16/17 NR Type II codebooks, the UE shall derive the channel measurements for computing CSI reported in uplink slot n based on only the most recent, no later than the CSI reference resource slot $n_{ref}$, occasion (i.e., $W_{meas}$=1) of NZP CSI-RS (defined in [4, TS 38.211]) associated with the CSI resource setting.
- For a codebook including Doppler component(s), e.g., Rel.18 NR Type II codebook (for time/Doppler compression), the UE shall derive the channel measurements for computing CSI reported in uplink slot n based on only the most recent, no later than the CSI reference resource slot $n_{ref}$, measurement window (i.e., $W_{meas}$>1) of occasions of NZP CSI-RSs (defined in [4, TS 38.211]) associated with the CSI resource setting. Here, $W_{meas}$ can be fixed or configured (e.g., via a parameter in the associated with the CSI resource setting or the CSI report setting).

In one example, if the higher layer parameter timeRestrictionForChannelMeasurements in CSI-ReportConfig is set to "notConfigured",

- For a codebook not including Doppler component(s), e.g., Rel.15/16/17 NR Type II codebooks, the UE shall derive the channel measurements for computing CSI reported in uplink slot n based on only the NZP CSI-RS, no later than the CSI reference resource, (defined in [4, TS 38.211]) associated with the CSI resource setting, i.e., $W_{meas}$=1 or >1 up to UE implementation.
- For a codebook including Doppler component(s), e.g., Rel.18 NR Type II codebook (for time/Doppler compression), the UE shall derive the channel measurements for computing CSI reported in uplink slot n based on only the NZP CSI-RS measurement window, no later than the CSI reference resource slot $n_{ref}$, (defined in [4, TS 38.211]) associated with the CSI resource setting, i.e., $W_{meas}$>1. Here, $W_{meas}$ can be fixed or configured (e.g., via a parameter in the associated with the CSI resource setting or the CSI report setting).

In one example, $k \le n_{ref}$

- For a codebook not including Doppler component(s), e.g., Rel.15/16/17 NR Type II codebooks, k and $W_{meas}$ values are up to gNB and/or UE implementations, i.e., neither is specified.
- For a codebook including Doppler component(s), e.g., Rel.18 NR Type II codebook (for time/Doppler compression),
  - In one example, k value is fixed or configured and $W_{meas}$ value is up to gNB and/or UE implementations, i.e., is not specified.
  - In one example, $W_{meas}$ value is fixed or configured and k value is up to gNB and/or UE implementations, i.e., is not specified.
  - In one example, both k and $W_{meas}$ values are specified, either both fixed or both configured or one of the two fixed and the other configured.

Based on legacy (Rel.15 NR specification), the CSI is not expected to be valid for slots after n'. However, the validity of the CSI which includes DD/TD components based on CSI-RS burst(s) measurements may need to be defined differently (from the legacy definition) since the reported CSI can be expected to valid for future slots wherein the gNB/NW can schedule DL transmission. A few examples of potential enhancements to the validity window are provided below.

In one embodiment, a UE is configured to determine a CSI report that is valid during a CSI reporting/validity window, as defined above, where the CSI reporting/validity window is according to at least one of the following examples.

Figure 19:
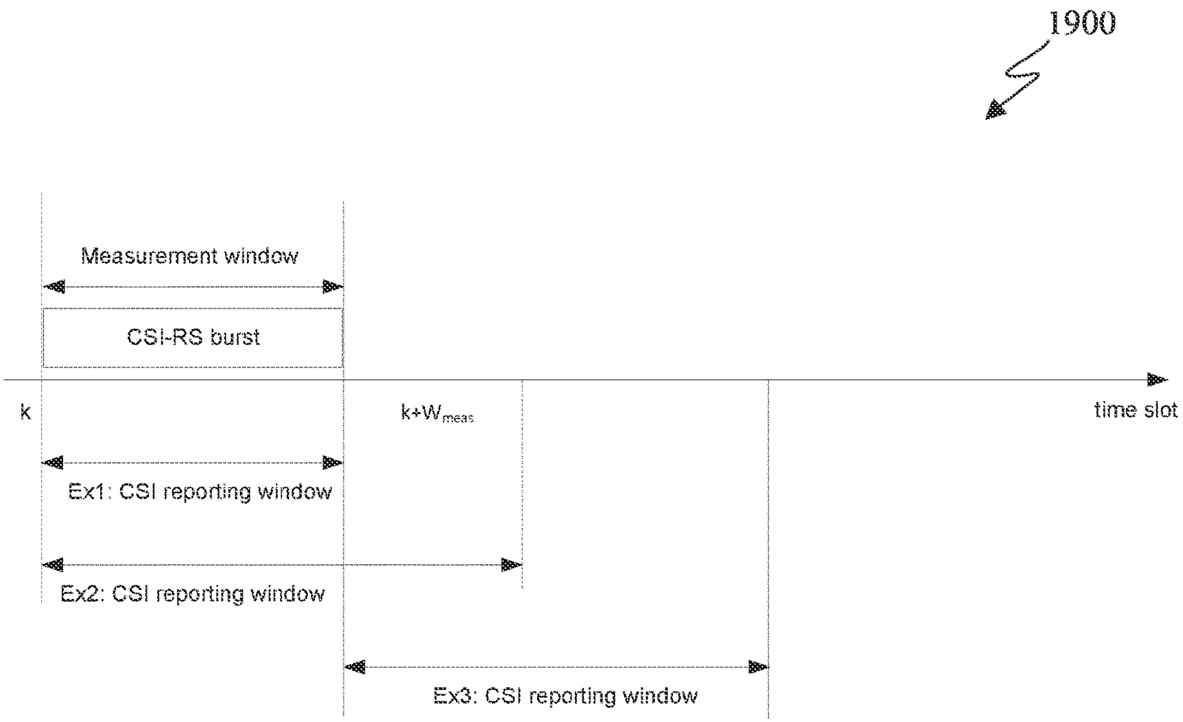
FIG. 19 illustrates an example of a UE configured to determine a CSI report that is valid during a CSI reporting/validity window according to embodiments of the present disclosure.

FIG. 19 illustrates an example 1900 of a UE configured to determine a CSI report that is valid during a CSI reporting/validity window according to embodiments of the present disclosure. The embodiment of the example 1900 of a UE configured to determine a CSI report that is valid during a CSI reporting/validity window illustrated in FIG. 19 is for illustration only. FIG. 19 does not limit the scope of this disclosure to any particular implementation of the example 1900 of a UE configured to determine a CSI report that is valid during a CSI reporting/validity window.

In one example, shown as example 1 in FIG. 19, the CSI reporting/validity window is the same as the measurement window. Hence, l=k and $W_{meas}=W_{CSI}$. In this case, the CSI reporting/window is according to one of the examples herein.

In one example, shown as example 2 in FIG. 19, the CSI reporting/validity window includes the measurement window and a non-measurement window $[m,m+W_{non\text{-}meas}]$ or $[m,m+W_{non\text{-}meas}-1]$ where there is no CSI-RS resource for measurement. In one example, $l=k,k+W_{meas}<m$, and $W_{CSI}=W_{non\text{-}meas}$. In one example, the non-measurement window is included in $[n_{ref},n']$. In one example, the non-measurement window is included in $[n_{ref},n_f]$ where $n'<n_f$. In one example, the non-measurement window is included in $[n',n_f]$ where $n'<n_f$. In one example, the non-measurement window refers to time slots where the UE is expected to perform channel or CSI prediction. In one example, the non-measurement window is a prediction window in which the UE is expected to perform prediction (e.g., of channel based on CSI-RS measured in the measurement window) in order to calculate the CSI. In one example, the UE is expected to predict channel/CSI starting from or after the slot with a 'new' reference resource definition (i.e., $l \ge n_{ref}$), where the location of the 'new' CSI reference resource is configured (from multiple candidate values) by gNB via higher-layer signalling, or indicated via a codepoint of a MAC CE activation command, or indicated via a codepoint of a DCI (e.g., it can be included in a CSI request field triggered via the DCI). The set of candidates values for the start of the CSI reference resource location (l) includes the legacy slot location ($n_{ref}$) and the CSI reporting slot n'.

In one example, shown as example 3 in FIG. 19, the CSI reporting/validity window is a non-measurement window $[m,m+W_{non\text{-}meas}]$ or $[m,m+W_{non\text{-}meas}-1]$ where there is no CSI-RS resource for measurement. Hence, $k+W_{meas}<m$. In one example, the non-measurement window is between $[n_{ref},n']$. In one example, the non-measurement window is between $[n_{ref},n_f]$ where $n'<n_f$. In one example, the non-measurement window is included in $[n',n_f]$ where $n'<n_f$. In one example, the non-measurement window refers to time slots where the UE is expected to perform channel or CSI prediction. In one example, the non-measurement window is a prediction window in which the UE is expected to perform prediction (e.g., of channel based on CSI-RS measured in the measurement window) in order to calculate the CSI. In one example, the UE is expected to predict channel/CSI starting from or after the slot with a 'new' reference resource definition (i.e., $l \geq n_{ref}$), where the location of the 'new' CSI reference resource is configured (from multiple candidate values) by gNB via higher-layer signalling, or indicated via a codepoint of a MAC CE activation command, or indicated via a codepoint of a DCI (e.g., it can be included in a CSI request field triggered via the DCI). The set of candidates values for the start of the CSI reference resource location (l) includes the legacy slot location ($n_{ref}$) and the CSI reporting slot n'.

Figure 20:
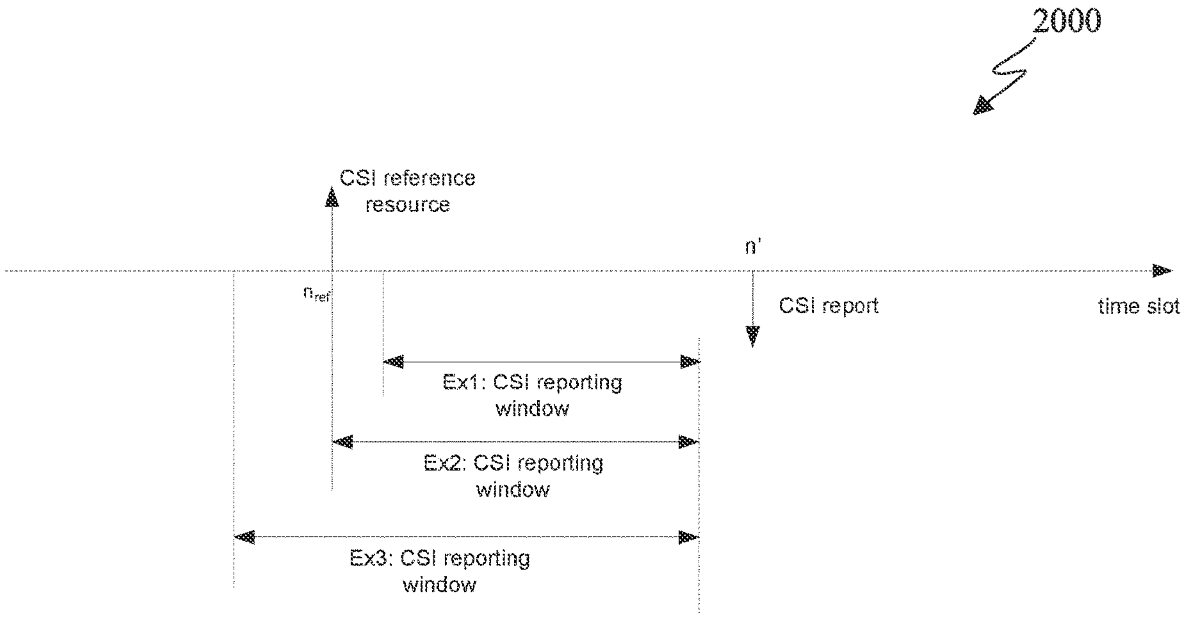
FIG. 20 illustrates an example of a UE configured to determine a CSI report that is valid during a CSI reporting/validity window according to embodiments of the present disclosure.

FIG. 20 illustrates an example 2000 of a UE configured to determine a CSI report that is valid during a CSI reporting/validity window according to embodiments of the present disclosure. The embodiment of the example 2000 of a UE configured to determine a CSI report that is valid during a CSI reporting/validity window illustrated in FIG. 20 is for illustration only. FIG. 20 does not limit the scope of this disclosure to any particular implementation of the example 2000 of a UE configured to determine a CSI report that is valid during a CSI reporting/validity window.

In one example, shown as example 1 in FIG. 20, the CSI reporting/validity window is located inside the window $[n_{ref}, n']$, i.e., $l > n_{ref}$ and $l + W_{CSI} < n'$ or $l + W_{CSI} - 1 < n'$.

In one example, shown as example 2 in FIG. 20, the CSI reporting/validity window is such that it's starting index $l = n_{ref}$ and the ending index is located before n', i.e., $l + W_{CSI} < n'$ or $l + W_{CSI} - 1 < n'$.

In one example, shown as example 3 in FIG. 20, the CSI reporting/validity window is such that it's starting index is located before $n_{ref}$ i.e., $l < n_{ref}$ and the ending index is located before n', i.e., $l + W_{CSI} < n'$ or $l + W_{CSI} - 1 < n'$.

In these examples, the UE is expected to perform channel or CSI prediction in slots where there are no CSI-RS measurements.

Figure 21:
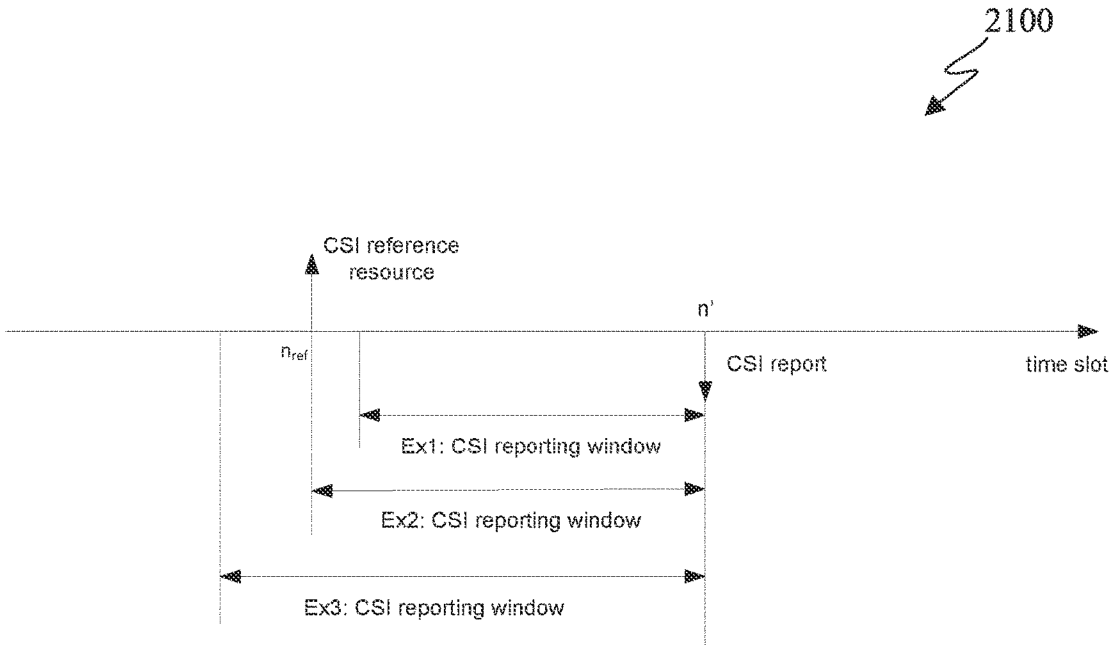
FIG. 21 illustrates an example of a UE configured to determine a CSI report that is valid during a CSI reporting/validity window according to embodiments of the present disclosure.

FIG. 21 illustrates an example 2100 of a UE configured to determine a CSI report that is valid during a CSI reporting/validity window according to embodiments of the present disclosure. The embodiment of the example 2100 of a UE configured to determine a CSI report that is valid during a CSI reporting/validity window illustrated in FIG. 21 is for illustration only. FIG. 21 does not limit the scope of this disclosure to any particular implementation of the example 2100 of a UE configured to determine a CSI report that is valid during a CSI reporting/validity window.

In one example, shown as example 1 in FIG. 21, the CSI reporting/validity window is such that it's starting index is located after $n_{ref}$, i.e., $l > n_{ref}$ and the ending index is located at n', i.e., $l + W_{CSI} = n'$ or $l + W_{CSI} - 1 = n'$.

In one example, shown as example 2 in FIG. 21, the CSI reporting/validity window is such that it's starting index is located at $n_{ref}$, i.e., $l = n_{ref}$ and the ending index is located at n', i.e., $l + W_{CSI} = n'$ or $l + W_{CSI} - 1 = n'$.

In one example, shown as example 3 in FIG. 21, the CSI reporting/validity window is such that it's starting index is located before $n_{ref}$, i.e., $l < n_{ref}$, and the ending index is located at n', i.e., $l + W_{CSI} = n'$ or $l + W_{CSI} - 1 = n'$.

In these examples, the UE is expected to perform channel or CSI prediction in slots where there are no CSI-RS measurements.

Figure 22:
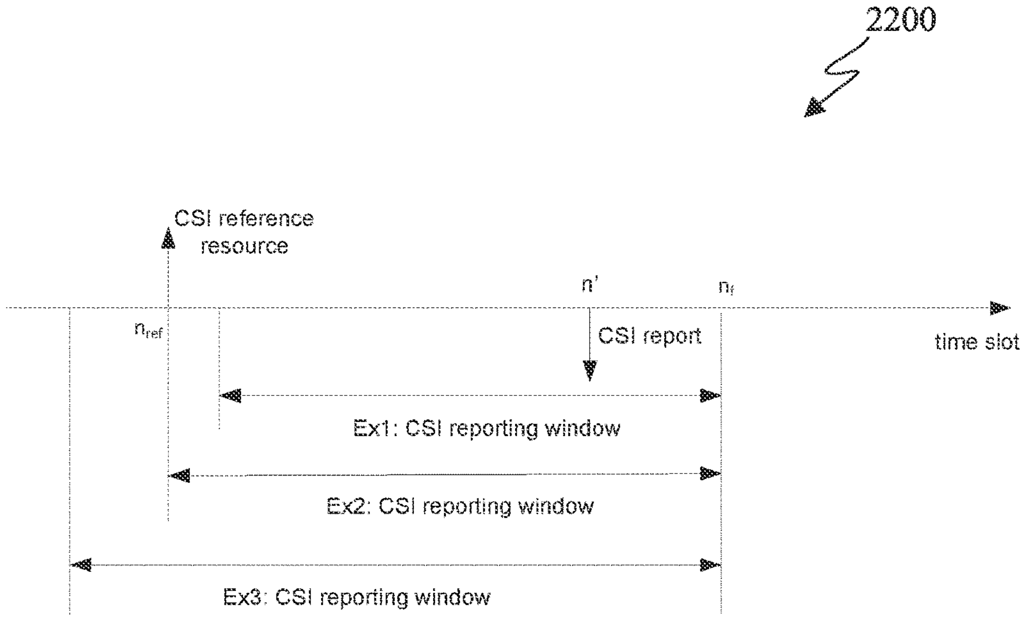
FIG. 22 illustrates an example of a UE configured to determine a CSI report that is valid during a CSI reporting/validity window according to embodiments of the present disclosure.

FIG. 22 illustrates an example 2200 of a UE configured to determine a CSI report that is valid during a CSI reporting/validity window according to embodiments of the present disclosure. The embodiment of the example 2200 of a UE configured to determine a CSI report that is valid during a CSI reporting/validity window illustrated in FIG. 22 is for illustration only. FIG. 22 does not limit the scope of this disclosure to any particular implementation of the example 2200 of a UE configured to determine a CSI report that is valid during a CSI reporting/validity window.

In one example, shown as example 1 in FIG. 22, the CSI reporting/validity window is such that it's starting index is located after $n_{ref}$, i.e., $l > n_{ref}$ and the ending index is located at a future slot $n_f > n'$, i.e., $l + W_{CSI} = n_f$ or $l + W_{CSI} - 1 = n_f$.

In one example, $n' > l > n_{ref}$, i.e., in this case, the UE is expected to "predict" channel/CSI after the slot with a reference resource.

In one example, $l > n'$, i.e., in this case, the UE is expected to "predict" channel/CSI after slot n' (where the CSI is reported).

In one example, $l \geq n'$, i.e., in this case, the UE is expected to "predict" channel/CSI after (with or without) slot n' (where the CSI is reported).

In one example, $l = n'$, i.e., in this case, the UE is expected to "predict" channel/CSI starting from slot n' (where the CSI is reported) to future slots up to $n_f$.

In one example, $l > n'$ or $l \geq n'$, where l is fixed, or configured (e.g., RRC) or provided via MAC CE or DCI based signalling.

In one example, $l = n' + D$, where D is fixed, or configured (e.g., RRC) or provided via MAC CE or DCI based signalling. In one example, $D \geq 0$. In one example, D is the scheduling delay. In one example, D=4.

In one example, $n_f$ is fixed. In one example, $n_f$ is configured (e.g., RRC) or provided via MAC CE or DCI based signalling. In one example, $n_f$ is determined based on starting slot l and $W_{CSI}$. In one example, $n_f$ is determined based on starting slot l and $N_4$. In one example, f is determined based on starting slot l, $N_4$, and $W_{CSI}$.

In one example, shown as example 2 in FIG. 22, the CSI reporting/validity window is such that it's starting index is located at $n_{ref}$, i.e., $l = n_{ref}$ and the ending index is located at a future slot $n_f > n'$, i.e., $l + W_{CSI} = n_f$ or $l + W_{CSI} - 1 = n_f$. In one example, f is determined based on starting slot l and $W_{CSI}$. In one example, f is determined based on starting slot l and $N_4$. In one example, f is determined based on starting slot l, $N_4$, and $W_{CSI}$.

In one example, shown as example 3 in FIG. 22, the CSI reporting/validity window is such that it's starting index is located before $n_{ref}$, i.e., $l < n_{ref}$, and the ending index is located at a future slot $n_f > n'$, i.e., $l + W_{CSI} = n_f$ or $l + W_{CSI} - 1 = n_f$. In one example, f is determined based on starting slot 1 and $W_{CSI}$. In one example, f is determined based on starting slot 1 and $N_4$. In one example, f is determined based on starting slot 1, $N_4$, and $W_{CSI}$.

In one or more examples herein, the CSI reporting/validity window spans from a slot i to a slot $n_f$, which is a slot after n' (in which the CSI is reported). Since f is a future slot index, the reported CSI is expected to be valid for future slots. In order to determine such a CSI report, the UE can perform CSI prediction or extrapolation to future slots.

In one example, when the TD/DD basis vectors can offer some intrinsic prediction/extrapolation ability (without UE trying it) beyond n', there may not be any need for including future slots (up to $n_f$) in the CSI reporting window. Else, the UE may need to do perform prediction/extrapolation to ensure, say 10% BLER requirement at slot $n_f$.

In one example, $f = n' + \Delta$.

In one example, $\Delta = (n' - n_{ref}) \times s$, where $s \geq 0$. In one example, s is fixed, e.g., s=1. In one example, s is configured (e.g., via RRC) from a set S, e.g., S={0,1} or {1,2} or {0,1,2}.

In one example, $f=n_{ref}+\Delta$.

In one example, $\Delta=(n'-n_{ref})\times s$, where $s\geq 1$. In one example, s is fixed, e.g., s=2. In one example, s is configured (e.g., via RRC) from a set S, e.g., S={1,2} or {2,3} or {1,2,3}.

In one example, $n_f=x+\Delta$, where x is the value of the starting slot with a 'new' reference resource ($l\geq n_{ref}$) where the (starting) location of the 'new' CSI reference resource is configured (from multiple candidate values) by gNB via higher-layer signalling, or indicated via a codepoint of a MAC CE activation command, or indicated via a codepoint of a DCI (e.g., it can be included in a CSI request field triggered via the DCI). The set of candidates values for the start of the CSI reference resource location (l) includes the legacy slot location ($n_{ref}$) and the CSI reporting slot n'.

In one example, $\Delta=(n'-n_{ref})\times s$, where $s\geq 1$. In one example, s is fixed, e.g., s=2. In one example, s is configured (e.g., via RRC) from a set S, e.g., S={1,2} or {2,3} or {1,2,3}.

Figure 23:
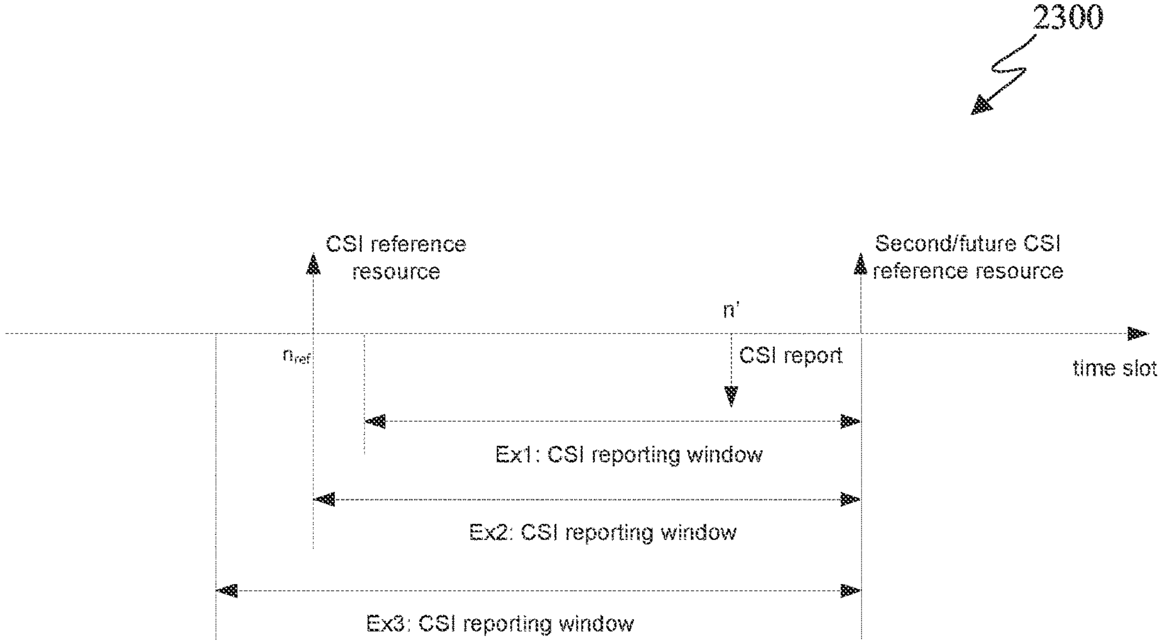
FIG. 23 illustrates an example of a UE configured to determine a CSI report that is valid during a CSI reporting/validity window according to embodiments of the present disclosure.

FIG. 23 illustrates an example 2300 of a UE configured to determine a CSI report that is valid during a CSI reporting/validity window according to embodiments of the present disclosure. The embodiment of the example 2300 of a UE configured to determine a CSI report that is valid during a CSI reporting/validity window illustrated in FIG. 23 is for illustration only. FIG. 23 does not limit the scope of this disclosure to any particular implementation of the example 2300 of a UE configured to determine a CSI report that is valid during a CSI reporting/validity window.

In one example, shown as example 1 in FIG. 23, the CSI reporting/validity window is such that it's starting index is located after $n_{ref}$, i.e., $l>n_{ref}$ and the ending index is located at a second (or future) CSI reference resource located at a slot $n_f$, where $n_f>n'$, i.e., $l+W_{CSI}=n_f$ or $l+W_{CSI}-1=n_f$.

- In one example, $n'>l>n_{ref}$, i.e., in this case, the UE is expected to "predict" channel/CSI after the slot with a reference resource.
- In one example, $l>n'$, i.e., in this case, the UE is expected to "predict" channel/CSI after slot n' (where the CSI is reported).
- In one example, $l\geq n'$, i.e., in this case, the UE is expected to "predict" channel/CSI after (with or without) slot n' (where the CSI is reported).
- In one example, $l=n'$, i.e., in this case, the UE is expected to "predict" channel/CSI starting from slot n' (where the CSI is reported) to future slots up to $n_f$.
- In one example, $l>n'$ or $l\geq n'$, where l is fixed, or configured (e.g., RRC) or provided via MAC CE or DCI based signalling.
- In one example, $l=n'+D$, where D is fixed, or configured (e.g., RRC) or provided via MAC CE or DCI based signalling. In one example, $D\geq 0$. In one example, D is the scheduling delay. In one example, D=4.

In one example, $n_f$ is fixed. In one example, $n_f$ is configured (e.g., RRC) or provided via MAC CE or DCI based signalling. In one example, $n_f$ is determined based on starting slot 1 and $W_{CSI}$. In one example, $n_f$ is determined based on starting slot l and $N_4$. In one example, $n_f$ is determined based on starting slot 1, $N_4$, and $W_{CSI}$.

In one example, shown as example 2 in FIG. 23, the CSI reporting/validity window is such that it's starting index is located at $n_{ref}$, i.e., $1=n_{ref}$ and the ending index is located at a second (or future) CSI reference resource located at a slot $n_f$, where $n_f>n'$, i.e., $l+W_{CSI}=n_f$ or $l+W_{CSI}-1=n_f$. In one example, f is determined based on starting slot l and $W_{CSI}$. In one example, f is determined based on starting slot l and $N_4$. In one example, f is determined based on starting slot l, $N_4$, and $W_{CSI}$.

In one example, shown as example 3 in FIG. 23, the CSI reporting/validity window is such that it's starting index is located before $n_{ref}$, i.e., $1<n_{ref}$, and the ending index is located at a second (or future) CSI reference resource located at a slot $n_f$, where $n_f>n'$, i.e., $l+W_{CSI}=n_f$ or $=l+W_{CSI}-1=n_f$. In one example, f is determined based on starting slot l and $W_{CSI}$. In one example, f is determined based on starting slot l and $N_4$. In one example, f is determined based on starting slot l, $N_4$, and $W_{CSI}$.

In one or more examples herein, there are two CSI reference resources, the first CSI reference resource is the same legacy located at slot $n_{ref}$ (as described above) and the second CSI reference resource is defined in a future time slot $n_f$. The two CSI reference resources define the CSI reporting window. For example, the CSI reporting/validity window can span up to the second CSI reference resource. The frequency domain location of the second CSI reference resource can be the same as the first CSI reference resource.

In one example, the UE is not expected to measure NZP CSI-RS resource(s) associated with the second CSI reference resource. In one example, the UE can measure NZP CSI-RS resource(s) associated with the second CSI reference resource. In one example, the information whether the UE measures NZP CSI-RS resource(s) associated with the second CSI reference resource or not is provided (configured) to the UE.

In one example, the UE is configured to report two CQI values (in TD across the CSI reporting window) associated with the two CSI reference resources. The first CQI can be valid in a window $[a_1, b_1]$, and the second CQI can be valid in a window $[a_2, b_2]$.

In one example, $a_1<n_{ref}$ and $b_1=n_{ref}$, and $a_2=n_{ref}$ and $b_2=n_f$.

In one example, $a_1=n_{ref}$ and $b_1=n_f$, and $a_2=n_f$ and $b_2>n_f$.

When the frequency domain granularity of CQI reporting is WB, then two WB CQI values are reported. When the frequency domain granularity of CQI reporting is SB, then two WB CQI values and $2N_{SB}$ CQI values (one for each CB) are reported.

In one example, the CSI reporting/validity window is fixed. For example, one of the examples herein is used.

In one example, the CSI reporting/validity window is configured (e.g., via RRC or MAC CE or DCI). For instance, multiple CSI reporting windows are supported, and the UE is configured with one of the supported windows. In one example, two CSI reporting windows are supported.

- In one example, two CSI reporting windows are based on the value of $n_f$. For example, the first window is based on the value $n_f=n'$ and the second window is based on a value of $n_f$ such that $n_f>n'$. In one example, the first window spans up to n' (as in legacy). In one example, the second window is according to one of the examples herein.
- In one example, two CSI reporting windows are based on the number of CSI reference resources. For example, the first window is used when the number of CSI reference resource=1 and the second window is used when the number of CSI reference resources=2. In one example, the first window spans up to n' (as in legacy). In one example, the second window is according to one of the examples herein.
- In one example, two CSI reporting windows are based on the value of the starting slot with a 'new' reference resource ($l\geq n_{ref}$) where the (starting) location of the 'new' CSI reference resource is configured (from multiple candidate values) by gNB via higher-layer signalling, or indicated via a codepoint of a MAC CE activation command, or indicated via a codepoint of a DCI (e.g., it can be included in a CSI request field triggered via the DCI). The set of candidates values for the start of the CSI reference resource location (l) includes the legacy slot location ($n_{ref}$) and the CSI reporting slot n'.

In one example, two or more than two CSI reporting windows are supported based on the value of the starting slot with a 'new' reference resource ($l \geq n_{ref}$) where the (starting) location of the 'new' CSI reference resource is configured (from multiple candidate values) by gNB via higher-layer signalling, or indicated via a codepoint of a MAC CE activation command, or indicated via a codepoint of a DCI (e.g., it can be included in a CSI request field triggered via the DCI). The set of candidates values for the start of the CSI reference resource location (l) includes the legacy slot location ($n_{ref}$) and the CSI reporting slot n'.

In one embodiment, a UE is configured with a CSI reporting/validity window $[l, l+W_{CSI}-1]$ as described above. At least one of the following examples is used/configured regarding $W_{CSI}$.

In one example, $l=n_{ref}$ and $W_{CSI}=1$, and $n_{ref}$ is the slot index of the CSI reference resource. That is, the CSI reporting/validity window comprises only one slot, which is the CSI reference resource slot. In one example, this example is used/configured for the CSI reporting window only when the CSI reporting is based on a codebook other than the Type II codebook including Doppler component(s), such as DD basis vectors (which can be configured for high speed UE scenarios). For example, the codebook can be Rel.15/16/17 Type II codebooks or Rel.18 codebook without Doppler components reporting, but the codebook can't be Rel.18 Type II codebook (including Doppler components). In one example, this example is used/configured for the CSI reporting window only when the CSI reporting is configured for a low speed UE. In one example, when $W_{CSI}=1$, the value of $N_4=1$ (implying no need for Doppler domain compression).

In one example, $l=n_{ref}$ and $W_{CSI}$ is configured (e.g., via RRC, or MAC CE or DCI). In one example, $W_{CSI}=1$ for a codebook not including Doppler component(s), e.g., Rel.15/16/17 NR Type II codebooks, or Rel.18 codebook without Doppler components reporting, and $W_{CSI}>1$ for a codebook including Doppler component(s), e.g., Rel.18 NR Type II codebook (for time/Doppler compression). In one example, $W_{CSI}=1$ for a codebook does not require any (UE-side or gNB-side) prediction, e.g., Rel.15/16/17 NR Type II codebooks, or Rel.18 codebook without Doppler components reporting, and $W_{CSI}>1$ for a codebook requiring (UE-side or gNB-side) prediction, e.g., Rel.18 NR Type II codebook (for time/Doppler compression). In one example, when $W_{CSI}=1$, the value of $N_4=1$ (implying no need for Doppler domain compression).

In one example, $l=n'$ and $W_{CSI}=1$, and n' is the slot index of the CSI report. That is, the CSI reporting/validity window comprises only one slot, which is the CSI reporting slot. In one example, this example is used/configured for the CSI reporting window only when the CSI reporting is based on a codebook other than the Type II codebook including Doppler component(s), such as DD basis vectors (which can be configured for high speed UE scenarios). For example, the codebook can be Rel.15/16/17 Type II codebooks or Rel.18 codebook without Doppler components reporting, but the codebook can't be Rel.18 Type II codebook (including Doppler components). In one example, this example is used/configured for the CSI reporting window only when the CSI reporting is configured for a low speed UE. In one example, when $W_{CSI}=1$, the value of $N_4=1$ (implying no need for Doppler domain compression). In one example, when $W_{CSI}>1$, the value of $N_4>1$ (e.g., $W_{CSI}=N_4$ (implying there can be Doppler domain compression). In one example, when $W_{CSI}>1$, the value of $N_4=1$ (implying no need for Doppler domain compression) or of $N_4>1$ (e.g., $W_{CSI}=N_4$ (implying there can be Doppler domain compression).

In one example, $l=n'$ and $W_{CSI}$ is configured (e.g., via RRC, or MAC CE or DCI). In one example, $W_{CSI}=1$ for a codebook not including Doppler component(s), e.g., Rel.15/16/17 NR Type II codebooks, or Rel.18 codebook without Doppler components reporting, and $W_{CSI}>1$ for a codebook including Doppler component(s), e.g., Rel.18 NR Type II codebook (for time/Doppler compression). In one example, $W_{CSI}=1$ for a codebook does not require any (UE-side or gNB-side) prediction, e.g., Rel.15/16/17 NR Type II codebooks, or Rel.18 codebook without Doppler components reporting, and $W_{CSI}>1$ for a codebook requiring (UE-side or gNB-side) prediction, e.g., Rel.18 NR Type II codebook (for time/Doppler compression). In one example, when $W_{CSI}=1$, the value of $N_4=1$ (implying no need for Doppler domain compression). In one example, when $W_{CSI}>1$, the value of $N_4>1$ (e.g., $W_{CSI}=N_4$ (implying there can be Doppler domain compression). In one example, when $W_{CSI}>1$, the value of $N_4=1$ (implying no need for Doppler domain compression) or of $N_4>1$ (e.g., $W_{CSI}=N_4$ (implying there can be Doppler domain compression).

In one example, $l=x$ and $W_{CSI}=1$, and x is the value of the starting slot with a 'new' reference resource ($l \geq n_{ref}$) where the (starting) location of the 'new' CSI reference resource is configured (from multiple candidate values) by gNB via higher-layer signalling, or indicated via a codepoint of a MAC CE activation command, or indicated via a codepoint of a DCI (e.g., it can be included in a CSI request field triggered via the DCI). The set of candidates values for the start of the CSI reference resource location (l) includes the legacy slot location ($n_{ref}$) and the CSI reporting slot n'. That is, the CSI reporting/validity window comprises only one slot. In one example, this example is used/configured for the CSI reporting window only when the CSI reporting is based on a codebook other than the Type II codebook including Doppler component(s), such as DD basis vectors (which can be configured for high speed UE scenarios). For example, the codebook can be Rel.15/16/17 Type II codebooks or Rel.18 codebook without Doppler components reporting, but the codebook can't be Rel.18 Type II codebook (including Doppler components). In one example, this example is used/configured for the CSI reporting window only when the CSI reporting is configured for a low speed UE. In one example, when $W_{CSI}=1$, the value of $N_4=1$ (implying no need for Doppler domain compression). In one example, when $W_{CSI}>1$, the value of $N_4>1$ (e.g., $W_{CSI}=N_4$ (implying there can be Doppler domain compression). In one example, when $W_{CSI}>1$, the value of $N_4=1$ (implying no need for Doppler domain compression) or of $N_4>1$ (e.g., $W_{CSI}=N_4$ (implying there can be Doppler domain compression).

In one example, $l=x$ and $W_{CSI}$ is configured (e.g., via RRC, or MAC CE or DCI), and x is the value of the starting slot with a 'new' reference resource ($l \geq n_{ref}$) where the (starting) location of the 'new' CSI reference resource is configured (from multiple candidate values) by gNB via higher-layer signalling, or indicated via a codepoint of a MAC CE activation command, or indicated via a codepoint of a DCI (e.g., it can be included in a CSI request field triggered via the DCI). The set of candidates values for the start of the CSI reference resource location (l) includes the legacy slot location ($n_{ref}$) and the CSI reporting slot n'. In one example, $W_{CSI}=1$ for a codebook not including Doppler component(s), e.g., Rel.15/16/17 NR Type II codebooks, or Rel.18 codebook without Doppler components reporting, and $W_{CSI}>1$ for a codebook including Doppler component(s), e.g., Rel.18 NR Type II codebook (for time/Doppler compression). In one example, $W_{CSI}=1$ for a codebook does not require any (UE-side or gNB-side) prediction, e.g., Rel.15/16/17 NR Type II codebooks, or Rel.18 codebook without Doppler components reporting, and $W_{CSI}>1$ for a codebook requiring (UE-side or gNB-side) prediction, e.g., Rel.18 NR Type II codebook (for time/Doppler compression). In one example, when $W_{CSI}=1$, the value of $N_4=1$ (implying no need for Doppler domain compression). In one example, when $W_{CSI}>1$, the value of $N_4>1$ (e.g., $W_{CSI}=N_4$ (implying there can be Doppler domain compression). In one example, when $W_{CSI}>1$, the value of $N_4=1$ (implying no need for Doppler domain compression) or of $N_4>1$ (e.g., $W_{CSI}=N_4$ (implying there can be Doppler domain compression).

In one example, $W_{CSI}$ value depends on the UE capability (reported by the UE). For example, whether the UE can perform UE-side prediction or not reported by the UE via its capability reporting, and the $W_{CSI}$ value is determined (fixed/configured) accordingly. In one example, whether the UE-side prediction is needed or not depends on the $W_{CSI}$ value.

In one example, l=k and k is fixed or configured as described earlier.

In one example, when the CQI calculation is conditioned on a PMI determined based on a codebook including Doppler component(s), e.g., Rel.18 NR Type II codebook (for time/Doppler compression), the PMI is expected to be valid for the CSI reporting window with $W_{CSI}>1$, and at least one of the following is used/configured regarding the CQI.

- The CQI is expected to meet a block error (BLER) probability requirement (e.g., 0.1) at a reference slot $n_{ref}$.
- The CQI is expected to meet a block error (BLER) probability requirement (e.g., 0.1) at a slot s within the $W_{CSI}$ slots of the CSI reporting window. Here, s can be fixed (e.g., first or last of the window), or configured.
- The CQI is expected to meet a block error (BLER) probability requirement (e.g., 0.1) at all slots within the $W_{CSI}$ slots of the CSI reporting window.

When the CQI calculation is conditioned on a PMI determined based on a codebook not including Doppler component(s), e.g., Rel.15/16/17 NR Type II codebooks, the PMI is expected to be valid at a reference slot $n_{ref}$, and the CQI is expected to meet a block error (BLER) probability requirement (e.g., 0.1) at the reference slot $n_{ref}$.

In one embodiment, a UE is configured to determine the value of $N_4$ and the location of the $N_4$ TD/DD units according to at least one of the following examples.

In one example, a UE is configured to determine the value of $N_4$ based on $W_{meas}$ and the location of the $N_4$ TD/DD units based on the measurement window $[k,k+W_{meas}]$ or $[k,k+W_{meas}-1]$.

- In one example, $N_4=W_{meas}$ (in TD/FD units), or $W_{meas}N_{ST}$ (in slots), or $W_{meas}N_{ST}R_{ST}$ (in sub-slots). The location of the $N_4$ TD/DD units corresponds to the measurement window. When $N_{ST}\leq 1$, we can write $$N_{ST} = \frac{1}{d}$$

where d is a positive integer taking values from {1,2,3, . . . }, and in this case, $W_{meas}=dN_4$.
- In one example, $N_4=R_{ST}\times W_{meas}$, where $R_{ST}\geq 1$ or <1. The value of $R_{ST}$ can be fixed, or configured (e.g., via RRC or MAC CE or DCI). The location of the $N_4$ TD/DD units corresponds to the measurement window. When $R_{ST}\leq 1$, we can write $$R_{ST} = \frac{1}{d}$$

where d is a positive integer taking values from {1,2,3, . . . }, and in this case, $W_{meas}=dN_4$.
- In one example, $N_4>W_{meas}$. The location of the $N_4$ TD/DD units includes the measurement window and a non-measurement window (as described above).
- In one example, $N_4>R_{ST}\times W_{meas}$. The location of the $N_4$ TD/DD units includes the measurement window and a non-measurement window (as described above).
- In one example, $N_4\geq W_{meas}$. The location of the $N_4$ TD/DD units includes the measurement window and can also include a non-measurement window (as described above).
- In one example, $N_4\geq R_{ST}\times W_{meas}$. The location of the $N_4$ TD/DD units includes the measurement window and can also include a non-measurement window (as described above).

In one example, a UE is configured to determine the value of $N_4$ based on $W_{meas}$ and the location of the $N_4$ TD/DD units based on the CSI reporting/validity window $[l,l+W_{CSI}]$ or $[l,l+W_{CSI}-1]$.

- In one example, $N_4=W_{meas}$ (in TD/FD units), or $W_{meas}N_{ST}$ (in slots), or $W_{meas}N_{ST}R_{ST}$(in sub-slots).
- In one example, $N_4>W_{meas}$.
- In one example, $N_4>R_{ST}\times W_{meas}$.
- In one example, $N_4\geq W_{meas}$.
- In one example, $N_4\geq R_{ST}\times W_{meas}$.

The location of the $N_4$ TD/DD units corresponds to the CSI reporting/validity window (when $N_4=W_{CSI}$) or a sub-window (of smaller size) within the CSI reporting/validity window (when $N_4<W_{CSI}$).

In one example, a UE is configured to determine the value of $N_4$ based on $W_{meas}$ and the location of the $N_4$ TD/DD units based on both the measurement window $[k,k+W_{meas}]$ or $[k,k+W_{meas}-1]$ and the CSI reporting/validity window $[l,l+W_{CSI}]$ or $[l,l+W_{CSI}-1]$.

- In one example, $N_4=W_{meas}$ (in TD/FD units), or $W_{meas}N_{ST}$ (in slots), or $W_{meas}N_{ST}R_{ST}$(in sub-slots).
- within In one example, $N_4>W_{meas}$.
- In one example, $N_4>R_{ST}\times W_{meas}$.
- In one example, $N_4\geq W_{meas}$.
- In one example, $N_4\geq R_{ST}\times W_{meas}$.

The location of the $N_4$ TD/DD units corresponds to a bigger window including both the measurement window and the CSI reporting/validity window (when $N_4=W_{meas}+W_{CSI}$) or a sub-window (of smaller size) within the bigger window (when $N_4<W_{meas}+W_{CSI}$). In one example, the bigger window equals $[\min(k,l),\min(k,l)+\max(W_{meas},W_{CSI})]$ or $[\min(k,l),\min(k,l)+\max(W_{meas},W_{CSI})-1]$.

In one example, a UE is configured to determine the value of $N_4$ based on $W_{CSI}$ and the location of the $N_4$ TD/DD units based on the measurement window $[k,k+W_{meas}]$ or $[k,k+W_{meas}-1]$.

In one example, $N_4=W_{CSI}$ (in TD/FD units), or $W_{CSI}N_{ST}$ (in slots), or $W_{CSI}N_{ST}R_{ST}$ (in sub-slots).

In one example, $N_4=R_{ST}\times W_{CSI}$, where $R_{ST}\geq 1$ or $<1$. The value of $R_{ST}$ can be fixed, or configured (e.g., via RRC or MAC CE or DCI). When $R_{ST}\leq 1$, we can write $$R_{ST}=\frac{1}{d}$$

$W_{CSI}=d\ N_4$.

In one example, $N_4<W_{CSI}$.

In one example, $N_4<R_{ST}\times W_{CSI}$.

In one example, $N_4\leq W_{CSI}$.

In one example, $N_4\leq R_{ST}\times W_{CSI}$.

The location of the $N_4$ TD/DD units corresponds to the measurement window (e.g., when measurement window=CSI reporting window). The location of the $N_4$ TD/DD units includes the (all of or a portion of the) measurement window and a non-measurement window (e.g., when measurement window is smaller than the CSI reporting window).

In one example, a UE is configured to determine the value of $N_4$ based on $W_{CSI}$ and the location of the $N_4$ TD/DD units based on the CSI reporting/validity window $[l,l+W_{CSI}]$ or $[l,l+W_{CSI}-1]$.

In one example, $N_4=W_{CSI}$ (in TD/FD units), or $W_{CSI}N_{ST}$ (in slots), or $W_{CSI}N_{ST}R_{ST}$ (in sub-slots). The location of the $N_4$ TD/DD units corresponds to the CSI reporting/validity window. When $N_{ST}\leq 1$, we can write $$N_{ST}=\frac{1}{d}$$

where d is a positive integer taking values from {1,2,3, . . . }, and in this case, $W_{CSI}=dN_4$.

In one example, $N_4=R_{ST}\times W_{CSI}$, where $R_{ST}\geq 1$ or $<1$. The value of $R_{ST}$ can be fixed, or configured (e.g., via RRC or MAC CE or DCI). The location of the $N_4$ TD/DD units corresponds to the CSI reporting/validity window. When $R_{ST}\leq 1$, we can write $$R_{ST}=\frac{1}{d}$$

where d is a positive integer taking values from {1,2,3, . . . }, and in this case, $W_{CSI}=dN_4$.

In one example, $N_4<W_{CSI}$. The location of the $N_4$ TD/DD units is included in the CSI reporting/validity window.

In one example, $N_4<R_{ST}\times W_{CSI}$. The location of the $N_4$ TD/DD units is included in the CSI reporting/validity window.

In one example, $N_4\leq W_{CSI}$. The location of the $N_4$ TD/DD units corresponds to or is included in the CSI reporting/validity window.

In one example, $N_4\leq R_{ST}\times W_{CSI}$. The location of the $N_4$ TD/DD units corresponds to or is included in the CSI reporting/validity window.

In one example, a UE is configured to determine the value of $N_4$ based on $W_{CSI}$ and the location of the $N_4$ TD/DD units based on both the measurement window $[k,k+W_{meas}]$ or $[k,k+W_{meas}-1]$ and the CSI reporting/validity window $[l,l+W_{CSI}]$ or $[l,l+W_{CSI}-1]$.

In one example, $N_4=W_{CSI}$ (in TD/FD units), or $W_{CSI}N_{ST}$ (in slots), or $W_{CSI}N_{ST}R_{ST}$ (in sub-slots).

In one example, $N_4=R_{ST}\times W_{CSI}$, where $R_{ST}\geq 1$ or $<1$. The value of $R_{ST}$ can be fixed, or configured (e.g., via RRC or MAC CE or DCI). When $R_{ST}\leq 1$, we can write $$R_{ST}=\frac{1}{d}$$

where d is a positive integer taking values from {1,2,3, . . . }, and in this case, $W_{CSI}=d\ N_4$.

In one example, $N_4<W_{CSI}$.

In one example, $N_4<R_{ST}\times W_{CSI}$

In one example, $N_4\leq W_{CSI}$.

In one example, $N_4\leq R_{ST}\times W_{CSI}$.

The location of the $N_4$ TD/DD units corresponds to a bigger window including both the measurement window and the CSI reporting/validity window (when $N_4=W_{meas}+W_{CSI}$) or a sub-window (of smaller size) within the bigger window (when $N_4<W_{meas}+W_{CSI}$). In one example, the bigger window equals $[\min(k,l),\min(k,l)+\max(W_{meas},W_{CSI})]$ or $[\min(k,l),\min(k,l)+\max(W_{meas},W_{CSI})-1]$.

In one example, a UE is configured to determine the value of $N_4$ based on both $W_{meas}$ and $W_{CSI}$ and the location of the $N_4$ TD/DD units based on the measurement window $[k,k+W_{meas}]$ or $[k,k+W_{meas}-1]$.

In one example, $N_4=f(W_{meas},W_{CSI})$ (in TD/FD units), or $f(W_{meas},W_{CSI})N_{ST}$ (in slots), or $f(W_{meas},W_{CSI})N_{ST}R_{ST}$ (in sub-slots).

In one example, $N_4=R_{ST}\times f(W_{meas},W_{CSI})$, where $R_{ST}\geq 1$ or $<1$. The value of $R_{ST}$ can be fixed, or configured (e.g., via RRC or MAC CE or DCI). When $R_{ST}\leq 1$, we can write $$R_{ST}=\frac{1}{d}$$

where d is a positive integer taking values from {1,2,3, . . . }, and in this case, $f(W_{meas},W_{CSI})=dN_4$.

In one example, $N_4<f(W_{meas},W_{CSI})$.

In one example, $N_4<R_{ST}\times f(W_{meas}\ W_{CSI})$.

In one example, $N_4\leq f(W_{meas},W_{CSI})$.

In one example, $N_4\leq R_{ST}\times f(W_{meas},W_{CSI})$.

In one example, $f(W_{meas},W_{CSI})=(W_{meas}+W_{CSI})$. In one example, $f(W_{meas},W_{CSI})=\max(W_{meas},W_{CSI})$. In one example, $f(W_{meas},W_{CSI})=\min(W_{meas},W_{CSI})$.

The location of the $N_4$ TD/DD units corresponds to the measurement window (e.g., when measurement window=CSI reporting window). The location of the $N_4$ TD/DD units includes the (all of or a portion of the) measurement window and a non-measurement window (e.g., when measurement window is smaller than the CSI reporting window).

In one example, a UE is configured to determine the value of $N_4$ based on both $W_{meas}$ and $W_{CSI}$ and the location of the $N_4$ TD/DD units based on the CSI reporting/validity window $[l,l+W_{CSI}]$ or $[l,l+W_{CSI}-1]$.

In one example, $N_4=f(W_{meas},W_{CSI})$ (in TD/FD units), or $f(W_{meas},W_{CSI})N_{ST}$ (in slots), or $f(W_{meas},W_{CSI})N_{ST}R_{ST}$ (in sub-slots).

In one example, $N_4=R_{ST}\times f(W_{meas},W_{CSI})$, where $R_{ST}\geq 1$ or $<1$. The value of $R_{ST}$ can be fixed, or configured (e.g., via RRC or MAC CE or DCI). When $R_{ST}\leq 1$, we can write $$R_{ST}=\frac{1}{d}$$

where d is a positive integer taking values from {1,2,3, . . . }, and in this case, $f(W_{meas},W_{CSI})=dN_4$.

In one example, $N_4<f(W_{meas},W_{CSI})$.

In one example, $N_4<R_{ST}\times f(W_{meas}\ W_{CSI})$.

In one example, $N_4\leq f(W_{meas},W_{CSI})$.

In one example, $N_4\leq R_{ST}\times f(W_{meas},W_{CSI})$.

In one example, $f(W_{meas},W_{CSI})=(W_{meas}+W_{CSI})$. In one example, $f(W_{meas},W_{CSI})=\max(W_{meas},W_{CSI})$. In one example, $f(W_{meas},W_{CSI})=\min(W_{meas},W_{CSI})$.

The location of the $N_4$ TD/DD units corresponds to the CSI reporting/validity window (e.g., when measurement window=CSI reporting window). The location of the $N_4$ TD/DD units includes the (all of or a portion of the) CSI reporting/validity window and a non-measurement window (e.g., when measurement window is smaller than the CSI reporting window).

In one example, a UE is configured to determine the value of $N_4$ based on both $W_{meas}$ and $W_{CSI}$ and the location of the $N_4$ TD/DD units based on both the measurement window $[k,k+W_{meas}]$ or $[k,k+W_{meas}-1]$ and the CSI reporting/validity window $[l,l+W_{CSI}]$ or $[l,l+WCS_l-1]$.

In one example, $N_4=f(W_{meas},W_{CSI})$ (in TD/FD units), or $f(W_{meas},W_{CSI})N_{ST}$ (in slots), or $f(W_{meas},W_{CSI})$ NsTRST (in sub-slots).

In one example, $N_4=R_{ST}\times f(W_{meas},W_{CSI})$, where $R_{ST}\geq 1$ or $<1$. The value of $R_{ST}$ can be fixed, or configured (e.g., via RRC or MAC CE or DCI). When $R_{ST}\leq 1$, we can write $$R_{ST}=\frac{1}{d}$$

where d is a positive integer taking values from {1,2,3, . . . }, and in this case, $f(W_{meas},W_{CSI})=dN_4$.

In one example, $N_4<f(W_{meas},W_{CSI})$.

In one example, $N_4<R_{ST}\times f(W_{meas},W_{CSI})$.

In one example, $N_4\leq f(W_{meas},W_{CSI})$.

In one example, $N_4\leq R_{ST}\times f(W_{meas},W_{CSI})$.

The location of the $N_4$ TD/DD units corresponds to a bigger window including both the measurement window and the CSI reporting/validity window (when $N_4=W_{meas}+W_{CSI}$) or a sub-window (of smaller size) within the bigger window (when $N_4<W_{meas}+W_{CSI}$). In one example, the bigger window equals $[\min(k,l),\min(k,l)+\max(W_{meas},W_{CSI})]$ or $[\min(k,l),\min(k,l)+\max(W_{meas},W_{CSI})-1]$.

Figure 24:
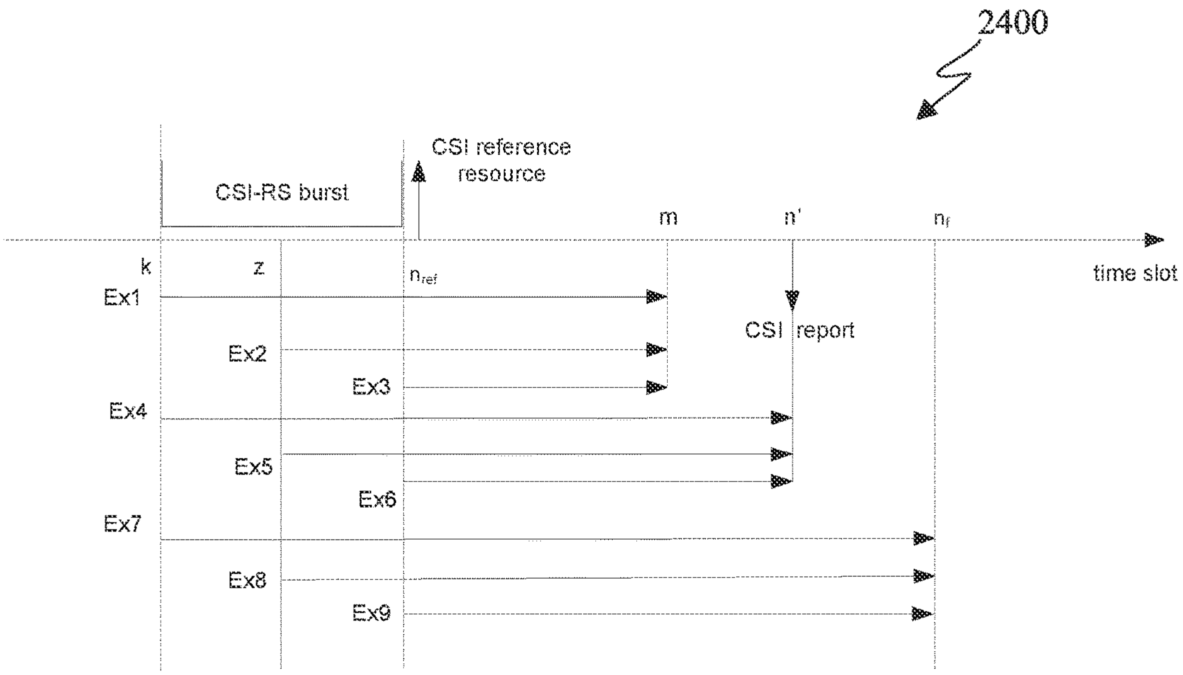
FIG. 24 illustrates an example of a UE configured to determine a value of $N_4$ according to embodiments of the present disclosure.

FIG. 24 illustrates an example 2400 of a UE configured to determine a value of $N_4$ according to embodiments of the present disclosure. The embodiment of the example 2400 of a UE configured to determine a value of $N_4$ illustrated in FIG. 24 is for illustration only. FIG. 24 does not limit the scope of this disclosure to any particular implementation of the example 2400 of a UE configured to determine a value of $N_4$.

In one example, as shown in FIG. 24, a UE is configured to determine the value of $N_4$ according to at least one of the following examples.

In one example (Ex1 in figure), $N_4=m-k$ or $m-k+1$, where $n_{ref}<m<n'$.

In one example (Ex2 in figure), $N_4=m-z$ or $m-z+1$, where $n_{ref}<m<n'$ and $k<z<n_{ref}$.

In one example (Ex3 in figure), $N_4=m-n_{ref}$ or $m-n_{ref}+1$, where $n_{ref}<m<n'$.

In one example (Ex4 in figure), $N_4=n'-k$ or $n'-k+1$.

In one example (Ex5 in figure), $N_4=n'-z$ or $n'-z+1$, where $k\leq z\leq n_{ref}$.

In one example (Ex6 in figure), $N_4=n'-n_{ref}$ or $n'-n_{ref}+1$.

In one example (Ex7 in figure), $N_4=n_f-k$ or $n_f-k+1$.

In one example (Ex8 in figure), $N_4=n_f-z$ or $n_f-z+1$, where $k<z<n_{ref}$.

In one example (Ex9 in figure), $N_4=n_f-n_{ref}$ or $n_f-n_{ref}+1$. Here, the start (slot) of $W_{CSI}$ is $n_{ref}$ In one example, $N_4=W_{CSI}=n_f-n'$ or $f-n'+1$. Here, the start (slot) of $W_{CSI}$ is n'.

In one example, $N_4=W_{CSI}R_{ST}=(n_f-n')R_{ST}$ or $(n_f-n'+1)R_{ST}$ where $R_{ST}\geq 1$ or $<1$. The value of $R_{ST}$ can be fixed, or configured (e.g., via RRC or MAC CE or DCI). The location of the $N_4$ TD/DD units corresponds to the CSI reporting/validity window. Here, the start (slot) of $W_{CSI}$ is n'. When $R_{ST}\leq 1$, we can write $$R_{ST}=\frac{1}{d}$$

where d is a positive integer taking values from {1,2,3, . . . }, and in this case, $W_{CSI}=dN_4$.

In one example, $N_4=W_{CSI}R_{ST}=(n_f-n_{ref})R_{ST}$ or $(n_f-n_{ref}+1)R_{ST}$ where $R_{ST}\geq 1$ or $<1$. The value of $R_{ST}$ can be fixed, or configured (e.g., via RRC or MAC CE or DCI). The location of the $N_4$ TD/DD units corresponds to the CSI reporting/validity window. Here, the start (slot) of $W_{CSI}$ is $n_{ref}$. When $R_{ST}\leq 1$, we can write $$R_{ST}=\frac{1}{d}$$

where d is a positive integer taking values from {1,2,3, . . . }, and in this case, $W_{CSI}=dN_4$.

In one example, $N_4=W_{CSI}=n_f-l$ or $n_f-l+1$, where $n'<l$ or $n'\leq l$. Here, the start (slot) of $W_{CSI}$ is 1. The value of 1 can be fixed, or configured (e.g., via RRC or MAC CE or DCI).

In one example, $N_4=W_{CSI}R_{ST}=(n_f-l)R_{ST}$ or $(n_f-l+1)R_{ST}$ where $R_{ST}\geq 1$ or $<1$, and $n'<l$ or $n'\leq l$. Here, the start (slot) of $W_{CSI}$ is 1. The value of 1 can be fixed, or configured (e.g., via RRC or MAC CE or DCI). The value of $R_{ST}$ can be fixed, or configured (e.g., via RRC or MAC CE or DCI). The location of the $N_4$ TD/DD units corresponds to the CSI reporting/validity window. When $R_{ST}\leq 1$, we can write $$R_{ST}=\frac{1}{d}$$

where d is a positive integer taking values from {1,2,3, . . . }, and in this case, $W_{CSI}=dN_4$.

In one example, the start (slot) of $W_{CSI}$ is either $n_{ref}$ or l, and one of the two is configured via higher layer signalling. In one example, l=n'+δ, where δ≥0. In one example, δ is fixed (e.g., 0), or is configured from {0, 1, 2, 3, 4, 6, 8}.

In one example, $R_{ST}$ value is the same (i.e., one value) for CQI and PMI reporting. In one example, $R_{ST}$ value can be different (i.e., two independent values) the same for CQI and PMI reporting.

In one example, when $W_{CSI}=dN_4$, the value of d can be fixed (e.g., 1), or configured. When configured, it can be configured from {1,x}, where x=a value proportional to the periodicity (p) of a periodic or semi-persistent NZP CSI-RS resource, or the spacing (m) between two consecutive aperiodic NZP CSI-RS resources from K>1 aperiodic CSI-RS resources triggered jointly by a single DCI. In one example, x=p, or x=m resources. Note d can be equivalent to one of the following definition:

UE-side: The duration (expected validity time) of each of the (uncompressed) N4 precoding matrices before DD/TD compression.

gNB-side: The duration (expected validity time) of each of the reconstructed/decompressed N4 precoding matrices.

Note d is the size of each TD/DD unit for PMI.

In one example, the value of $W_{CSI}$ can be $W_{CSI}=1$. In one example, $W_{CSI}=1$ implies that d=1 and $N_4=1$. In one example, $W_{CSI}=1$ can be configured even when $N_4>1$, in which case, $$d=\frac{1}{N_4}.$$

Having this as a possible value can ease up UE burden (complexity) on UE-side prediction (e.g., of channel), and can also avoid excessive user throughput loss due to tight 10% BLER requirement over a wider CSI reporting window (when $W_{CSI}>1$). Also, when $W_{CSI}=1$, the TD/DD unit size for PMI=DD/TD unit size of CQI=1.

In one example, $W_{CSI}$ can be determined/configured according to one of the following:

(A) $W_{CSI}=1$ (e.g., $d=N_4=1$) or (B) $W_{CSI}>1$ (e.g., $W_{CSI}=dN_4>1$ or at least one of d and $N_4$ is >1).

In one example, $W_{CSI}$ can be determined/configured according to one of the following:

(A) $W_{CSI}=1$ (e.g., $d=N_4=1$), if a first condition is satisfied, (B) $W_{CSI}>1$ (e.g., $W_{CSI}=dN_4>1$ or at least one of d and $N_4$ is >1), if a second condition is satisfied, (C) $W_{CSI}$ is configured as either (A) $W_{CSI}=1$ or (B) $W_{CSI}>1$. This configuration can be via higher layer (RRC).

In one example, the first condition corresponds to at least one of the following.

In one example, the first condition corresponds to the case when l≥n' (i.e., the start of the CSI reporting window $W_{CSI}$ is at slot l which equals the CSI reporting slot), where n' is as defined herein.

In one example, the second condition corresponds to at least one of the following.

In one example, the second condition corresponds to the case when $l=n_{ref}$ (i.e., the start of the CSI reporting window $W_{CSI}$ is at slot l which equals the CSI reference resource slot), where $n_{ref}$ is as defined herein.

In one example, $W_{CSI}$ can be determined/configured according to one of the following:

(B) $W_{CSI}>1$ (e.g., $W_{CSI}=dN_4>1$ or at least one of d and $N_4$ is >1), if a second condition is satisfied, (C) $W_{CSI}$ is configured as either (A) $W_{CSI}=1$ or (B) $W_{CSI}>1$. This configuration can be via higher layer (RRC).

In one example, when X CQI(s) are reported in time domain (e.g., across $W_{CSI}$), each of the X CQI(s) has a validity window of $$\frac{W_{CSI}}{X}$$

slots. So, the CQI, the DD/TD unit $$\text{size}=\frac{W_{CSI}}{X}.$$

When $W_{CSI}=dN_4$, the DD/TD unit size for $$CQI=\frac{dN_4}{X}.$$

In one example, X is fixed (e.g., 1). In one example, X is configured (e.g., RRC), for example, from {1,2}, or {1,N4}, or {1,2,N4}. In one example, X is reported by the UE.

In one embodiment, a UE is configured with a CSI reference window comprising multiple time instances (slots). In particular, the CSI reference resource window for a serving cell is defined as follows:

In the frequency domain, the CSI reference resource window is defined by the group of downlink physical resource blocks corresponding to the band to which the derived CSI relates.

In the time domain, the CSI reference resource window for a CSI reporting in uplink slot n' is defined by a window of downlink slots [m,m+$W_{ref}$−1].

In one example, the CSI reference resource window can be configured only when the CSI reporting is based on a codebook including Doppler component(s), e.g., Rel.18 NR Type II codebook (for time/Doppler compression).

In one example, the window includes the legacy CSI reference resource slot $n_{ref}$ defined as:

$$n_{ref}=n-n_{CSI\_ref}-K_{offset}\cdot\frac{2^{\mu_{DL}}}{2^{\mu_{K_{offset}}}},$$

where $K_{offset}$ is a parameter configured by higher layer as specified in clause 4.2 of [6 TS 38.213], and where $\mu_{offset}$ is the subcarrier spacing configuration for $K_{offset}$ with a value of 0 for frequency range 1, where $$n=\left\lfloor n'\cdot\frac{2^{\mu_{DL}}}{2^{\mu_{DL}}}\right\rfloor+\left\lfloor\left(\frac{N_{slot,offset,UL}^{CA}}{2^{\mu_{offset,UL}}}-\frac{N_{slot,offset,DL}^{cA}}{2^{\mu_{offset,DL}}}\right)\cdot 2^{\mu_{DL}}\right\rfloor$$

and $\mu_{DL}$ and $\mu_{UL}$ are the subcarrier spacing configurations for DL and UL, respectively, and $$N_{slot,offset}^{CA}$$

and $\mu_{offset}$ are determined by higher-layer configured ca-SlotOffset for the cells transmitting the uplink and downlink, as defined in clause 4.5 of [4, TS 38.211].

In one example, $m=n_{ref}$.

In one example, $m+W_{ref}-1=n_{ref}$.

In one example, $m<n_{ref}$ and $n_{ref}<m+W_{ref}-1$.

In one example, the CSI reference resource window=CSI reporting window, i.e., l=m and $W_{CSI}=W_{ref}$.

In one example, the CSI reference resource window=CSI measurement window, i.e., k=m and $W_{meas}=W_{ref}$.

In one example, the CSI reference resource window=CSI measurement=CSI reporting window, i.e., k=l=m and $W_{meas}+W_{CSI}=W_{ref}$.

In one example, the CSI reference resource window+CSI measurement window=CSI reporting window, i.e., l=m and $W_{CSI}=W_{meas}+W_{ref}$ and k=m and $l=n_{ref}$ and $m+W_{ref}-1=l+W_{CSI}-1$.

In one example, the CSI reference resource window is such that $m=n_{ref}$ and $m+W_{ref}-1=n'$, where n' is the slot in which the CSI is reported.

In one example, the CSI reference resource window is such that $m=n_{ref}$ and $m+W_{ref}-1=n_f$, where $n_f>n'$ is a future slot after the slot in which the CSI is reported.

In one example, the CSI reference resource window is such that $m=n_{ref}$ and, $m+W_{ref}-1=l+W_{CSI}-1$.

In one example, the CSI reference resource window is such that m=n' and $m+W_{ref}-1=n_f$, where $n_f>n'$ is a future slot after the slot in which the CSI is reported.

In one example, the CSI reference resource window is such that m=n' and, $m+W_{ref}-1=l+W_{CSI}-1$.

In one example, $N_4=W_{ref}$.

In one example, $N_4=W_{ref}R_{ST}$ where $R_{ST}\geq 1$ or <1. The value of $R_{ST}$ can be fixed, or configured (e.g., via RRC or MAC CE or DCI). The location of the $N_4$ TD/DD units corresponds to the CSI reporting/validity window. In one example, $R_{ST}$ value is the same (i.e., one value) for CQI and PMI reporting. In one example, $R_{ST}$ value can be different (i.e., two independent values) the same for CQI and PMI reporting.

In one example, the CQI is expected to be calculated and meet BLER requirement (e.g., 0.1) at a slot within the CSI reference resource window, and the PMI is expected to be calculated/valid for all or a subset of slots within the CSI reference resource window.

Or, in one example, the CQI is expected to be calculated and meet BLER requirement (e.g., 0.1) for all or a subset of slots within the CSI reference resource window, and the PMI is expected to be calculated/valid for all or a subset of slots within the CSI reference resource window.

Figure 25:
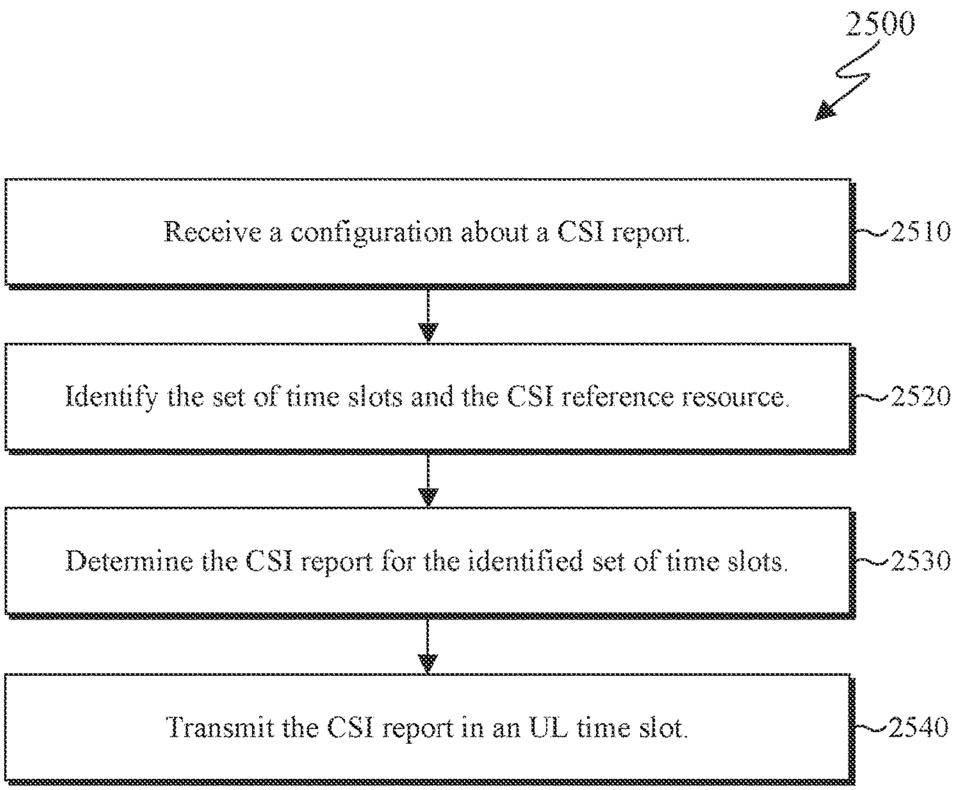
FIG. 25 illustrates an example method performed by a UE in a wireless communication system according to embodiments of the present disclosure.

FIG. 25 illustrates an example method 2500 performed by a UE in a wireless communication system according to embodiments of the present disclosure. The method 2500 of FIG. 25 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 2500 is for illustration only and other embodiments can be used without departing from the scope of the present disclosure.

The method begins with the UE receiving a configuration about a CSI report (2510). For example, in 2510, the configuration includes information indicating (i) a set of time slots that the CSI report is valid for, (ii) a CSI reference resource, and (iii) an uplink (UL) time slot n'. The UE then identifies the set of time slots and the CSI reference resource (2520). For example, in 2520, the UE may identify the set of time slots and the CSI reference resource based on the information in the configuration.

The UE then determines the CSI report for the identified set of time slots (2530). For example, in 2530, the UE may determine the CSI report for the identified set of time slots based on the CSI reference resource. The UE then transmit the CSI report in an UL time slot (2540). For example, in 2540, the UL time slot is UL time slot n' and the set of time slots includes at least one time slot i after a time slot $n_{ref}$ of the CSI reference resource, implying $n_{ref}<i$.

In one or more of the above embodiments or examples, the set of time slots includes at least two slots $\{n_{ref}, i\}$, where $i\in\{n_{ref}+1, \ldots, n', \ldots, n_f\}$ and $n_f>n'$ is a future slot. For example, the set of time slots is a time window that includes $W_{CSI}$ time slots with indices $[l, \ldots, l+W_{CSI}-1]$, l is an index of a first of the $W_{CSI}$ time slots, l takes a value from a set S, and $W_{CSI}\geq 1$.

In one or more of the above embodiments or examples, the set S includes values $\{n_{ref}, n', n_f\}$, when $l=n_{ref}$, the time window comprises time slot indices $[n_{ref}, n_{ref}+W_{CSI}+1]$, when l=n', the time window comprises time slot indices $[n', n'+W_{CSI}+1]$, and when $l=n_f$, the time window comprises time slot indices $[n_f, n_f+W_{CSI}+1]$. In some examples, when $n_f=n'+\delta$: the set S includes values $\{n_{ref}, n'+\delta\}$, and the information indicates a value of $l=n_{ref}$ or a value of 8 from a set of values including $\{0,1,2\}$. In some examples, the UE reports UE capability information indicating whether the UE is capable of supporting the value of $=n_{ref}$.

In one or more of the above embodiments or examples, a value of $W_{CSI}$ is determined as $W_{CSI}=N_4 d$, where $N_4$ is a number of time domain (TD) units, and d is a number of time slots in one TD unit, $W_{CSI}=1$, when $N_4=1$ and d=1, $W_{CSI}>1$, when at least one of $N_4$ and d is more than 1, and the information indicates values of $N_4$ and d from sets of values including $\{1, x\}$ and $\{1,m,p\}$, respectively. Here, x>1, m is a spacing between two consecutive aperiodic non-zero power (NZP) CSI-reference signal (RS) resources from K>1 aperiodic NZP CSI-RS resources configured for the CSI report, and p is a periodicity of a periodic or semi-persistent NZP CSI-RS resource configured for the CSI report. In some examples, $W_{CSI}\geq 1$, when $l\geq n'$ and $W_{CSI}>1$, when $l=n_{ref}$.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:

a transceiver configured to:

receive, from a base station, configuration information on a channel state information (CSI) report associated with a codebook for Doppler, the configuration information including first information on a delay associated with a predicted precoding matrix indicator (PMI) of the CSI report, and receive, from the base station, a CSI-reference signal (RS); and a processor operably coupled to the transceiver, the processor configured to identify the predicted PMI based on the CSI-RS, wherein the transceiver is further configured to transmit, to the base station in an uplink slot, the CSI report including the predicted PMI, and wherein a starting slot for the predicted PMI is identified based on the uplink slot and the delay.

2. The UE of claim 1, wherein:

when the first information includes a first value, the starting slot is earlier than the uplink slot by the delay, and the starting slot is a slot in which a CSI reference resource for the CSI report is located.

3. The UE of claim 1, wherein:

when the first information includes a first value, the starting slot is same as the uplink slot, and when the first information includes a second value, the starting slot is later than the uplink slot by the delay.

4. The UE of claim 1, wherein:

the UE is configured with the codebook for UE side CSI prediction, and the CSI report further comprises a channel quality indicator (CQI) associated with the predicted PMI.

5. A base station (BS) comprising:

a processor; and a transceiver operably coupled to the processor, the transceiver configured to:

transmit, to a user equipment (UE), configuration information on a channel state information (CSI) report associated with a codebook for Doppler, wherein the configuration information includes first information on a delay associated with a predicted precoding matrix indicator (PMI) of the CSI report, transmit, to the UE, a CSI-reference signal (RS), wherein the predicted PMI is based on the CSI-RS, and receive, from the UE in an uplink slot, the CSI report including the predicted PMI, wherein a starting slot for the predicted PMI is based on the uplink slot and the delay.

6. The BS of claim 5, wherein:

when the first information includes a first value, the starting slot is earlier than the uplink slot by the delay, and the starting slot is a slot in which a CSI reference resource for the CSI report is located.

7. The BS of claim 5, wherein:

when the first information includes a first value, the starting slot is same as the uplink slot, and when the first information includes a second value, the starting slot is later than the uplink slot by the delay.

8. The BS of claim 5, wherein:

the UE is configured with the codebook for UE side CSI prediction, and the CSI report further comprises a channel quality indicator (CQI) associated with the predicted PMI.

9. A method performed by a user equipment (UE), the method comprising:

receiving, from a base station, configuration information on a channel state information (CSI) report associated with a codebook for Doppler, the configuration information including first information on a delay associated with a predicted precoding matrix indicator (PMI) of the CSI report:

receiving, from the base station, a CSI-reference signal (RS);

identifying the predicted PMI based on the CSI-RS; and transmitting, to the base station in an uplink slot, the CSI report including the predicted PMI, wherein a starting slot for the predicted PMI is identified based on the uplink slot and the delay.

10. The method of claim 9, wherein:

when the first information includes a first value, the starting slot is earlier than the uplink slot by the delay, and the starting slot is a slot in which a CSI reference resource for the CSI report is located.

11. The method of claim 9, wherein:

when the first information includes a first value, the starting slot is same as the uplink slot, and when the first information includes a second value, the starting slot is later than the uplink slot by the delay.

12. The method of claim 9, wherein:

the UE is configured with the codebook for UE side CSI prediction, and the CSI report further comprises a channel quality indicator (CQI) associated with the predicted PMI.

* * * * *